US012769772B2

(12) United States Patent
Ellis

(10) Patent No.: US 12,769,772 B2
(45) Date of Patent: Oct. 20, 2026

(54) PROCESSING REQUESTS USING A DIGITAL ASSISTANT AND A REMOTE MODEL

(71) Applicant: Apple Inc., Cupertino, CA (US)

(72) Inventor: Neal S. Ellis, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/959,558

(22) Filed: Nov. 25, 2024

(65) Prior Publication Data

US 2025/0298818 A1 Sep. 25, 2025

Related U.S. Application Data

(60) Provisional application No. 63/691,981, filed on Sep. 6, 2024, provisional application No. 63/670,038, filed on Jul. 11, 2024, provisional application No. 63/657,724, filed on Jun. 7, 2024, provisional application No. 63/631,400, filed on Apr. 8, 2024, (Continued)

(51) Int. Cl.
*G06F 16/3329* (2025.01)
*G10L 13/08* (2013.01)
*G10L 15/26* (2006.01)

(52) U.S. Cl.
CPC ........ *G06F 16/33295* (2025.01); *G10L 13/08* (2013.01); *G10L 15/26* (2013.01)

(58) Field of Classification Search
CPC ........... G06F 16/33295; G06F 16/3329; G06F 3/167; G06F 40/00; G06F 40/30; G06F 40/35; G10L 15/26; G10L 13/08; G10L 15/22
See application file for complete search history.

(56) References Cited

U.S. PATENT DOCUMENTS

| | | | |
|---|---|---|---|
| 8,285,546 B2 | 10/2012 | Reich | |
| 9,094,576 B1 | 7/2015 | Karakotsios | |
| 9,384,185 B2 | 7/2016 | Medlock et al. | |

(Continued)

FOREIGN PATENT DOCUMENTS

| | | |
|---|---|---|
| AU | 2011205426 A1 | 8/2012 |
| WO | 2015/157013 A1 | 10/2015 |

OTHER PUBLICATIONS

Shen et al., "Style Transfer from Non-Parallel Text by Cross-Alignment", 31st Conference on Neural Information Processing Systems (NIPS 2017), Long Beach, CA, USA, 2017, 12 pages.

(Continued)

*Primary Examiner* — Angela A Armstrong
(74) *Attorney, Agent, or Firm* — YHE Law LLP

(57) ABSTRACT

Systems and processes for delegating tasks to electronic devices based on intents and associated applications are provided. For example, receiving an input from a user at an electronic device, wherein the input is associated with an intent and determining, based on the intent, an intent type. In accordance with a determination that the intent type is a first type, causing a digital assistant to perform an action associated with the intent, and in accordance with a determination that the intent type is a second type, different than the first type, transmitting instructions to a model remote to the electronic device, wherein the instructions cause the model to perform an action associated with the intent.

45 Claims, 33 Drawing Sheets

Related U.S. Application Data provisional application No. 63/569,092, filed on Mar. 22, 2024.

(56) References Cited

U.S. PATENT DOCUMENTS

| | | | |
|---|---|---|---|
| 9,484,021 | B1 | 11/2016 | Mairesse et al. |
| 10,229,356 | B1 | 3/2019 | Liu et al. |
| 11,195,534 | B1 * | 12/2021 | Shen ........................ G10L 17/00 |
| 11,302,310 | B1 | 4/2022 | Gandhe et al. |
| 11,347,525 | B1 | 5/2022 | Graham et al. |
| 2009/0060351 | A1 | 3/2009 | Li et al. |
| 2011/0004475 | A1 | 1/2011 | Bellegarda |
| 2011/0191271 | A1 | 8/2011 | Baker et al. |
| 2013/0288722 | A1 | 10/2013 | Ramanujam et al. |
| 2014/0019133 | A1 | 1/2014 | Bao et al. |
| 2014/0188768 | A1 | 7/2014 | Bonissone et al. |
| 2015/0006199 | A1 | 1/2015 | Snider et al. |
| 2016/0322043 | A1 | 11/2016 | Bellegarda |
| 2017/0068423 | A1 * | 3/2017 | Napolitano ...... H04N 21/41265 |
| 2017/0083285 | A1 * | 3/2017 | Meyers ................. G10L 15/222 |
| 2017/0278514 | A1 | 9/2017 | Mathias et al. |
| 2018/0157992 | A1 | 6/2018 | Susskind et al. |
| 2020/0272485 | A1 | 8/2020 | Karashchuk et al. |
| 2021/0117623 | A1 | 4/2021 | Aly et al. |
| 2021/0119955 | A1 | 4/2021 | Penov et al. |
| 2021/0365863 | A1 | 11/2021 | Friske et al. |
| 2022/0035999 | A1 | 2/2022 | Pawelec |
| 2022/0051342 | A1 | 2/2022 | Brandmaier et al. |
| 2022/0157318 | A1 | 5/2022 | Sharifi et al. |
| 2022/0343066 | A1 | 10/2022 | Kwong et al. |
| 2023/0197078 | A1 | 6/2023 | Bobbili et al. |

OTHER PUBLICATIONS

Extended European Search Report received for European Patent Application No. 25164333.4, mailed on Apr. 22, 2025, 11 pages.

International Search Report and Written Opinion received for PCT Patent Application No. PCT/US2025/019388, mailed on May 16, 2025, 21 pages.

* cited by examiner

Image/Document Upload

PROCESSING REQUESTS USING A DIGITAL ASSISTANT AND A REMOTE MODEL

CROSS-REFERENCE TO RELATED APPLICATIONS

This application claims priority to (1) U.S. Provisional Patent Application Ser. No. 63/569,092, filed on Mar. 22, 2024, entitled "PROCESSING REQUESTS USING A LOCAL MODEL AND A REMOTE MODEL," (2) U.S. Provisional Patent Application Ser. No. 63/631,400, filed on Apr. 8, 2024, entitled "PROCESSING REQUESTS USING A DIGITAL ASSISTANT AND A REMOTE MODEL," (3) U.S. Provisional Patent Application Ser. No. 63/657,724, filed on Jun. 7, 2024, entitled "PROCESSING REQUESTS USING A DIGITAL ASSISTANT AND A REMOTE MODEL," (4) U.S. Provisional Patent Application Ser. No. 63/670,038, filed on Jul. 11, 2024, entitled "PROCESSING REQUESTS USING A DIGITAL ASSISTANT AND A REMOTE MODEL," (5) U.S. Provisional Patent Application Ser. No. 63/691,981, filed on Sep. 6, 2024, entitled "PROCESSING REQUESTS USING A DIGITAL ASSISTANT AND A REMOTE MODEL," all of which are hereby incorporated by reference in their entirety for all purposes.

FIELD

This relates generally to using digital assistants and, more specifically, to processes for a digital assistant to process requests using a remote model.

BACKGROUND

Intelligent automated assistants (or digital assistants) can provide a beneficial interface between human users and electronic devices. Such assistants can allow users to interact with devices or systems using natural language in spoken and/or text forms. For example, a user can provide a speech input containing a user request to a digital assistant operating on an electronic device. The digital assistant can interpret the user's intent from the speech input and operationalize the user's intent into tasks. The tasks can then be performed by executing one or more services of the electronic device, and a relevant output responsive to the user request can be returned to the user.

SUMMARY

Example methods are disclosed herein. An example method includes, at an electronic device: receiving an input from a user, wherein the input is associated with an intent; determining, based on the intent, an intent type; in accordance with a determination that the intent type is a first type: causing a digital assistant to perform an action associated with the intent; in accordance with a determination that the intent type is a second type, different than the first type: transmitting instructions to a model remote to the electronic device, wherein the instructions cause the model to perform an action associated with the intent.

Example non-transitory computer-readable media are disclosed herein. An example non-transitory computer-readable storage medium stores one or more programs. The one or more programs are configured to be executed by one or more processors of an electronic device that is in communication with a display generation component and one or more input devices, the one or more programs including instructions for: receiving an input from a user, wherein the input is associated with an intent; determining, based on the intent, an intent type; in accordance with a determination that the intent type is a first type: causing a digital assistant to perform an action associated with the intent; in accordance with a determination that the intent type is a second type, different than the first type: transmitting instructions to a model remote to the electronic device, wherein the instructions cause the model to perform an action associated with the intent.

Example transitory computer-readable media are disclosed herein. An example transitory computer-readable storage medium stores one or more programs. The one or more programs are configured to be executed by one or more processors of an electronic device that is in communication with a display generation component and one or more input devices, the one or more programs including instructions for: receiving an input from a user, wherein the input is associated with an intent; determining, based on the intent, an intent type; in accordance with a determination that the intent type is a first type: causing a digital assistant to perform an action associated with the intent; in accordance with a determination that the intent type is a second type, different than the first type: transmitting instructions to a model remote to the electronic device, wherein the instructions cause the model to perform an action associated with the intent.

Example electronic devices are disclosed herein. An example electronic device comprises a display generation component; one or more processors; a memory; and one or more programs, where the one or more programs are stored in the memory and configured to be executed by the one or more processors, the one or more programs including instructions for: receiving an input from a user, wherein the input is associated with an intent; determining, based on the intent, an intent type; in accordance with a determination that the intent type is a first type: causing a digital assistant to perform an action associated with the intent; in accordance with a determination that the intent type is a second type, different than the first type: transmitting instructions to a model remote to the electronic device, wherein the instructions cause the model to perform an action associated with the intent.

Example electronic devices are disclosed herein. An example electronic device comprises: means for receiving an input from a user, wherein the input is associated with an intent; means for determining, based on the intent, an intent type; means for, in accordance with a determination that the intent type is a first type: causing a digital assistant to perform an action associated with the intent; means for, in accordance with a determination that the intent type is a second type, different than the first type: transmitting instructions to a model remote to the electronic device, wherein the instructions cause the model to perform an action associated with the intent.

Example computer program products are disclosed herein. An example computer program product comprises: one or more programs configured to be executed by one or more processors of an electronic device that is in communication with a display generation component and one or more input devices, the one or more programs including instructions for: receiving an input from a user, wherein the input is associated with an intent; determining, based on the intent, an intent type; in accordance with a determination that the intent type is a first type: causing a digital assistant to perform an action associated with the intent; in accordance with a determination that the intent type is a second type, different than the first type: transmitting instructions to a model remote to the electronic device, wherein the instructions cause the model to perform an action associated with the intent.

In some examples, causing a digital assistant to perform an action associated with the intent when the intent is a first type and transmitting instructions to a model remote to the electronic device when the intent is a second type improves conserves battery life and memory on the user's local device by minimizing the intents the local digital assistant can handle and delegating specific processes to a remote model.

Example methods are disclosed herein. An example method includes, at an electronic device: receiving an input, wherein the input is associated with an intent; determining, based on the input, an intent type; in accordance with a determination that the intent type is a knowledge seeking intent type: determining if a first digital assistant can satisfy the intent; in accordance with a determination that the first digital assistant can satisfy the intent: performing an action associated with the intent using the first digital assistant; and in accordance with a determination that the first digital assistant cannot satisfy the intent: transmitting instructions to a model different than the first digital assistant and remote to the electronic device, wherein the instructions cause the electronic device to perform the action associated with the intent.

Example non-transitory computer-readable media are disclosed herein. An example non-transitory computer-readable storage medium stores one or more programs. The one or more programs are configured to be executed by one or more processors of an electronic device that is in communication with a display generation component and one or more input devices, the one or more programs including instructions for: receiving an input, wherein the input is associated with an intent; determining, based on the input, an intent type; in accordance with a determination that the intent type is a knowledge seeking intent type: determining if a first digital assistant can satisfy the intent; in accordance with a determination that the first digital assistant can satisfy the intent: performing an action associated with the intent using the first digital assistant; and in accordance with a determination that the first digital assistant cannot satisfy the intent: transmitting instructions to a model different than the first digital assistant and remote to the electronic device, wherein the instructions cause the electronic device to perform the action associated with the intent.

Example transitory computer-readable media are disclosed herein. An example transitory computer-readable storage medium stores one or more programs. The one or more programs are configured to be executed by one or more processors of an electronic device that is in communication with a display generation component and one or more input devices, the one or more programs including instructions for: receiving an input, wherein the input is associated with an intent; determining, based on the input, an intent type; in accordance with a determination that the intent type is a knowledge secking intent type: determining if a first digital assistant can satisfy the intent; in accordance with a determination that the first digital assistant can satisfy the intent: performing an action associated with the intent using the first digital assistant; and in accordance with a determination that the first digital assistant cannot satisfy the intent: transmitting instructions to a model different than the first digital assistant and remote to the electronic device, wherein the instructions cause the electronic device to perform the action associated with the intent.

Example electronic devices are disclosed herein. An example electronic device comprises a display generation component; one or more processors; a memory; and one or more programs, where the one or more programs are stored in the memory and configured to be executed by the one or more processors, the one or more programs including instructions for: receiving an input, wherein the input is associated with an intent; determining, based on the input, an intent type; in accordance with a determination that the intent type is a knowledge seeking intent type: determining if a first digital assistant can satisfy the intent; in accordance with a determination that the first digital assistant can satisfy the intent: performing an action associated with the intent using the first digital assistant; and in accordance with a determination that the first digital assistant cannot satisfy the intent: transmitting instructions to a model different than the first digital assistant and remote to the electronic device, wherein the instructions cause the electronic device to perform the action associated with the intent.

Example electronic devices are disclosed herein. An example electronic device comprises: means for receiving an input, wherein the input is associated with an intent; means for determining, based on the input, an intent type; means for in accordance with a determination that the intent type is a knowledge seeking intent type: determining if a first digital assistant can satisfy the intent; means for, in accordance with a determination that the first digital assistant can satisfy the intent: performing an action associated with the intent using the first digital assistant; and means for in accordance with a determination that the first digital assistant cannot satisfy the intent: transmitting instructions to a model different than the first digital assistant and remote to the electronic device, wherein the instructions cause the electronic device to perform the action associated with the intent.

Example computer program products are disclosed herein. An example computer program product comprises: one or more programs configured to be executed by one or more processors of an electronic device that is in communication with a display generation component and one or more input devices, the one or more programs including instructions for: receiving an input, wherein the input is associated with an intent; determining, based on the input, an intent type; in accordance with a determination that the intent type is a knowledge seeking intent type: determining if a first digital assistant can satisfy the intent; in accordance with a determination that the first digital assistant can satisfy the intent: performing an action associated with the intent using the first digital assistant; and in accordance with a determination that the first digital assistant cannot satisfy the intent: transmitting instructions to a model different than the first digital assistant and remote to the electronic device, wherein the instructions cause the electronic device to perform the action associated with the intent.

In some examples, in accordance with a determination that the intent type is a knowledge seeking type, determining if a first digital assistant can satisfy the intent protects user's privacy by minimizing the transfer of information to other models and/or remote device when a local digital assistant can handle the request (e.g., on device).

In some examples, in accordance with a determination that the first digital assistant cannot satisfy the intent: transmitting instructions to a model different than the first digital assistant and remote to the electronic device improves the operability of the electronic device by initiating performance of a task on a remote device when a local digital assistant cannot satisfy the intent.

Example methods are disclosed herein. An example method includes, at an electronic device: receiving a first request associated with an intent from a software application; in accordance with a determination that a session has not been created: identifying a model based on the intent; creating the session, using an API, with the identified model; receiving a second request with a second intent from the software application; transmitting the second request to the identified model via the session, wherein transmitting the second request causes the identified model to: generate a response to the second request; and store the response and the second request; receiving the response from the identified model via the session; transmitting the response to the software application; receiving a third request, wherein the third request is a follow-up request to the second request; transmitting the third request to the identified model via the session, wherein transmitting the third request causes the identified model to: generate a second response to the third request based on the stored response and/or the stored second request; receiving the second response from the identified model via the session; and transmitting the second response to the software application.

Example non-transitory computer-readable media are disclosed herein. An example non-transitory computer-readable storage medium stores one or more programs. The one or more programs are configured to be executed by one or more processors of an electronic device that is in communication with a display generation component and one or more input devices, the one or more programs including instructions for: receiving a first request associated with an intent from a software application; in accordance with a determination that a session has not been created: identifying a model based on the intent; creating the session, using an API, with the identified model; receiving a second request with a second intent from the software application; transmitting the second request to the identified model via the session, wherein transmitting the second request causes the identified model to: generate a response to the second request; and store the response and the second request; receiving the response from the identified model via the session; transmitting the response to the software application; receiving a third request, wherein the third request is a follow-up request to the second request; transmitting the third request to the identified model via the session, wherein transmitting the third request causes the identified model to: generate a second response to the third request based on the stored response and/or the stored second request; receiving the second response from the identified model via the session; and transmitting the second response to the software application.

Example transitory computer-readable media are disclosed herein. An example transitory computer-readable storage medium stores one or more programs. The one or more programs are configured to be executed by one or more processors of an electronic device that is in communication with a display generation component and one or more input devices, the one or more programs including instructions for: receiving a first request associated with an intent from a software application; in accordance with a determination that a session has not been created: identifying a model based on the intent; creating the session, using an API, with the identified model; receiving a second request with a second intent from the software application; transmitting the second request to the identified model via the session, wherein transmitting the second request causes the identified model to: generate a response to the second request; and store the response and the second request; receiving the response from the identified model via the session; transmitting the response to the software application; receiving a third request, wherein the third request is a follow-up request to the second request; transmitting the third request to the identified model via the session, wherein transmitting the third request causes the identified model to: generate a second response to the third request based on the stored response and/or the stored second request; receiving the second response from the identified model via the session; and transmitting the second response to the software application.

Example electronic devices are disclosed herein. An example electronic device comprises a display generation component; one or more processors; a memory; and one or more programs, where the one or more programs are stored in the memory and configured to be executed by the one or more processors, the one or more programs including instructions for: receiving a first request associated with an intent from a software application; in accordance with a determination that a session has not been created: identifying a model based on the intent; creating the session, using an API, with the identified model; receiving a second request with a second intent from the software application; transmitting the second request to the identified model via the session, wherein transmitting the second request causes the identified model to: generate a response to the second request; and store the response and the second request; receiving the response from the identified model via the session; transmitting the response to the software application; receiving a third request, wherein the third request is a follow-up request to the second request; transmitting the third request to the identified model via the session, wherein transmitting the third request causes the identified model to: generate a second response to the third request based on the stored response and/or the stored second request; receiving the second response from the identified model via the session; and transmitting the second response to the software application.

Example electronic devices are disclosed herein. An example electronic device comprises: means for receiving a first request associated with an intent from a software application; in accordance with a determination that a session has not been created: means for identifying a model based on the intent; creating the session, using an API, with the identified model; means for receiving a second request with a second intent from the software application; means for transmitting the second request to the identified model via the session, wherein transmitting the second request causes the identified model to: generate a response to the second request; and store the response and the second request; receiving the response from the identified model via the session; means for transmitting the response to the software application; means for receiving a third request, wherein the third request is a follow-up request to the second request; means for transmitting the third request to the identified model via the session, wherein transmitting the third request causes the identified model to: generate a second response to the third request based on the stored response and/or the stored second request; means for receiving the second response from the identified model via the session; and means for transmitting the second response to the software application.

Example computer program products are disclosed herein. An example computer program product comprises: one or more programs configured to be executed by one or more processors of an electronic device that is in communication with a display generation component and one or more input devices, the one or more programs including instructions for: receiving a first request associated with an intent from a software application; in accordance with a determination that a session has not been created: identifying a model based on the intent; creating the session, using an API, with the identified model; receiving a second request with a second intent from the software application; transmitting the second request to the identified model via the session, wherein transmitting the second request causes the identified model to: generate a response to the second request; and store the response and the second request; receiving the response from the identified model via the session; transmitting the response to the software application; receiving a third request, wherein the third request is a follow-up request to the second request; transmitting the third request to the identified model via the session, wherein transmitting the third request causes the identified model to: generate a second response to the third request based on the stored response and/or the stored second request; receiving the second response from the identified model via the session; and transmitting the second response to the software application.

In some examples, generating a second response to the third request based on the stored response and/or the stored second request conserves processing power and battery life by leveraging previous requests to more rapidly and efficiently respond to follow-up requests than without leveraging previous requests.

In some examples, creating the session with the identified model, generating the second response and storing the response and/or the second request conserves processing power and battery life on the electronic device by reducing the necessary amount of data to be transmitted in follow-up requests because the identified model that is satisfying the follow-up request already has access to previous responses which can be used to efficiently generate a second response.

DETAILED DESCRIPTION

In the following description of examples, reference is made to the accompanying drawings in which are shown by way of illustration specific examples that can be practiced. It is to be understood that other examples can be used and structural changes can be made without departing from the scope of the various examples.

Although the following description uses terms “first,” “second,” etc. to describe various elements, these elements should not be limited by the terms. These terms are only used to distinguish one element from another. For example, a first input could be termed a second input, and, similarly, a second input could be termed a first input, without departing from the scope of the various described examples. The first input and the second input are both inputs and, in some cases, are separate and different inputs.

The terminology used in the description of the various described examples herein is for the purpose of describing particular examples only and is not intended to be limiting. As used in the description of the various described examples and the appended claims, the singular forms “a,” “an,” and “the” are intended to include the plural forms as well, unless the context clearly indicates otherwise. It will also be understood that the term “and/or” as used herein refers to and encompasses any and all possible combinations of one or more of the associated listed items. It will be further understood that the terms “includes,” “including,” “comprises,” and/or “comprising,” when used in this specification, specify the presence of stated features, integers, steps, operations, elements, and/or components, but do not preclude the presence or addition of one or more other features, integers, steps, operations, elements, components, and/or groups thereof.

The term “if” may be construed to mean “when” or “upon” or “in response to determining” or “in response to detecting,” depending on the context. Similarly, the phrase “if it is determined” or “if [a stated condition or event] is detected" may be construed to mean "upon determining" or "in response to determining" or "upon detecting [the stated condition or event]" or "in response to detecting [the stated condition or event]," depending on the context.

1. System and Environment

Figure 1:
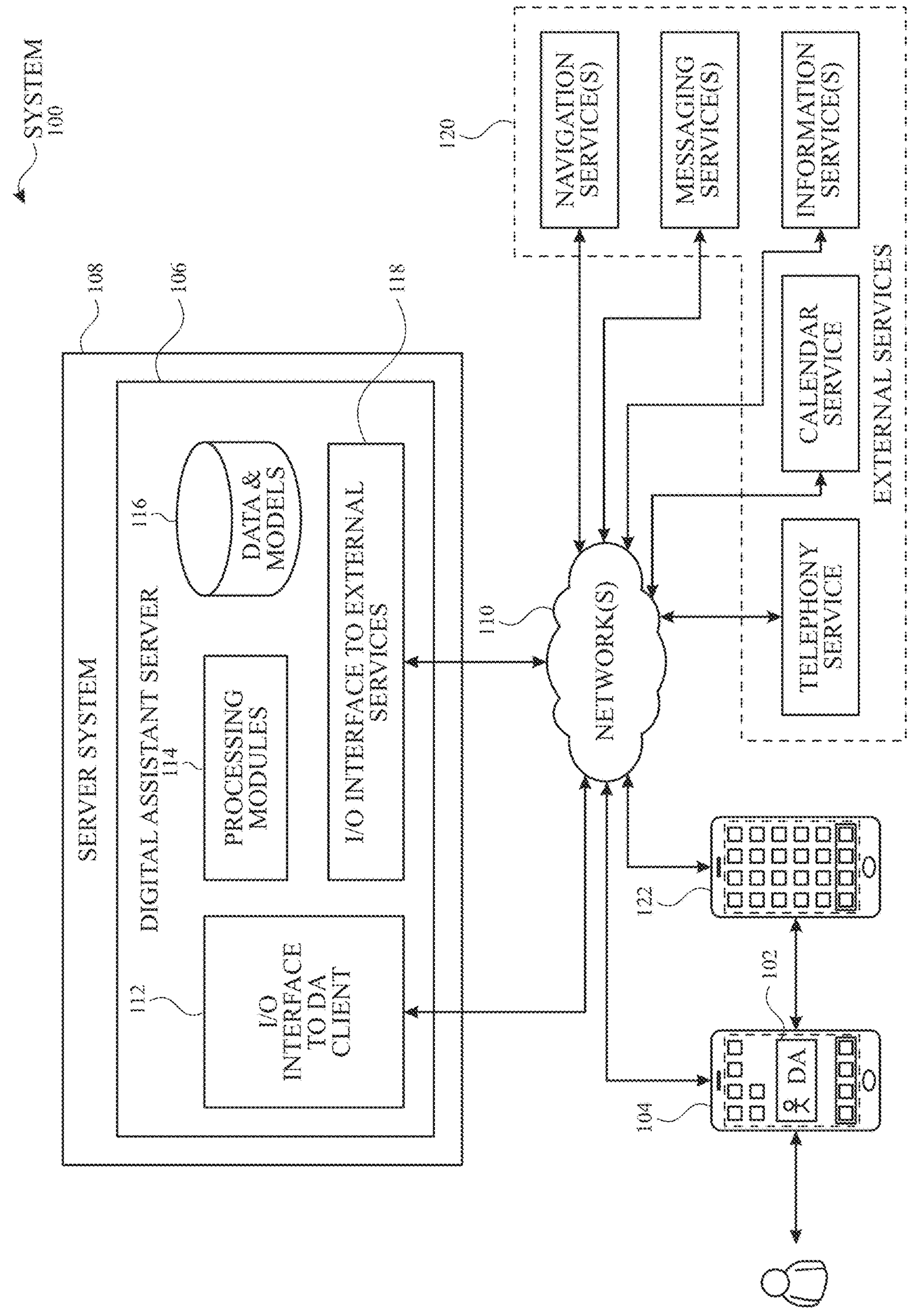
FIG. 1 is a block diagram illustrating a system and environment for implementing a digital assistant, according to various examples.

FIG. 1 illustrates a block diagram of system 100 according to various examples. In some examples, system 100 implements a digital assistant. The terms "digital assistant," "virtual assistant," "intelligent automated assistant," or "automatic digital assistant" refer to any information processing system that interprets natural language input in spoken and/or textual form to infer user intent, and performs actions based on the inferred user intent. For example, to act on an inferred user intent, the system performs one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form.

Specifically, a digital assistant is capable of accepting a user request at least partially in the form of a natural language command, request, statement, narrative, and/or inquiry. Typically, the user request seeks either an informational answer or performance of a task by the digital assistant. A satisfactory response to the user request includes a provision of the requested informational answer, a performance of the requested task, or a combination of the two. For example, a user asks the digital assistant a question, such as "Where am I right now?" Based on the user's current location, the digital assistant answers, "You are in Central Park near the west gate." The user also requests the performance of a task, for example, "Please invite my friends to my girlfriend's birthday party next week." In response, the digital assistant can acknowledge the request by saying "Yes, right away," and then send a suitable calendar invite on behalf of the user to each of the user's friends listed in the user's electronic address book. During performance of a requested task, the digital assistant sometimes interacts with the user in a continuous dialogue involving multiple exchanges of information over an extended period of time. There are numerous other ways of interacting with a digital assistant to request information or performance of various tasks. In addition to providing verbal responses and taking programmed actions, the digital assistant also provides responses in other visual or audio forms, e.g., as text, alerts, music, videos, animations, etc.

As shown in FIG. 1, in some examples, a digital assistant is implemented according to a client-server model. The digital assistant includes client-side portion 102 (hereafter "DA client 102") executed on user device 104 and server-side portion 106 (hereafter "DA server 106") executed on server system 108. DA client 102 communicates with DA server 106 through one or more networks 110. DA client 102 provides client-side functionalities such as user-facing input and output processing and communication with DA server 106. DA server 106 provides server-side functionalities for any number of DA clients 102 each residing on a respective user device 104.

In some examples, DA server 106 includes client-facing I/O interface 112, one or more processing modules 114, data and models 116, and I/O interface to external services 118. The client-facing I/O interface 112 facilitates the client-facing input and output processing for DA server 106. One or more processing modules 114 utilize data and models 116 to process speech input and determine the user's intent based on natural language input. Further, one or more processing modules 114 perform task execution based on inferred user intent. In some examples, DA server 106 communicates with external services 120 through network(s) 110 for task completion or information acquisition. I/O interface to external services 118 facilitates such communications.

User device 104 can be any suitable electronic device. In some examples, user device 104 is a portable multifunctional device (e.g., device 200, described below with reference to FIG. 2A), a multifunctional device (e.g., device 400, described below with reference to FIG. 4A), or a personal electronic device (e.g., device 600, described below with reference to FIGS. 6A-6B.) A portable multifunctional device is, for example, a mobile telephone that also contains other functions, such as PDA and/or music player functions. Specific examples of portable multifunction devices include the Apple Watch®, iPhone®, iPod Touch®, and iPad® devices from Apple Inc. of Cupertino, California. Other examples of portable multifunction devices include, without limitation, earphones/headphones, speakers, and laptop or tablet computers. Further, in some examples, user device 104 is a non-portable multifunctional device. In particular, user device 104 is a desktop computer, a game console, a speaker, a television, or a television set-top box. In some examples, user device 104 includes a touch-sensitive surface (e.g., touch screen displays and/or touchpads). Further, user device 104 optionally includes one or more other physical user-interface devices, such as a physical keyboard, a mouse, and/or a joystick. Various examples of electronic devices, such as multifunctional devices, are described below in greater detail.

Examples of communication network(s) 110 include local area networks (LAN) and wide area networks (WAN), e.g., the Internet. Communication network(s) 110 is implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VOIP), Wi-MAX, or any other suitable communication protocol.

Server system 108 is implemented on one or more standalone data processing apparatus or a distributed network of computers. In some examples, server system 108 also employs various virtual devices and/or services of third-party service providers (e.g., third-party cloud service providers) to provide the underlying computing resources and/or infrastructure resources of server system 108.

In some examples, user device 104 communicates with DA server 106 via second user device 122. Second user device 122 is similar or identical to user device 104. For example, second user device 122 is similar to devices 200, 400, or 600 described below with reference to FIGS. 2A, 4A, and 6A-6B. User device 104 is configured to communicatively couple to second user device 122 via a direct communication connection, such as Bluetooth, NFC, BTLE, or the like, or via a wired or wireless network, such as a local Wi-Fi network. In some examples, second user device 122 is configured to act as a proxy between user device 104 and DA server 106. For example, DA client 102 of user device 104 is configured to transmit information (e.g., a user request received at user device 104) to DA server 106 via second user device 122. DA server 106 processes the information and returns relevant data (e.g., data content responsive to the user request) to user device 104 via second user device 122.

In some examples, user device 104 is configured to communicate abbreviated requests for data to second user device 122 to reduce the amount of information transmitted from user device 104. Second user device 122 is configured to determine supplemental information to add to the abbreviated request to generate a complete request to transmit to DA server 106. This system architecture can advantageously allow user device 104 having limited communication capabilities and/or limited battery power (e.g., a watch or a similar compact electronic device) to access services provided by DA server 106 by using second user device 122, having greater communication capabilities and/or battery power (e.g., a mobile phone, laptop computer, tablet computer, or the like), as a proxy to DA server 106. While only two user devices 104 and 122 are shown in FIG. 1, it should be appreciated that system 100, in some examples, includes any number and type of user devices configured in this proxy configuration to communicate with DA server system 106.

Although the digital assistant shown in FIG. 1 includes both a client-side portion (e.g., DA client 102) and a server-side portion (e.g., DA server 106), in some examples, the functions of a digital assistant are implemented as a standalone application installed on a user device. In addition, the divisions of functionalities between the client and server portions of the digital assistant can vary in different implementations. For instance, in some examples, the DA client is a thin-client that provides only user-facing input and output processing functions, and delegates all other functionalities of the digital assistant to a backend server.

2. Electronic Devices

Figure 2A:
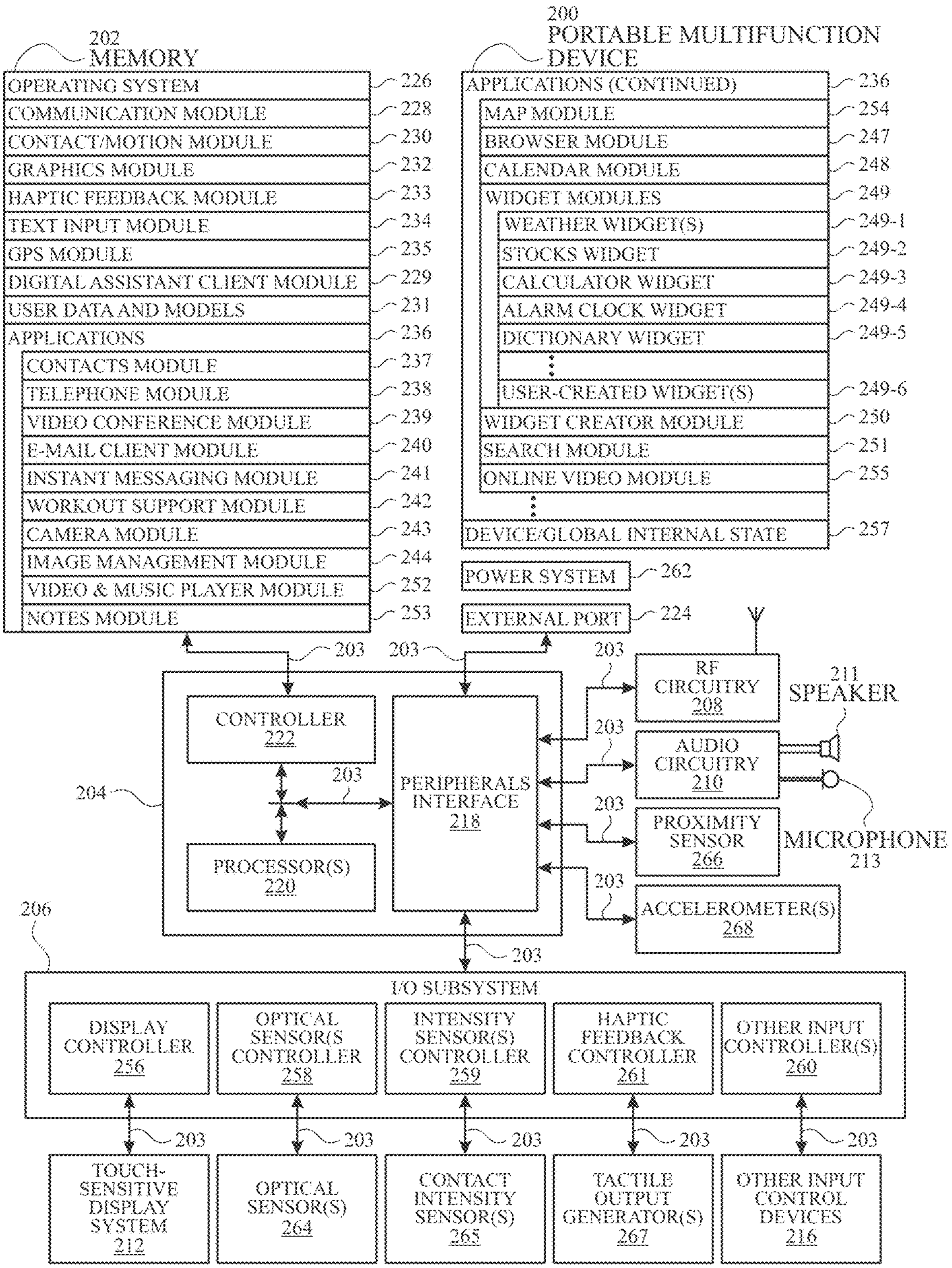
FIG. 2A is a block diagram illustrating a portable multifunction device implementing the client-side portion of a digital assistant, according to various examples.

Attention is now directed toward embodiments of electronic devices for implementing the client-side portion of a digital assistant. FIG. 2A is a block diagram illustrating portable multifunction device 200 with touch-sensitive display system 212 in accordance with some embodiments. Touch-sensitive display 212 is sometimes called a "touch screen" for convenience and is sometimes known as or called a "touch-sensitive display system." Device 200 includes memory 202 (which optionally includes one or more computer-readable storage mediums), memory controller 222, one or more processing units (CPUs) 220, peripherals interface 218, RF circuitry 208, audio circuitry 210, speaker 211, microphone 213, input/output (I/O) subsystem 206, other input control devices 216, and external port 224. Device 200 optionally includes one or more optical sensors 264. Device 200 optionally includes one or more contact intensity sensors 265 for detecting intensity of contacts on device 200 (e.g., a touch-sensitive surface such as touch-sensitive display system 212 of device 200). Device 200 optionally includes one or more tactile output generators 267 for generating tactile outputs on device 200 (e.g., generating tactile outputs on a touch-sensitive surface such as touch-sensitive display system 212 of device 200 or touchpad 455 of device 400). These components optionally communicate over one or more communication buses or signal lines 203.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive suggestion of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 200 is only one example of a portable multifunction device, and that device 200 optionally has more or fewer components than shown, optionally combines two or more components, or optionally has a different configuration or arrangement of the components. The various components shown in FIG. 2A are implemented in hardware, software, or a combination of both hardware and software, including one or more signal processing and/or application-specific integrated circuits.

Memory 202 includes one or more computer-readable storage mediums. The computer-readable storage mediums are, for example, tangible and non-transitory. Memory 202 includes high-speed random access memory and also includes non-volatile memory, such as one or more magnetic disk storage devices, flash memory devices, or other non-volatile solid-state memory devices. Memory controller 222 controls access to memory 202 by other components of device 200.

In some examples, a non-transitory computer-readable storage medium of memory 202 is used to store instructions (e.g., for performing aspects of processes described below) for use by or in connection with an instruction execution system, apparatus, or device, such as a computer-based system, processor-containing system, or other system that can fetch the instructions from the instruction execution system, apparatus, or device and execute the instructions. In other examples, the instructions (e.g., for performing aspects of the processes described below) are stored on a non-transitory computer-readable storage medium (not shown) of the server system 108 or are divided between the non-transitory computer-readable storage medium of memory 202 and the non-transitory computer-readable storage medium of server system 108.

Peripherals interface 218 is used to couple input and output peripherals of the device to CPU 220 and memory 202. The one or more processors 220 run or execute various software programs and/or sets of instructions stored in memory 202 to perform various functions for device 200 and to process data. In some embodiments, peripherals interface 218, CPU 220, and memory controller 222 are implemented on a single chip, such as chip 204. In some other embodiments, they are implemented on separate chips.

RF (radio frequency) circuitry 208 receives and sends RF signals, also called electromagnetic signals. RF circuitry 208 converts electrical signals to/from electromagnetic signals and communicates with communications networks and other communications devices via the electromagnetic signals. RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 208 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VOIP), Wi-MAX, a protocol for e mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 210, speaker 211, and microphone 213 provide an audio interface between a user and device 200. Audio circuitry 210 receives audio data from peripherals interface 218, converts the audio data to an electrical signal, and transmits the electrical signal to speaker 211. Speaker 211 converts the electrical signal to human-audible sound waves. Audio circuitry 210 also receives electrical signals converted by microphone 213 from sound waves. Audio circuitry 210 converts the electrical signal to audio data and transmits the audio data to peripherals interface 218 for processing. Audio data are retrieved from and/or transmitted to memory 202 and/or RF circuitry 208 by peripherals interface 218. In some embodiments, audio circuitry 210 also includes a headset jack (e.g., 312, FIG. 3). The headset jack provides an interface between audio circuitry 210 and removable audio input/output peripherals, such as output-only headphones or a headset with both output (e.g., a headphone for one or both cars) and input (e.g., a microphone).

I/O subsystem 206 couples input/output peripherals on device 200, such as touch screen 212 and other input control devices 216, to peripherals interface 218. I/O subsystem 206 optionally includes display controller 256, optical sensor controller 258, intensity sensor controller 259, haptic feedback controller 261, and one or more input controllers 260 for other input or control devices. The one or more input controllers 260 receive/send electrical signals from/to other input control devices 216. The other input control devices 216 optionally include physical buttons (e.g., push buttons, rocker buttons, etc.), dials, slider switches, joysticks, click wheels, and so forth. In some alternate embodiments, input controller(s) 260 are, optionally, coupled to any (or none) of the following: a keyboard, an infrared port, a USB port, and a pointer device such as a mouse. The one or more buttons (e.g., 308, FIG. 3) optionally include an up/down button for volume control of speaker 211 and/or microphone 213. The one or more buttons optionally include a push button (e.g., 306, FIG. 3).

A quick press of the push button disengages a lock of touch screen 212 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 306) turns power to device 200 on or off. The user is able to customize a functionality of one or more of the buttons. Touch screen 212 is used to implement virtual or soft buttons and one or more soft keyboards.

Touch-sensitive display 212 provides an input interface and an output interface between the device and a user. Display controller 256 receives and/or sends electrical signals from/to touch screen 212. Touch screen 212 displays visual output to the user. The visual output includes graphics, text, icons, video, and any combination thereof (collectively termed "graphics"). In some embodiments, some or all of the visual output correspond to user-interface objects.

Touch screen 212 has a touch-sensitive surface, sensor, or set of sensors that accepts input from the user based on haptic and/or tactile contact. Touch screen 212 and display controller 256 (along with any associated modules and/or sets of instructions in memory 202) detect contact (and any movement or breaking of the contact) on touch screen 212 and convert the detected contact into interaction with user-interface objects (e.g., one or more soft keys, icons, web pages, or images) that are displayed on touch screen 212. In an exemplary embodiment, a point of contact between touch screen 212 and the user corresponds to a finger of the user.

Touch screen 212 uses LCD (liquid crystal display) technology, LPD (light emitting polymer display) technology, or LED (light emitting diode) technology, although other display technologies may be used in other embodiments. Touch screen 212 and display controller 256 detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 212. In an exemplary embodiment, projected mutual capacitance sensing technology is used, such as that found in the iPhone® and iPod Touch® from Apple Inc. of Cupertino, California.

A touch-sensitive display in some embodiments of touch screen 212 is analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 212 displays visual output from device 200, whereas touch-sensitive touchpads do not provide visual output.

A touch-sensitive display in some embodiments of touch screen 212 is as described in the following applications: (1) U.S. patent application Ser. No. 11/381,313, "Mulsuggestionoint Touch Surface Controller," filed May 2, 2006; (2) U.S. patent application Ser. No. 10/840,862, "Mulsuggestionoint Touchscreen," filed May 6, 2004; (3) U.S. patent application Ser. No. 10/904,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 212 has, for example, a video resolution in excess of 100 dpi. In some embodiments, the touch screen has a video resolution of approximately 160 dpi. The user makes contact with touch screen 212 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 200 includes a touchpad (not shown) for activating or deactivating particular functions. In some embodiments, the touchpad is a touch-sensitive area of the device that, unlike the touch screen, does not display visual output. The touchpad is a touch-sensitive surface that is separate from touch screen 212 or an extension of the touch-sensitive surface formed by the touch screen.

Device 200 also includes power system 262 for powering the various components. Power system 262 includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 200 also includes one or more optical sensors 264. FIG. 2A shows an optical sensor coupled to optical sensor controller 258 in I/O subsystem 206. Optical sensor 264 includes charge-coupled device (CCD) or complementary metal-oxide semiconductor (CMOS) phototransistors. Optical sensor 264 receives light from the environment, projected through one or more lenses, and converts the light to data representing an image. In conjunction with imaging module 243 (also called a camera module), optical sensor 264 captures still images or video. In some embodiments, an optical sensor is located on the back of device 200, opposite touch screen display 212 on the front of the device so that the touch screen display is used as a viewfinder for still and/or video image acquisition. In some embodiments, an optical sensor is located on the front of the device so that the user's image is obtained for video conferencing while the user views the other video conference participants on the touch screen display. In some embodiments, the position of optical sensor 264 can be changed by the user (e.g., by rotating the lens and the sensor in the device housing) so that a single optical sensor 264 is used along with the touch screen display for both video conferencing and still and/or video image acquisition.

Device 200 optionally also includes one or more contact intensity sensors 265. FIG. 2A shows a contact intensity sensor coupled to intensity sensor controller 259 in I/O subsystem 206. Contact intensity sensor 265 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 265 receives contact intensity information (e.g., pressure information or a proxy for pressure information) from the environment. In some embodiments, at least one contact intensity sensor is collocated with, or proximate to, a touch-sensitive surface (e.g., touch-sensitive display system 212). In some embodiments, at least one contact intensity sensor is located on the back of device 200, opposite touch screen display 212, which is located on the front of device 200.

Device 200 also includes one or more proximity sensors 266. FIG. 2A shows proximity sensor 266 coupled to peripherals interface 218. Alternately, proximity sensor 266 is coupled to input controller 260 in I/O subsystem 206. Proximity sensor 266 is performed as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 212 when the multifunction device is placed near the user's ear (e.g., when the user is making a phone call).

Device 200 optionally also includes one or more tactile output generators 267. FIG. 2A shows a tactile output generator coupled to haptic feedback controller 261 in I/O subsystem 206. Tactile output generator 267 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 265 receives tactile feedback generation instructions from haptic feedback module 233 and generates tactile outputs on device 200 that are capable of being sensed by a user of device 200. In some embodiments, at least one tactile output generator is collocated with, or proximate to, a touch-sensitive surface (e.g., touch-sensitive display system 212) and, optionally, generates a tactile output by moving the touch-sensitive surface vertically (e.g., in/out of a surface of device 200) or laterally (e.g., back and forth in the same plane as a surface of device 200). In some embodiments, at least one tactile output generator sensor is located on the back of device 200, opposite touch screen display 212, which is located on the front of device 200.

Device 200 also includes one or more accelerometers 268. FIG. 2A shows accelerometer 268 coupled to peripherals interface 218. Alternately, accelerometer 268 is coupled to an input controller 260 in I/O subsystem 206. Accelerometer 268 performs, for example, as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 200 optionally includes, in addition to accelerometer(s) 268, a magnetometer (not shown) and a GPS (or GLONASS or other global navigation system) receiver (not shown) for obtaining information concerning the location and orientation (e.g., portrait or landscape) of device 200.

Figure 4A:
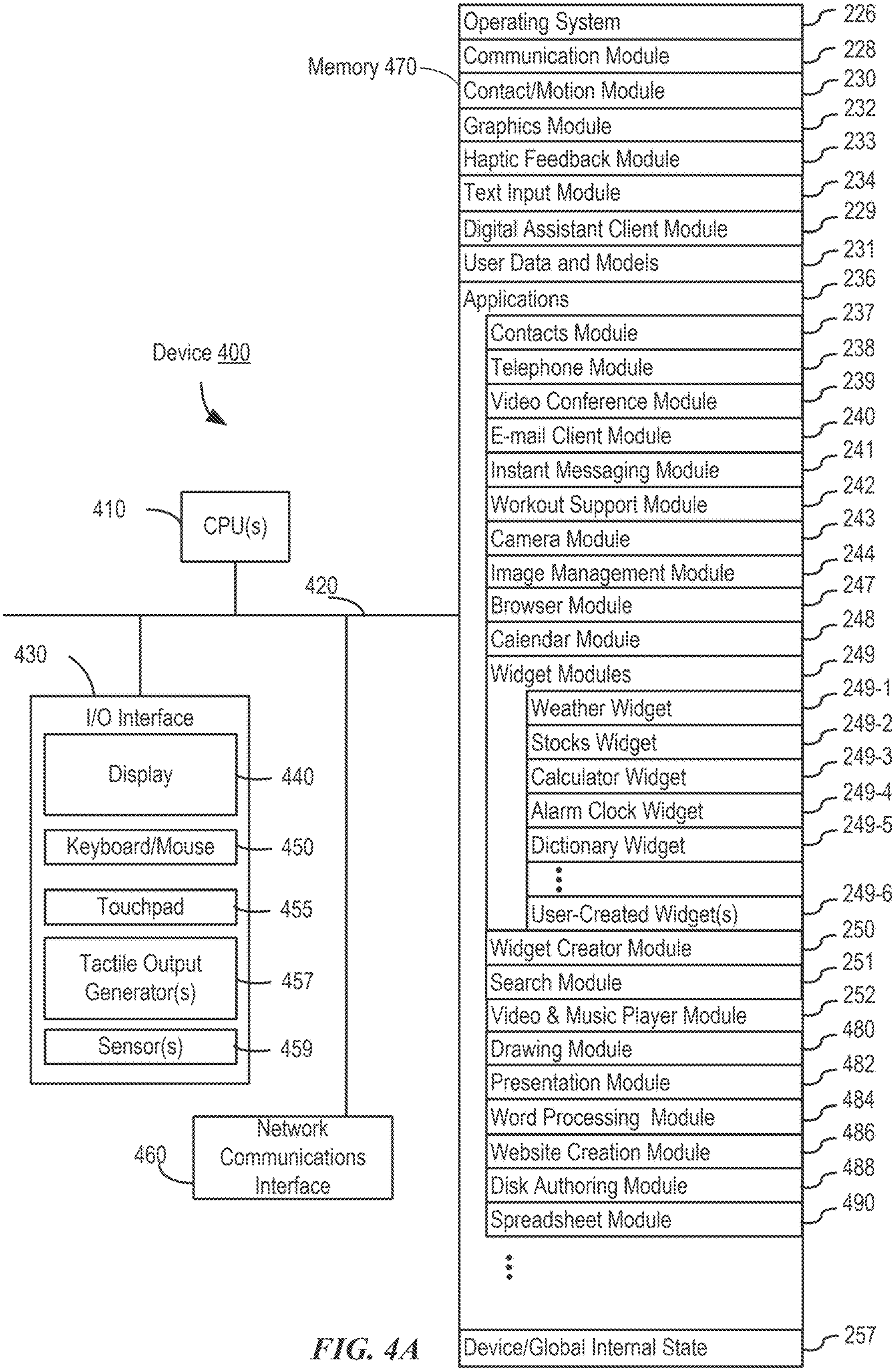
FIG. 4A is a block diagram of an exemplary multifunction device with a display and a touch-sensitive surface, according to various examples.

In some embodiments, the software components stored in memory 202 include operating system 226, communication module (or set of instructions) 228, contact/motion module (or set of instructions) 230, graphics module (or set of instructions) 232, text input module (or set of instructions) 234, Global Positioning System (GPS) module (or set of instructions) 235, Digital Assistant Client Module 229, and applications (or sets of instructions) 236. Further, memory 202 stores data and models, such as user data and models 231. Furthermore, in some embodiments, memory 202 (FIG. 2A) or 470 (FIG. 4A) stores device/global internal state 257, as shown in FIGS. 2A and 4A. Device/global internal state 257 includes one or more of: active application state, indicating which applications, if any, are currently active; display state, indicating what applications, views or other information occupy various regions of touch screen display 212; sensor state, including information obtained from the device's various sensors and input control devices 216; and location information concerning the device's location and/or attitude.

Operating system 226 (e.g., Darwin, RTXC, LINUX, UNIX, OS X, IOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 228 facilitates communication with other devices over one or more external ports 224 and also includes various software components for handling data received by RF circuitry 208 and/or external port 224. External port 224 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 230 optionally detects contact with touch screen 212 (in conjunction with display controller 256) and other touch-sensitive devices (e.g., a touchpad or physical click wheel). Contact/motion module 230 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 230 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 230 and display controller 256 detect contact on a touchpad.

In some embodiments, contact/motion module 230 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 200). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 230 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 232 includes various known software components for rendering and displaying graphics on touch screen 212 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 232 stores data representing graphics to be used. Each graphic is, optionally, assigned a corresponding code. Graphics module 232 receives, from applications etc., one or more codes specifying graphics to be displayed along with, if necessary, coordinate data and other graphic property data, and then generates screen image data to output to display controller 256.

Haptic feedback module 233 includes various software components for generating instructions used by tactile output generator(s) 267 to produce tactile outputs at one or more locations on device 200 in response to user interactions with device 200.

Text input module 234, which is, in some examples, a component of graphics module 232, provides soft keyboards for entering text in various applications (e.g., contacts module 237, email client module 240, instant messaging (IM) module 241, browser module 247, and any other application that needs text input).

GPS module 235 determines the location of the device and provides this information for use in various applications (e.g., to telephone module 238 for use in location-based dialing; to camera module 243 as picture/video metadata; and to applications that provide location-based services such as weather widgets, local yellow page widgets, and map/navigation widgets).

Digital assistant client module 229 includes various client-side digital assistant instructions to provide the client-side functionalities of the digital assistant. For example, digital assistant client module 229 is capable of accepting voice input (e.g., speech input), text input, touch input, and/or gestural input through various user interfaces (e.g., microphone 213, accelerometer(s) 268, touch-sensitive display system 212, optical sensor(s) 264, other input control devices 216, etc.) of portable multifunction device 200. Digital assistant client module 229 is also capable of providing output in audio (e.g., speech output), visual, and/or tactile forms through various output interfaces (e.g., speaker 211, touch-sensitive display system 212, tactile output generator(s) 267, etc.) of portable multifunction device 200. For example, output is provided as voice, sound, alerts, text messages, menus, graphics, videos, animations, vibrations, and/or combinations of two or more of the above. During operation, digital assistant client module 229 communicates with DA server 106 using RF circuitry 208.

User data and models 231 include various data associated with the user (e.g., user-specific vocabulary data, user preference data, user-specified name pronunciations, data from the user's electronic address book, to-do lists, shopping lists, etc.) to provide the client-side functionalities of the digital assistant. Further, user data and models 231 include various models (e.g., speech recognition models, statistical language models, natural language processing models, ontology, task flow models, service models, etc.) for processing user input and determining user intent.

In some examples, digital assistant client module 229 utilizes the various sensors, subsystems, and peripheral devices of portable multifunction device 200 to gather additional information from the surrounding environment of the portable multifunction device 200 to establish a context associated with a user, the current user interaction, and/or the current user input. In some examples, digital assistant client module 229 provides the contextual information or a subset thereof with the user input to DA server 106 to help infer the user's intent. In some examples, the digital assistant also uses the contextual information to determine how to prepare and deliver outputs to the user. Contextual information is referred to as context data.

In some examples, the contextual information that accompanies the user input includes sensor information, e.g., lighting, ambient noise, ambient temperature, images or videos of the surrounding environment, etc. In some examples, the contextual information can also include the physical state of the device, e.g., device orientation, device location, device temperature, power level, speed, acceleration, motion patterns, cellular signals strength, etc. In some examples, information related to the software state of DA server 106, e.g., running processes, installed programs, past and present network activities, background services, error logs, resources usage, etc., and of portable multifunction device 200 is provided to DA server 106 as contextual information associated with a user input.

In some examples, the digital assistant client module 229 selectively provides information (e.g., user data 231) stored on the portable multifunction device 200 in response to requests from DA server 106. In some examples, digital assistant client module 229 also elicits additional input from the user via a natural language dialogue or other user interfaces upon request by DA server 106. Digital assistant client module 229 passes the additional input to DA server 106 to help DA server 106 in intent deduction and/or fulfillment of the user's intent expressed in the user request.

A more detailed description of a digital assistant is described below with reference to FIGS. 7A-7C. It should be recognized that digital assistant client module 229 can include any number of the sub-modules of digital assistant module 726 described below.

Applications 236 include the following modules (or sets of instructions), or a subset or superset thereof:

- Contacts module 237 (sometimes called an address book or contact list);
- Telephone module 238;
- Video conference module 239;
- E-mail client module 240;
- Instant messaging (IM) module 241;
- Workout support module 242;
- Camera module 243 for still and/or video images;
- Image management module 244;
- Video player module;
- Music player module;
- Browser module 247;
- Calendar module 248;
- Widget modules 249, which includes, in some examples, one or more of: weather widget 249-1, stocks widget 249-2, calculator widget 249-3, alarm clock widget 249-4, dictionary widget 249-5, and other widgets obtained by the user, as well as user-created widgets 249-6;
- Widget creator module 250 for making user-created widgets 249-6;
- Search module 251;
- Video and music player module 252, which merges video player module and music player module;
- Notes module 253;
- Map module 254; and/or
- Online video module 255.

Examples of other applications 236 that are stored in memory 202 include other word processing applications, other image editing applications, drawing applications, presentation applications, JAVA-enabled applications, encryption, digital rights management, voice recognition, and voice replication.

In conjunction with touch screen 212, display controller 256, contact/motion module 230, graphics module 232, and text input module 234, contacts module 237 are used to manage an address book or contact list (e.g., stored in application internal state 292 of contacts module 237 in memory 202 or memory 470), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 238, video conference module 239, e-mail client module 240, or IM 241; and so forth.

In conjunction with RF circuitry 208, audio circuitry 210, speaker 211, microphone 213, touch screen 212, display controller 256, contact/motion module 230, graphics module 232, and text input module 234, telephone module 238 are used to enter a sequence of characters corresponding to a telephone number, access one or more telephone numbers in contacts module 237, modify a telephone number that has been entered, dial a respective telephone number, conduct a conversation, and disconnect or hang up when the conversation is completed. As noted above, the wireless communication uses any of a plurality of communications standards, protocols, and technologies.

In conjunction with RF circuitry 208, audio circuitry 210, speaker 211, microphone 213, touch screen 212, display controller 256, optical sensor 264, optical sensor controller 258, contact/motion module 230, graphics module 232, text input module 234, contacts module 237, and telephone module 238, video conference module 239 includes executable instructions to initiate, conduct, and terminate a video conference between a user and one or more other participants in accordance with user instructions.

In conjunction with RF circuitry 208, touch screen 212, display controller 256, contact/motion module 230, graphics module 232, and text input module 234, e-mail client module 240 includes executable instructions to create, send, receive, and manage e-mail in response to user instructions. In conjunction with image management module 244, e-mail client module 240 makes it very easy to create and send e-mails with still or video images taken with camera module 243.

In conjunction with RF circuitry 208, touch screen 212, display controller 256, contact/motion module 230, graphics module 232, and text input module 234, the instant messaging module 241 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 208, touch screen 212, display controller 256, contact/motion module 230, graphics module 232, text input module 234, GPS module 235, map module 254, and music player module, workout support module 242 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 212, display controller 256, optical sensor(s) 264, optical sensor controller 258, contact/motion module 230, graphics module 232, and image management module 244, camera module 243 includes executable instructions to capture still images or video (including a video stream) and store them into memory 202, modify characteristics of a still image or video, or delete a still image or video from memory 202.

In conjunction with touch screen 212, display controller 256, contact/motion module 230, graphics module 232, text input module 234, and camera module 243, image management module 244 includes executable instructions to arrange, modify (e.g., edit), or otherwise manipulate, label, delete, present (e.g., in a digital slide show or album), and store still and/or video images.

In conjunction with RF circuitry 208, touch screen 212, display controller 256, contact/motion module 230, graphics module 232, and text input module 234, browser module 247 includes executable instructions to browse the Internet in accordance with user instructions, including searching, linking to, receiving, and displaying web pages or portions thereof, as well as attachments and other files linked to web pages.

In conjunction with RF circuitry 208, touch screen 212, display controller 256, contact/motion module 230, graphics module 232, text input module 234, e-mail client module 240, and browser module 247, calendar module 248 includes executable instructions to create, display, modify, and store calendars and data associated with calendars (e.g., calendar entries, to-do lists, etc.) in accordance with user instructions.

In conjunction with RF circuitry 208, touch screen 212, display controller 256, contact/motion module 230, graphics module 232, text input module 234, and browser module 247, widget modules 249 are mini-applications that can be downloaded and used by a user (e.g., weather widget 249-1, stocks widget 249-2, calculator widget 249-3, alarm clock widget 249-4, and dictionary widget 249-5) or created by the user (e.g., user-created widget 249-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 208, touch screen 212, display controller 256, contact/motion module 230, graphics module 232, text input module 234, and browser module 247, the widget creator module 250 are used by a user to create widgets (e.g., turning a user-specified portion of a web page into a widget).

In conjunction with touch screen 212, display controller 256, contact/motion module 230, graphics module 232, and text input module 234, search module 251 includes executable instructions to search for text, music, sound, image, video, and/or other files in memory 202 that match one or more search criteria (e.g., one or more user-specified search terms) in accordance with user instructions.

In conjunction with touch screen 212, display controller 256, contact/motion module 230, graphics module 232, audio circuitry 210, speaker 211, RF circuitry 208, and browser module 247, video and music player module 252 includes executable instructions that allow the user to download and play back recorded music and other sound files stored in one or more file formats, such as MP3 or AAC files, and executable instructions to display, present, or otherwise play back videos (e.g., on touch screen 212 or on an external, connected display via external port 224). In some embodiments, device 200 optionally includes the functionality of an MP3 player, such as an iPod (trademark of Apple Inc.).

In conjunction with touch screen 212, display controller 256, contact/motion module 230, graphics module 232, and text input module 234, notes module 253 includes executable instructions to create and manage notes, to-do lists, and the like in accordance with user instructions.

In conjunction with RF circuitry 208, touch screen 212, display controller 256, contact/motion module 230, graphics module 232, text input module 234, GPS module 235, and browser module 247, map module 254 are used to receive, display, modify, and store maps and data associated with maps (e.g., driving directions, data on stores and other points of interest at or near a particular location, and other location-based data) in accordance with user instructions.

In conjunction with touch screen 212, display controller 256, contact/motion module 230, graphics module 232, audio circuitry 210, speaker 211, RF circuitry 208, text input module 234, e-mail client module 240, and browser module 247, online video module 255 includes instructions that allow the user to access, browse, receive (e.g., by streaming and/or download), play back (e.g., on the touch screen or on an external, connected display via external port 224), send an e-mail with a link to a particular online video, and otherwise manage online videos in one or more file formats, such as H.264. In some embodiments, instant messaging module 241, rather than e-mail client module 240, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules can be combined or otherwise rearranged in various embodiments. For example, video player module can be combined with music player module into a single module (e.g., video and music player module 252, FIG. 2A). In some embodiments, memory 202 stores a subset of the modules and data structures identified above. Furthermore, memory 202 stores additional modules and data structures not described above.

In some embodiments, device 200 is a device where operation of a predefined set of functions on the device is performed exclusively through a touch screen and/or a touchpad. By using a touch screen and/or a touchpad as the primary input control device for operation of device 200, the number of physical input control devices (such as push buttons, dials, and the like) on device 200 is reduced.

The predefined set of functions that are performed exclusively through a touch screen and/or a touchpad optionally includes navigation between user interfaces. In some embodiments, the touchpad, when touched by the user, navigates device 200 to a main, home, or root menu from any user interface that is displayed on device 200. In such embodiments, a "menu button" is implemented using a touchpad. In some other embodiments, the menu button is a physical push button or other physical input control device instead of a touchpad.

Figure 2B:
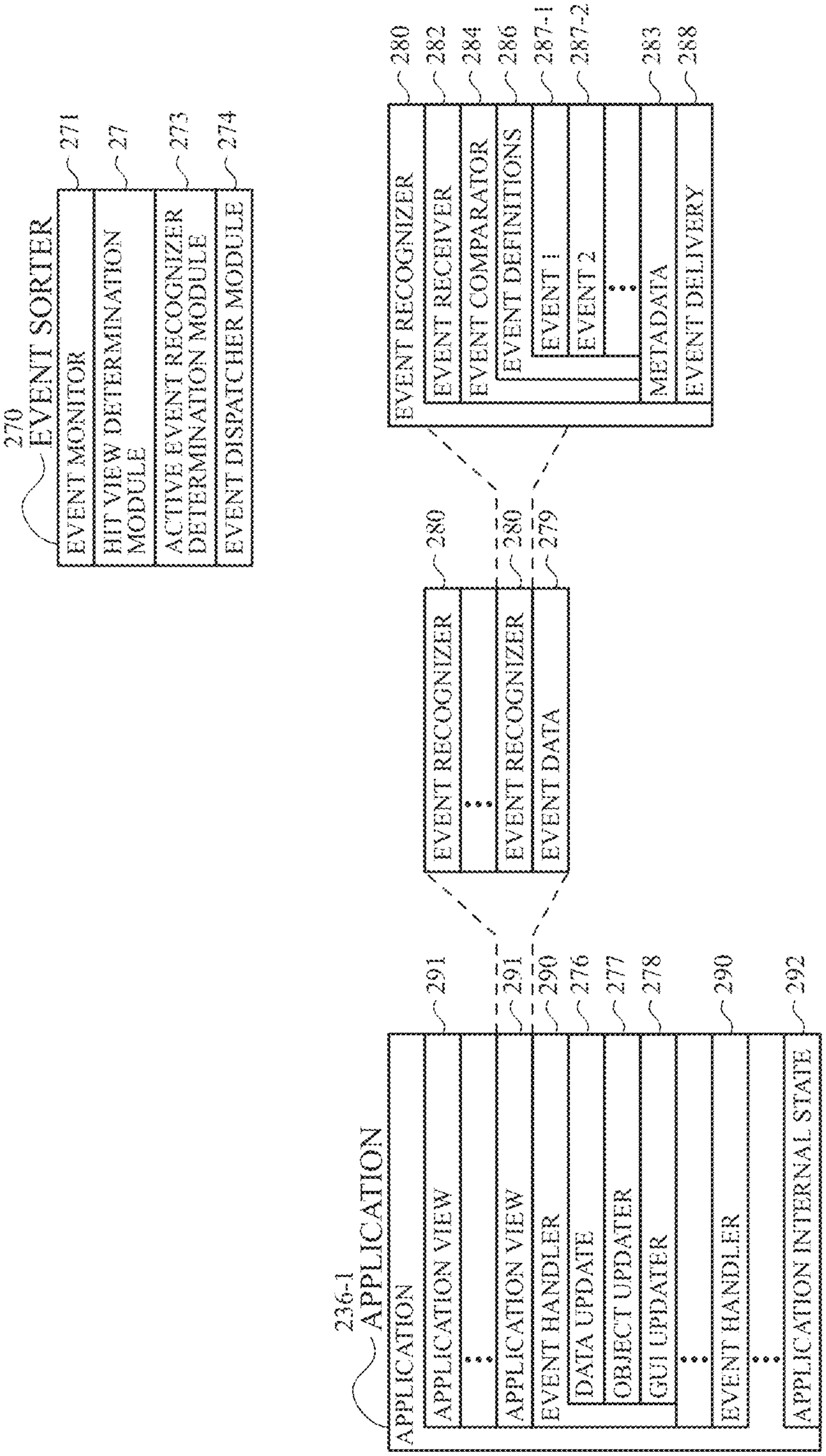
FIG. 2B is a block diagram illustrating exemplary components for event handling, according to various examples.

FIG. 2B is a block diagram illustrating exemplary components for event handling in accordance with some embodiments. In some embodiments, memory 202 (FIG. 2A) or 470 (FIG. 4A) includes event sorter 270 (e.g., in operating system 226) and a respective application 236-1 (e.g., any of the aforementioned applications 237-251, 255, 480-490).

Event sorter 270 receives event information and determines the application 236-1 and application view 291 of application 236-1 to which to deliver the event information. Event sorter 270 includes event monitor 271 and event dispatcher module 274. In some embodiments, application 236-1 includes application internal state 292, which indicates the current application view(s) displayed on touch-sensitive display 212 when the application is active or executing. In some embodiments, device/global internal state 257 is used by event sorter 270 to determine which application(s) is (are) currently active, and application internal state 292 is used by event sorter 270 to determine application views 291 to which to deliver event information.

In some embodiments, application internal state 292 includes additional information, such as one or more of:

resume information to be used when application 236-1 resumes execution, user interface state information that indicates information being displayed or that is ready for display by application 236-1, a state queue for enabling the user to go back to a prior state or view of application 236-1, and a redo/undo queue of previous actions taken by the user.

Event monitor 271 receives event information from peripherals interface 218. Event information includes information about a sub-event (e.g., a user touch on touch-sensitive display 212, as part of a multi-touch gesture). Peripherals interface 218 transmits information it receives from I/O subsystem 206 or a sensor, such as proximity sensor 266, accelerometer(s) 268, and/or microphone 213 (through audio circuitry 210). Information that peripherals interface 218 receives from I/O subsystem 206 includes information from touch-sensitive display 212 or a touch-sensitive surface.

In some embodiments, event monitor 271 sends requests to the peripherals interface 218 at predetermined intervals. In response, peripherals interface 218 transmits event information. In other embodiments, peripherals interface 218 transmits event information only when there is a significant event (e.g., receiving an input above a predetermined noise threshold and/or for more than a predetermined duration).

In some embodiments, event sorter 270 also includes a hit view determination module 272 and/or an active event recognizer determination module 273.

Hit view determination module 272 provides software procedures for determining where a sub-event has taken place within one or more views when touch-sensitive display 212 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected correspond to programmatic levels within a programmatic or view hierarchy of the application. For example, the lowest level view in which a touch is detected is called the hit view, and the set of events that are recognized as proper inputs is determined based, at least in part, on the hit view of the initial touch that begins a touch-based gesture.

Hit view determination module 272 receives information related to sub events of a touch-based gesture. When an application has multiple views organized in a hierarchy, hit view determination module 272 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 272, the hit view typically receives all sub-events related to the same touch or input source for which it was identified as the hit view.

Active event recognizer determination module 273 determines which view or views within a view hierarchy should receive a particular sequence of sub-events. In some embodiments, active event recognizer determination module 273 determines that only the hit view should receive a particular sequence of sub-events. In other embodiments, active event recognizer determination module 273 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 274 dispatches the event information to an event recognizer (e.g., event recognizer 280). In embodiments including active event recognizer determination module 273, event dispatcher module 274 delivers the event information to an event recognizer determined by active event recognizer determination module 273. In some embodiments, event dispatcher module 274 stores in an event queue the event information, which is retrieved by a respective event receiver 282.

In some embodiments, operating system 226 includes event sorter 270. Alternatively, application 236-1 includes event sorter 270. In yet other embodiments, event sorter 270 is a stand-alone module, or a part of another module stored in memory 202, such as contact/motion module 230.

In some embodiments, application 236-1 includes a plurality of event handlers 290 and one or more application views 291, each of which includes instructions for handling touch events that occur within a respective view of the application's user interface. Each application view 291 of the application 236-1 includes one or more event recognizers 280. Typically, a respective application view 291 includes a plurality of event recognizers 280. In other embodiments, one or more of event recognizers 280 are part of a separate module, such as a user interface kit (not shown) or a higher level object from which application 236-1 inherits methods and other properties. In some embodiments, a respective event handler 290 includes one or more of: data updater 276, object updater 277, GUI updater 278, and/or event data 279 received from event sorter 270. Event handler 290 utilizes or calls data updater 276, object updater 277, or GUI updater 278 to update the application internal state 292. Alternatively, one or more of the application views 291 include one or more respective event handlers 290. Also, in some embodiments, one or more of data updater 276, object updater 277, and GUI updater 278 are included in a respective application view 291.

A respective event recognizer 280 receives event information (e.g., event data 279) from event sorter 270 and identifies an event from the event information. Event recognizer 280 includes event receiver 282 and event comparator 284. In some embodiments, event recognizer 280 also includes at least a subset of: metadata 283, and event delivery instructions 288 (which include sub-event delivery instructions).

Event receiver 282 receives event information from event sorter 270. The event information includes information about a sub-event, for example, a touch or a touch movement. Depending on the sub-event, the event information also includes additional information, such as location of the sub-event. When the sub-event concerns motion of a touch, the event information also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 284 compares the event information to predefined event or sub-event definitions and, based on the comparison, determines an event or sub event, or determines or updates the state of an event or sub-event. In some embodiments, event comparator 284 includes event definitions 286. Event definitions 286 contain definitions of events (e.g., predefined sequences of sub-events), for example, event 1 (287-1), event 2 (287-2), and others. In some embodiments, sub-events in an event (287) include, for example, touch begin, touch end, touch movement, touch cancellation, and multiple touching. In one example, the definition for event 1 (287-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (287-2) is a dragging on a displayed object. The dragging, for example, comprises a touch (or contact) on the displayed object for a predetermined phase, a movement of the touch across touch-sensitive display 212, and liftoff of the touch (touch end). In some embodiments, the event also includes information for one or more associated event handlers 290.

In some embodiments, event definition 287 includes a definition of an event for a respective user-interface object. In some embodiments, event comparator 284 performs a hit test to determine which user-interface object is associated with a sub-event. For example, in an application view in which three user-interface objects are displayed on touch-sensitive display 212, when a touch is detected on touch-sensitive display 212, event comparator 284 performs a hit test to determine which of the three user-interface objects is associated with the touch (sub-event). If each displayed object is associated with a respective event handler 290, the event comparator uses the result of the hit test to determine which event handler 290 should be activated. For example, event comparator 284 selects an event handler associated with the sub-event and the object triggering the hit test.

In some embodiments, the definition for a respective event (287) also includes delayed actions that delay delivery of the event information until after it has been determined whether the sequence of sub-events does or does not correspond to the event recognizer's event type.

When a respective event recognizer 280 determines that the series of sub-events do not match any of the events in event definitions 286, the respective event recognizer 280 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 280 includes metadata 283 with configurable properties, flags, and/or lists that indicate how the event delivery system should perform sub-event delivery to actively involved event recognizers. In some embodiments, metadata 283 includes configurable properties, flags, and/or lists that indicate how event recognizers interact, or are enabled to interact, with one another. In some embodiments, metadata 283 includes configurable properties, flags, and/or lists that indicate whether sub-events are delivered to varying levels in the view or programmatic hierarchy.

In some embodiments, a respective event recognizer 280 activates event handler 290 associated with an event when one or more particular sub-events of an event are recognized. In some embodiments, a respective event recognizer 280 delivers event information associated with the event to event handler 290. Activating an event handler 290 is distinct from sending (and deferred sending) sub-events to a respective hit view. In some embodiments, event recognizer 280 throws a flag associated with the recognized event, and event handler 290 associated with the flag catches the flag and performs a predefined process.

In some embodiments, event delivery instructions 288 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 276 creates and updates data used in application 236-1. For example, data updater 276 updates the telephone number used in contacts module 237, or stores a video file used in video player module. In some embodiments, object updater 277 creates and updates objects used in application 236-1. For example, object updater 277 creates a new user-interface object or updates the position of a user-interface object. GUI updater 278 updates the GUI. For example, GUI updater 278 prepares display information and sends it to graphics module 232 for display on a touch-sensitive display.

In some embodiments, event handler(s) 290 includes or has access to data updater 276, object updater 277, and GUI updater 278. In some embodiments, data updater 276, object updater 277, and GUI updater 278 are included in a single module of a respective application 236-1 or application view 291. In other embodiments, they are included in two or more software modules.

It shall be understood that the foregoing discussion regarding event handling of user touches on touch-sensitive displays also applies to other forms of user inputs to operate multifunction devices 200 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 3:
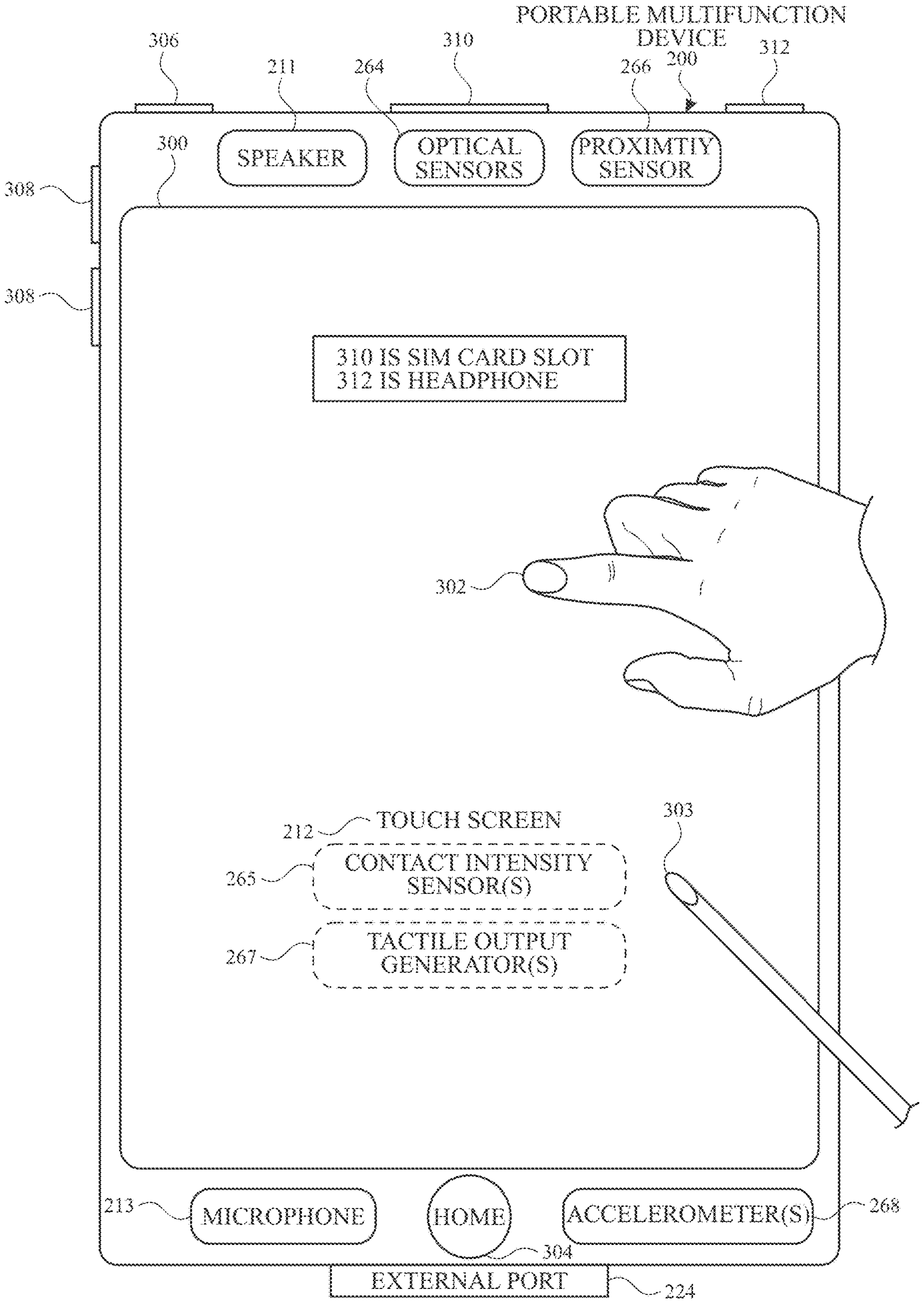
FIG. 3 illustrates a portable multifunction device implementing the client-side portion of a digital assistant, according to various examples.

FIG. 3 illustrates a portable multifunction device 200 having a touch screen 212 in accordance with some embodiments. The touch screen optionally displays one or more graphics within user interface (UI) 300. In this embodiment, as well as others described below, a user is enabled to select one or more of the graphics by making a gesture on the graphics, for example, with one or more fingers 302 (not drawn to scale in the figure) or one or more styluses 303 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 200. In some implementations or circumstances, inadvertent contact with a graphic does not select the graphic. For example, a swipe gesture that sweeps over an application icon optionally does not select the corresponding application when the gesture corresponding to selection is a tap.

Device 200 also includes one or more physical buttons, such as "home" or menu button 304. As described previously, menu button 304 is used to navigate to any application 236 in a set of applications that is executed on device 200.

Alternatively, in some embodiments, the menu button is implemented as a soft key in a GUI displayed on touch screen 212.

In one embodiment, device 200 includes touch screen 212, menu button 304, push button 306 for powering the device on/off and locking the device, volume adjustment button(s) 308, subscriber identity module (SIM) card slot 310, headset jack 312, and docking/charging external port 224. Push button 306 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 200 also accepts verbal input for activation or deactivation of some functions through microphone 213. Device 200 also, optionally, includes one or more contact intensity sensors 265 for detecting intensity of contacts on touch screen 212 and/or one or more tactile output generators 267 for generating tactile outputs for a user of device 200.

FIG. 4A is a block diagram of an exemplary multifunction device with a display and a touch-sensitive surface in accordance with some embodiments. Device 400 need not be portable. In some embodiments, device 400 is a laptop computer, a desktop computer, a tablet computer, a multimedia player device, a navigation device, an educational device (such as a child's learning toy), a gaming system, or a control device (e.g., a home or industrial controller). Device 400 typically includes one or more processing units (CPUs) 410, one or more network or other communications interfaces 460, memory 470, and one or more communication buses 420 for interconnecting these components. Communication buses 420 optionally include circuitry (sometimes called a chipset) that interconnects and controls communications between system components. Device 400 includes input/output (I/O) interface 430 comprising display 440, which is typically a touch screen display. I/O interface 430 also optionally includes a keyboard and/or mouse (or other pointing device) 450 and touchpad 455, tactile output generator 457 for generating tactile outputs on device 400 (e.g., similar to tactile output generator(s) 267 described above with reference to FIG. 2A), sensors 459 (e.g., optical, acceleration, proximity, touch-sensitive, and/or contact intensity sensors similar to contact intensity sensor(s) 265 described above with reference to FIG. 2A). Memory 470 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 470 optionally includes one or more storage devices remotely located from CPU(s) 410. In some embodiments, memory 470 stores programs, modules, and data structures analogous to the programs, modules, and data structures stored in memory 202 of portable multifunction device 200 (FIG. 2A), or a subset thereof. Furthermore, memory 470 optionally stores additional programs, modules, and data structures not present in memory 202 of portable multifunction device 200. For example, memory 470 of device 400 optionally stores drawing module 480, presentation module 482, word processing module 484, website creation module 486, disk authoring module 488, and/or spreadsheet module 490, while memory 202 of portable multifunction device 200 (FIG. 2A) optionally does not store these modules.

Each of the above-identified elements in FIG. 4A is, in some examples, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are combined or otherwise rearranged in various embodiments. In some embodiments, memory 470 stores a subset of the modules and data structures identified above. Furthermore, memory 470 stores additional modules and data structures not described above.

Implementations within the scope of the present disclosure can be partially or entirely realized using a tangible computer-readable storage medium (or multiple tangible computer-readable storage media of one or more types) encoding one or more computer-readable instructions. It should be recognized that computer-readable instructions can be organized in any format, including applications, widgets, processes, software, and/or components.

Figure 4B:
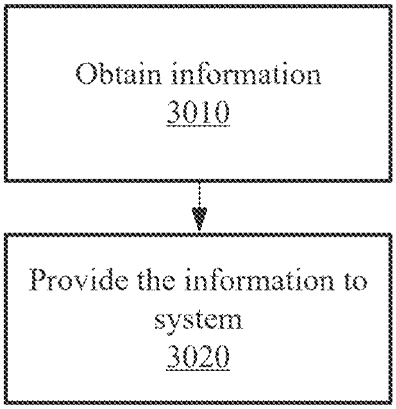
FIGS. 4B-4G illustrate the use of Application Programming Interfaces (APIs) to perform operations.
Figure 4C:
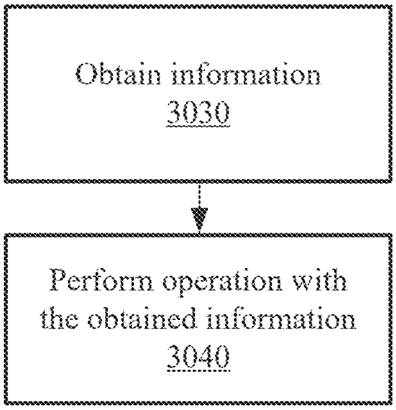

Implementations within the scope of the present disclosure include a computer-readable storage medium that encodes instructions organized as an application (e.g., application 3160) that, when executed by one or more processing units, control an electronic device (e.g., device 3150) to perform the method of FIG. 4B, the method of FIG. 4C, and/or one or more other processes and/or methods described herein.

It should be recognized that application 3160 (shown in FIG. 4D) can be any suitable type of application, including, for example, one or more of: a browser application, an application that functions as an execution environment for plug-ins, widgets or other applications, a fitness application, a health application, a digital payments application, a media application, a social network application, a messaging application, and/or a maps application. In some embodiments, application 3160 is an application that is pre-installed on device 3150 at purchase (e.g., a first-party application). In some embodiments, application 3160 is an application that is provided to device 3150 via an operating system update file (e.g., a first-party application or a second-party application). In some embodiments, application 3160 is an application that is provided via an application store. In some embodiments, the application store can be an application store that is pre-installed on device 3150 at purchase (e.g., a first-party application store). In some embodiments, the application store is a third-party application store (e.g., an application store that is provided by another application store, downloaded via a network, and/or read from a storage device).

Figure 4D:
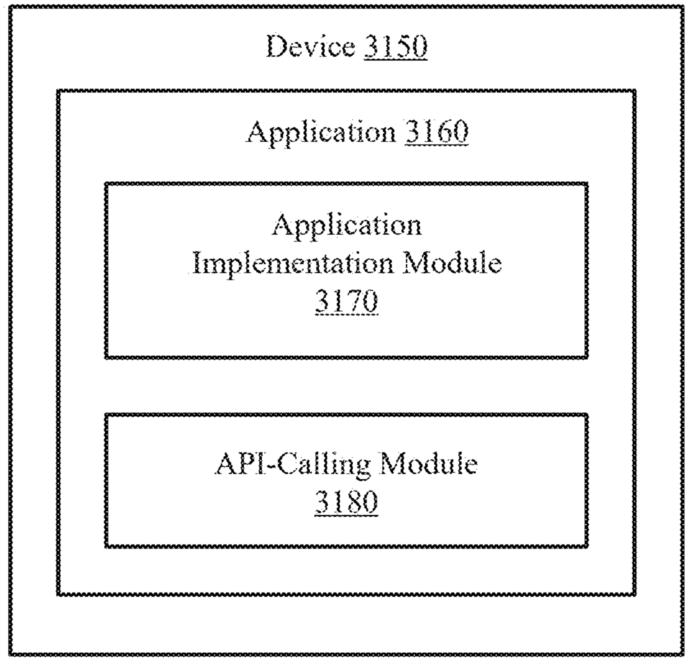

Referring to FIG. 4B and FIG. 4D, application 3160 obtains information (e.g., 3010). In some embodiments, at 3010, information is obtained from at least one hardware component of device 3150. In some embodiments, at 3010, information is obtained from at least one software module of device 3150. In some embodiments, at 3010, information is obtained from at least one hardware component external to device 3150 (e.g., a peripheral device, an accessory device, and/or a server). In some embodiments, the information obtained at 3010 includes positional information, time information, notification information, user information, environment information, electronic device state information, weather information, media information, historical information, event information, hardware information, and/or motion information. In some embodiments, in response to and/or after obtaining the information at 3010, application 3160 provides the information to a system (e.g., 3020).

Figure 4E:
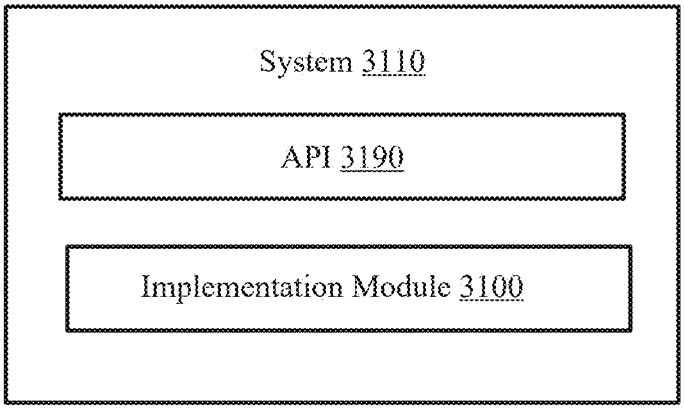
Figure 4F:
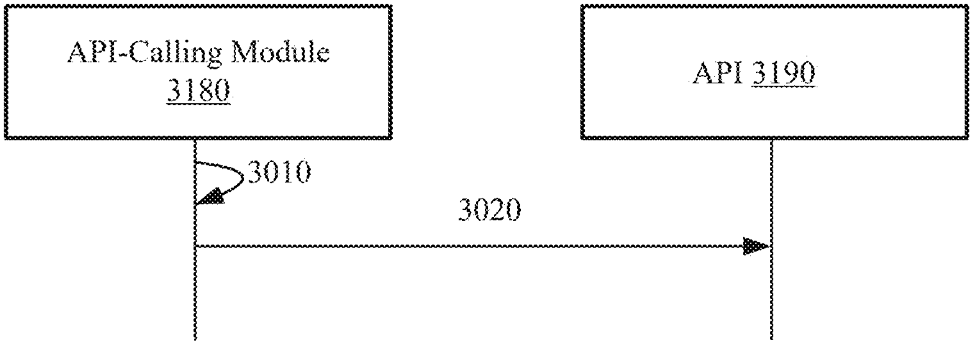

In some embodiments, the system (e.g., 3110 shown in FIG. 4E) is an operating system hosted on device 3150. In some embodiments, the system (e.g., 3110 shown in FIG. 4E) is an external device (e.g., a server, a peripheral device, an accessory, and/or a personal computing device) that includes an operating system.

Figure 4G:
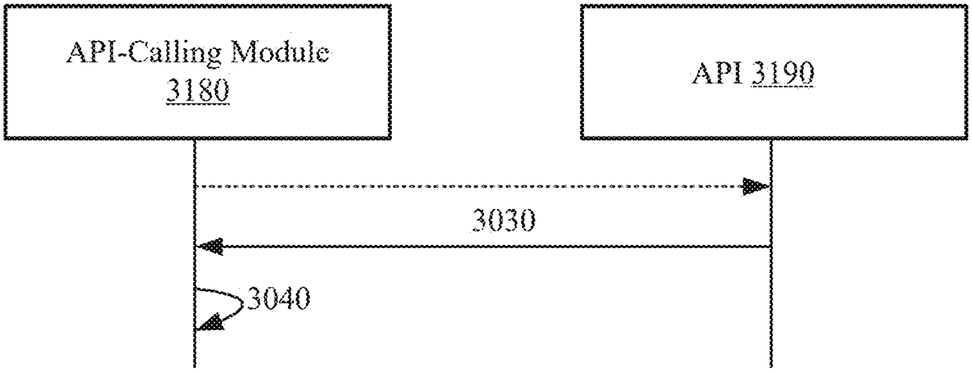

Referring to FIG. 4C and FIG. 4G, application 3160 obtains information (e.g., 3030). In some embodiments, the information obtained at 3030 includes positional information, time information, notification information, user information, environment information electronic device state information, weather information, media information, historical information, event information, hardware information, and/or motion information. In response to and/or after obtaining the information at 3030, application 3160 performs an operation with the information (e.g., 3040). In some embodiments, the operation performed at 3040 includes: providing a notification based on the information, sending a message based on the information, displaying the information, controlling a user interface of a fitness application based on the information, controlling a user interface of a health application based on the information, controlling a focus mode based on the information, setting a reminder based on the information, adding a calendar entry based on the information, and/or calling an API of system 3110 based on the information.

In some embodiments, one or more steps of the method of FIG. 4B and/or the method of FIG. 4C is performed in response to a trigger. In some embodiments, the trigger includes detection of an event, a notification received from system 3110, a user input, and/or a response to a call to an API provided by system 3110.

In some embodiments, the instructions of application 3160, when executed, control device 3150 to perform the method of FIG. 4B and/or the method of FIG. 4C by calling an application programming interface (API) (e.g., API 3190) provided by system 3110. In some embodiments, application 3160 performs at least a portion of the method of FIG. 4B and/or the method of FIG. 4C without calling API 3190.

In some embodiments, one or more steps of the method of FIG. 4B and/or the method of FIG. 4C includes calling an API (e.g., API 3190) using one or more parameters defined by the API. In some embodiments, the one or more parameters include a constant, a key, a data structure, an object, an object class, a variable, a data type, a pointer, an array, a list or a pointer to a function or method, and/or another way to reference a data or other item to be passed via the API.

Referring to FIG. 4D, device 3150 is illustrated. In some embodiments, device 3150 is a personal computing device, a smart phone, a smart watch, a fitness tracker, a head mounted display (HMD) device, a media device, a communal device, a speaker, a television, and/or a tablet. As illustrated in FIG. 4D, device 3150 includes application 3160 and an operating system (e.g., system 3110 shown in FIG. 4E). Application 3160 includes application implementation module 3170 and API-calling module 3180. System 3110 includes API 3190 and implementation module 3100. It should be recognized that device 3150, application 3160, and/or system 3110 can include more, fewer, and/or different components than illustrated in FIGS. 4D and 4E.

In some embodiments, application implementation module 3170 includes a set of one or more instructions corresponding to one or more operations performed by application 3160. For example, when application 3160 is a messaging application, application implementation module 3170 can include operations to receive and send messages. In some embodiments, application implementation module 3170 communicates with API-calling module 3180 to communicate with system 3110 via API 3190 (shown in FIG. 4E).

In some embodiments, API 3190 is a software module (e.g., a collection of computer-readable instructions) that provides an interface that allows a different module (e.g., API-calling module 3180) to access and/or use one or more functions, methods, procedures, data structures, classes, and/or other services provided by implementation module 3100 of system 3110. For example, API-calling module 3180 can access a feature of implementation module 3100 through one or more API calls or invocations (e.g., embodied by a function or a method call) exposed by API 3190 (e.g., a software and/or hardware module that can receive API calls, respond to API calls, and/or send API calls) and can pass data and/or control information using one or more parameters via the API calls or invocations. In some embodiments, API 3190 allows application 3160 to use a service provided by a Software Development Kit (SDK) library. In some embodiments, application 3160 incorporates a call to a function or method provided by the SDK library and provided by API 3190 or uses data types or objects defined in the SDK library and provided by API 3190. In some embodiments, API-calling module 3180 makes an API call via API 3190 to access and use a feature of implementation module 3100 that is specified by API 3190. In such embodiments, implementation module 3100 can return a value via API 3190 to API-calling module 3180 in response to the API call. The value can report to application 3160 the capabilities or state of a hardware component of device 3150, including those related to aspects such as input capabilities and state, output capabilities and state, processing capability, power state, storage capacity and state, and/or communications capability. In some embodiments, API 3190 is implemented in part by firmware, microcode, or other low level logic that executes in part on the hardware component.

In some embodiments, API 3190 allows a developer of API-calling module 3180 (which can be a third-party developer) to leverage a feature provided by implementation module 3100. In such embodiments, there can be one or more API-calling modules (e.g., including API-calling module 3180) that communicate with implementation module 3100. In some embodiments, API 3190 allows multiple API-calling modules written in different programming languages to communicate with implementation module 3100 (e.g., API 3190 can include features for translating calls and returns between implementation module 3100 and API-calling module 3180) while API 3190 is implemented in terms of a specific programming language. In some embodiments, API-calling module 3180 calls APIs from different providers such as a set of APIs from an OS provider, another set of APIs from a plug-in provider, and/or another set of APIs from another provider (e.g., the provider of a software library) or creator of the another set of APIs.

Examples of API 3190 can include one or more of: a pairing API (e.g., for establishing secure connection, e.g., with an accessory), a device detection API (e.g., for locating nearby devices, e.g., media devices and/or smartphone), a payment API, a UIKit API (e.g., for generating user interfaces), a location detection API, a locator API, a maps API, a health sensor API, a sensor API, a messaging API, a push notification API, a streaming API, a collaboration API, a video conferencing API, an application store API, an advertising services API, a web browser API (e.g., WebKit API), a vehicle API, a networking API, a WiFi API, a Bluetooth API, an NFC API, a UWB API, a fitness API, a smart home API, contact transfer API, photos API, camera API, and/or image processing API. In some embodiments, the sensor API is an API for accessing data associated with a sensor of device 3150. For example, the sensor API can provide access to raw sensor data. For another example, the sensor API can provide data derived (and/or generated) from the raw sensor data. In some embodiments, the sensor data includes temperature data, image data, video data, audio data, heart rate data, IMU (inertial measurement unit) data, lidar data, location data, GPS data, and/or camera data. In some embodiments, the sensor includes one or more of an accelerometer, temperature sensor, infrared sensor, optical sensor, heartrate sensor, barometer, gyroscope, proximity sensor, temperature sensor, and/or biometric sensor.

In some embodiments, implementation module 3100 is a system (e.g., operating system and/or server system) software module (e.g., a collection of computer-readable instructions) that is constructed to perform an operation in response to receiving an API call via API 3190. In some embodiments, implementation module 3100 is constructed to provide an API response (via API 3190) as a result of processing an API call. By way of example, implementation module 3100 and API-calling module 3180 can each be any one of an operating system, a library, a device driver, an API, an application program, or other module. It should be understood that implementation module 3100 and API-calling module 3180 can be the same or different type of module from each other. In some embodiments, implementation module 3100 is embodied at least in part in firmware, microcode, or hardware logic.

In some embodiments, implementation module 3100 returns a value through API 3190 in response to an API call from API-calling module 3180. While API 3190 defines the syntax and result of an API call (e.g., how to invoke the API call and what the API call does), API 3190 might not reveal how implementation module 3100 accomplishes the function specified by the API call. Various API calls are transferred via the one or more application programming interfaces between API-calling module 3180 and implementation module 3100. Transferring the API calls can include issuing, initiating, invoking, calling, receiving, returning, and/or responding to the function calls or messages. In other words, transferring can describe actions by either of API-calling module 3180 or implementation module 3100. In some embodiments, a function call or other invocation of API 3190 sends and/or receives one or more parameters through a parameter list or other structure.

In some embodiments, implementation module 3100 provides more than one API, each providing a different view of or with different aspects of functionality implemented by implementation module 3100. For example, one API of implementation module 3100 can provide a first set of functions and can be exposed to third-party developers, and another API of implementation module 3100 can be hidden (e.g., not exposed) and provide a subset of the first set of functions and also provide another set of functions, such as testing or debugging functions which are not in the first set of functions. In some embodiments, implementation module 3100 calls one or more other components via an underlying API and thus is both an API-calling module and an implementation module. It should be recognized that implementation module 3100 can include additional functions, methods, classes, data structures, and/or other features that are not specified through API 3190 and are not available to API-calling module 3180. It should also be recognized that API-calling module 3180 can be on the same system as implementation module 3100 or can be located remotely and access implementation module 3100 using API 3190 over a network. In some embodiments, implementation module 3100, API 3190, and/or API-calling module 3180 is stored in a machine-readable medium, which includes any mechanism for storing information in a form readable by a machine (e.g., a computer or other data processing system). For example, a machine-readable medium can include magnetic disks, optical disks, random access memory; read only memory, and/or flash memory devices.

An application programming interface (API) is an interface between a first software process and a second software process that specifies a format for communication between the first software process and the second software process. Limited APIs (e.g., private APIs or partner APIs) are APIs that are accessible to a limited set of software processes (e.g., only software processes within an operating system or only software processes that are approved to access the limited APIs). Public APIs that are accessible to a wider set of software processes. Some APIs enable software processes to communicate about or set a state of one or more input devices (e.g., one or more touch sensors, proximity sensors, visual sensors, motion/orientation sensors, pressure sensors, intensity sensors, sound sensors, wireless proximity sensors, biometric sensors, buttons, switches, rotatable elements, and/or external controllers). Some APIs enable software processes to communicate about and/or set a state of one or more output generation components (e.g., one or more audio output generation components, one or more display generation components, and/or one or more tactile output generation components). Some APIs enable particular capabilities (e.g., scrolling, handwriting, text entry, image editing, and/or image creation) to be accessed, performed, and/or used by a software process (e.g., generating outputs for use by a software process based on input from the software process). Some APIs enable content from a software process to be inserted into a template and displayed in a user interface that has a layout and/or behaviors that are specified by the template.

Many software platforms include a set of frameworks that provides the core objects and core behaviors that a software developer needs to build software applications that can be used on the software platform. Software developers use these objects to display content onscreen, to interact with that content, and to manage interactions with the software platform. Software applications rely on the set of frameworks for their basic behavior, and the set of frameworks provides many ways for the software developer to customize the behavior of the application to match the specific needs of the software application. Many of these core objects and core behaviors are accessed via an API. An API will typically specify a format for communication between software processes, including specifying and grouping available variables, functions, and protocols. An API call (sometimes referred to as an API request) will typically be sent from a sending software process to a receiving software process as a way to accomplish one or more of the following: the sending software process requesting information from the receiving software process (e.g., for the sending software process to take action on), the sending software process providing information to the receiving software process (e.g., for the receiving software process to take action on), the sending software process requesting action by the receiving software process, or the sending software process providing information to the receiving software process about action taken by the sending software process. Interaction with a device (e.g., using a user interface) will in some circumstances include the transfer and/or receipt of one or more API calls (e.g., multiple API calls) between multiple different software processes (e.g., different portions of an operating system, an application and an operating system, or different applications) via one or more APIs (e.g., via multiple different APIs). For example, when an input is detected the direct sensor data is frequently processed into one or more input events that are provided (e.g., via an API) to a receiving software process that makes some determination based on the input events, and then sends (e.g., via an API) information to a software process to perform an operation (e.g., change a device state and/or user interface) based on the determination. While a determination and an operation performed in response could be made by the same software process, alternatively the determination could be made in a first software process and relayed (e.g., via an API) to a second software process, that is different from the first software process, that causes the operation to be performed by the second software process. Alternatively, the second software process could relay instructions (e.g., via an API) to a third software process that is different from the first software process and/or the second software process to perform the operation. It should be understood that some or all user interactions with a computer system could involve one or more API calls within a step of interacting with the computer system (e.g., between different software components of the computer system or between a software component of the computer system and a software component of one or more remote computer systems). It should be understood that some or all user interactions with a computer system could involve one or more API calls between steps of interacting with the computer system (e.g., between different software components of the computer system or between a software component of the computer system and a software component of one or more remote computer systems).

In some embodiments, the application can be any suitable type of application, including, for example, one or more of: a browser application, an application that functions as an execution environment for plug-ins, widgets or other applications, a fitness application, a health application, a digital payments application, a media application, a social network application, a messaging application, and/or a maps application.

In some embodiments, the application is an application that is pre-installed on the first computer system at purchase (e.g., a first-party application). In some embodiments, the application is an application that is provided to the first computer system via an operating system update file (e.g., a first-party application). In some embodiments, the application is an application that is provided via an application store. In some embodiments, the application store is pre-installed on the first computer system at purchase (e.g., a first-party application store) and allows download of one or more applications. In some embodiments, the application store is a third-party application store (e.g., an application store that is provided by another device, downloaded via a network, and/or read from a storage device). In some embodiments, the application is a third-party application (e.g., an app that is provided by an application store, downloaded via a network, and/or read from a storage device). In some embodiments, the application controls the first computer system to perform processes 1200 and/or 1300 (FIG. 12 and/or FIG. 13) by calling an application programming interface (API) provided by the system process using one or more parameters.

In some embodiments, exemplary APIs provided by the system process include one or more of: a pairing API (e.g., for establishing secure connection, e.g., with an accessory), a device detection API (e.g., for locating nearby devices, e.g., media devices and/or smartphone), a payment API, a UIKit API (e.g., for generating user interfaces), a location detection API, a locator API, a maps API, a health sensor API, a sensor API, a messaging API, a push notification API, a streaming API, a collaboration API, a video conferencing API, an application store API, an advertising services API, a web browser API (e.g., WebKit API), a vehicle API, a networking API, a WiFi API, a Bluetooth API, an NFC API, a UWB API, a fitness API, a smart home API, contact transfer API, a photos API, a camera API, and/or an image processing API.

In some embodiments, at least one API is a software module (e.g., a collection of computer-readable instructions) that provides an interface that allows a different module (e.g., API-calling module) to access and use one or more functions, methods, procedures, data structures, classes, and/or other services provided by an implementation module of the system process. The API can define one or more parameters that are passed between the API-calling module and the implementation module. In some embodiments, API 3190 defines a first API call that can be provided by API-calling module 3180. The implementation module is a system software module (e.g., a collection of computer-readable instructions) that is constructed to perform an operation in response to receiving an API call via the API. In some embodiments, the implementation module is constructed to provide an API response (via the API) as a result of processing an API call. In some embodiments, the implementation module is included in the device (e.g., 3150) that runs the application. In some embodiments, the implementation module is included in an electronic device that is separate from the device that runs the application.

Attention is now directed toward embodiments of user interfaces that can be implemented on, for example, portable multifunction device 200.

Figure 5A:
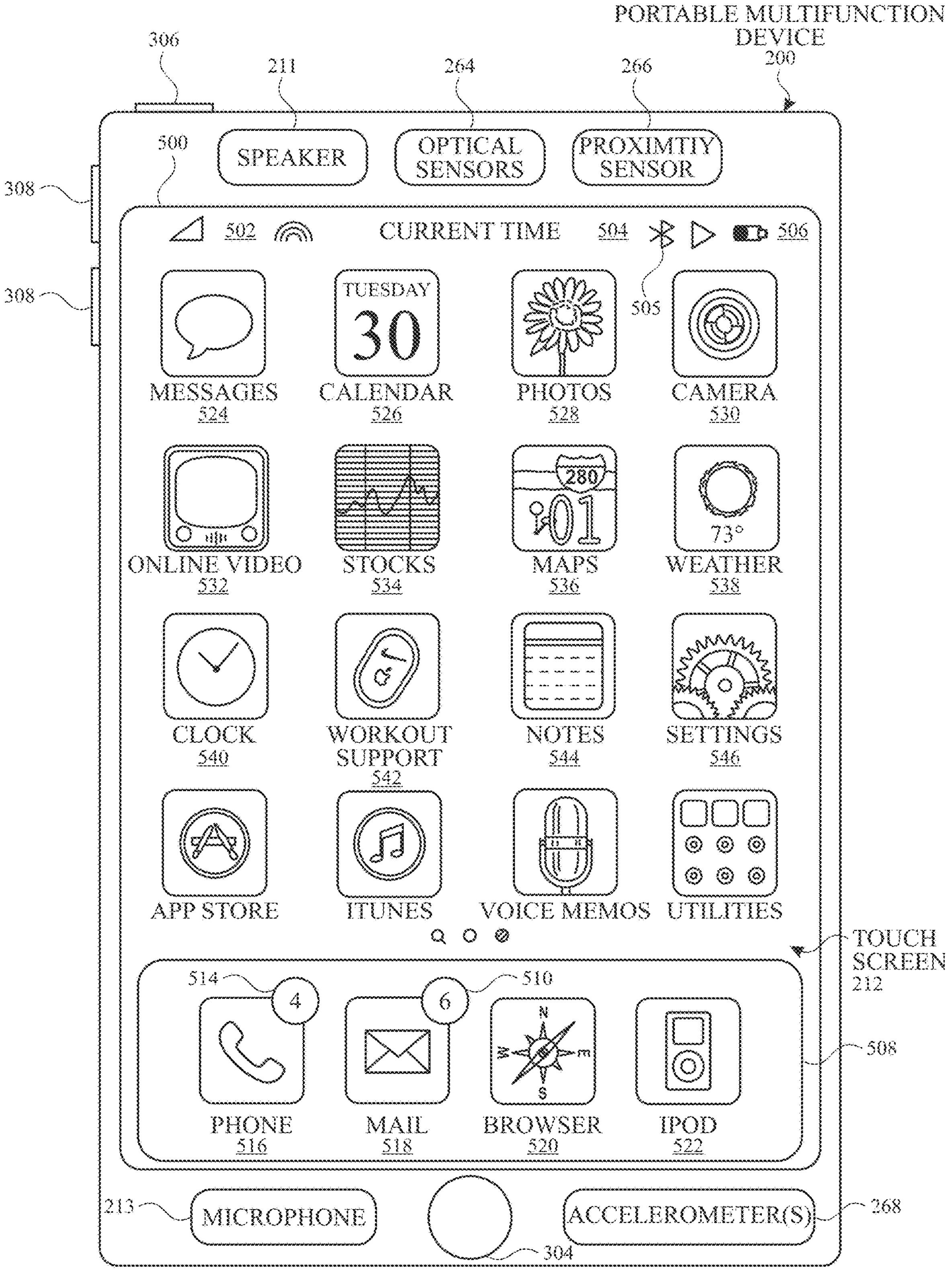
FIG. 5A illustrates an exemplary user interface for a menu of applications on a portable multifunction device, according to various examples.

FIG. 5A illustrates an exemplary user interface for a menu of applications on portable multifunction device 200 in accordance with some embodiments. Similar user interfaces are implemented on device 400. In some embodiments, user interface 500 includes the following elements, or a subset or superset thereof:

- Signal strength indicator(s) 502 for wireless communication(s), such as cellular and Wi-Fi signals;
- Time 504;
- Bluetooth indicator 505;
- Battery status indicator 506;
- Tray 508 with icons for frequently used applications, such as:
  - Icon 516 for telephone module 238, labeled "Phone," which optionally includes an indicator 514 of the number of missed calls or voicemail messages;
  - Icon 518 for e-mail client module 240, labeled "Mail," which optionally includes an indicator 510 of the number of unread e-mails;
  - Icon 520 for browser module 247, labeled "Browser;" and
  - Icon 522 for video and music player module 252, also referred to as iPod (trademark of Apple Inc.) module 252, labeled "iPod;" and
- Icons for other applications, such as:
  - Icon 524 for IM module 241, labeled "Messages;"
  - Icon 526 for calendar module 248, labeled "Calendar;"

Icon 528 for image management module 244, labeled "Photos;"

Icon 530 for camera module 243, labeled "Camera;"

Icon 532 for online video module 255, labeled "Online Video;"

Icon 534 for stocks widget 249-2, labeled "Stocks;"

Icon 536 for map module 254, labeled "Maps;"

Icon 538 for weather widget 249-1, labeled "Weather;"

Icon 540 for alarm clock widget 249-4, labeled "Clock;"

Icon 542 for workout support module 242, labeled "Workout Support;"

Icon 544 for notes module 253, labeled "Notes;" and

Icon 546 for a settings application or module, labeled "Settings," which provides access to settings for device 200 and its various applications 236.

It should be noted that the icon labels illustrated in FIG. 5A are merely exemplary. For example, icon 522 for video and music player module 252 is optionally labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 5B:
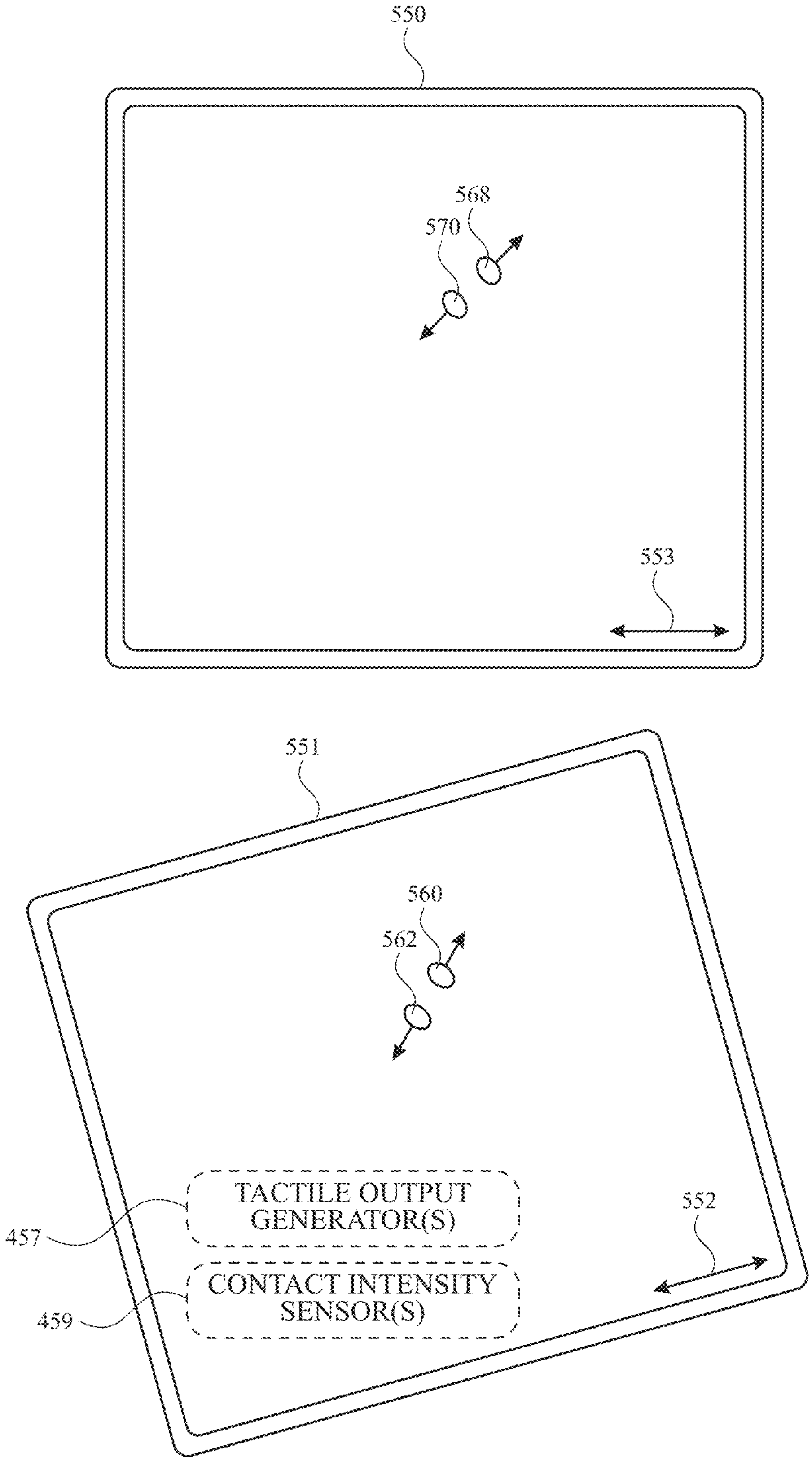
FIG. 5B illustrates an exemplary user interface for a multifunction device with a touch-sensitive surface that is separate from the display, according to various examples.

FIG. 5B illustrates an exemplary user interface on a device (e.g., device 400, FIG. 4) with a touch-sensitive surface 551 (e.g., a tablet or touchpad 455, FIG. 4) that is separate from the display 550 (e.g., touch screen display 212). Device 400 also, optionally, includes one or more contact intensity sensors (e.g., one or more of sensors 457) for detecting intensity of contacts on touch-sensitive surface 551 and/or one or more tactile output generators 459 for generating tactile outputs for a user of device 400.

Although some of the examples which follow will be given with reference to inputs on touch screen display 212 (where the touch-sensitive surface and the display are combined), in some embodiments, the device detects inputs on a touch-sensitive surface that is separate from the display, as shown in FIG. 5B. In some embodiments, the touch-sensitive surface (e.g., 551 in FIG. 5B) has a primary axis (e.g., 552 in FIG. 5B) that corresponds to a primary axis (e.g., 553 in FIG. 5B) on the display (e.g., 550). In accordance with these embodiments, the device detects contacts (e.g., 560 and 562 in FIG. 5B) with the touch-sensitive surface 551 at locations that correspond to respective locations on the display (e.g., in FIG. 5B, contact 560 corresponds to 568 and contact 562 corresponds to 570). In this way, user inputs (e.g., contacts 560 and 562, and movements thereof) detected by the device on the touch-sensitive surface (e.g., 551 in FIG. 5B) are used by the device to manipulate the user interface on the display (e.g., 550 in FIG. 5B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 6A:
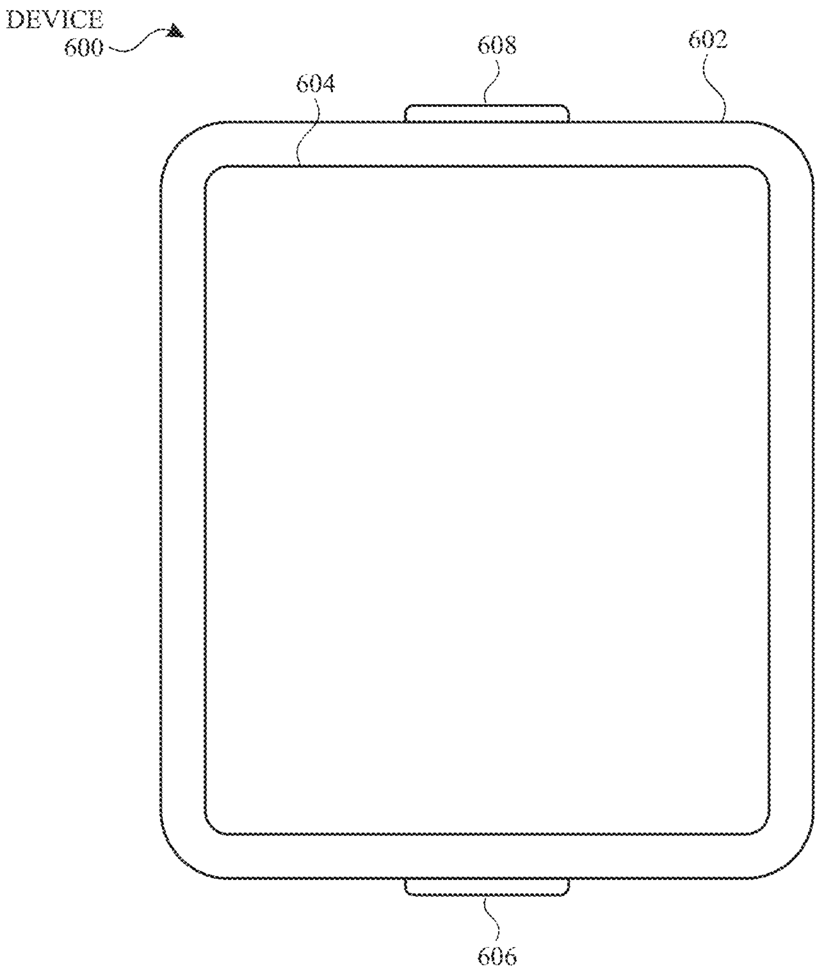
FIG. 6A illustrates a personal electronic device, according to various examples.

FIG. 6A illustrates exemplary personal electronic device 600. Device 600 includes body 602. In some embodiments, device 600 includes some or all of the features described with respect to devices 200 and 400 (e.g., FIGS. 2A-4A). In some embodiments, device 600 has touch-sensitive display screen 604, hereafter touch screen 604. Alternatively, or in addition to touch screen 604, device 600 has a display and a touch-sensitive surface. As with devices 200 and 400, in some embodiments, touch screen 604 (or the touch-sensitive surface) has one or more intensity sensors for detecting intensity of contacts (e.g., touches) being applied. The one or more intensity sensors of touch screen 604 (or the touch-sensitive surface) provide output data that represents the intensity of touches. The user interface of device 600 responds to touches based on their intensity, meaning that touches of different intensities can invoke different user interface operations on device 600.

Techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 600 has one or more input mechanisms 606 and 608. Input mechanisms 606 and 608, if included, are physical. Examples of physical input mechanisms include push buttons and rotatable mechanisms. In some embodiments, device 600 has one or more attachment mechanisms. Such attachment mechanisms, if included, can permit attachment of device 600 with, for example, hats, eyewear, carrings, necklaces, shirts, jackets, bracelets, watch straps, chains, trousers, belts, shoes, purses, backpacks, and so forth. These attachment mechanisms permit device 600 to be worn by a user.

Figure 6B:
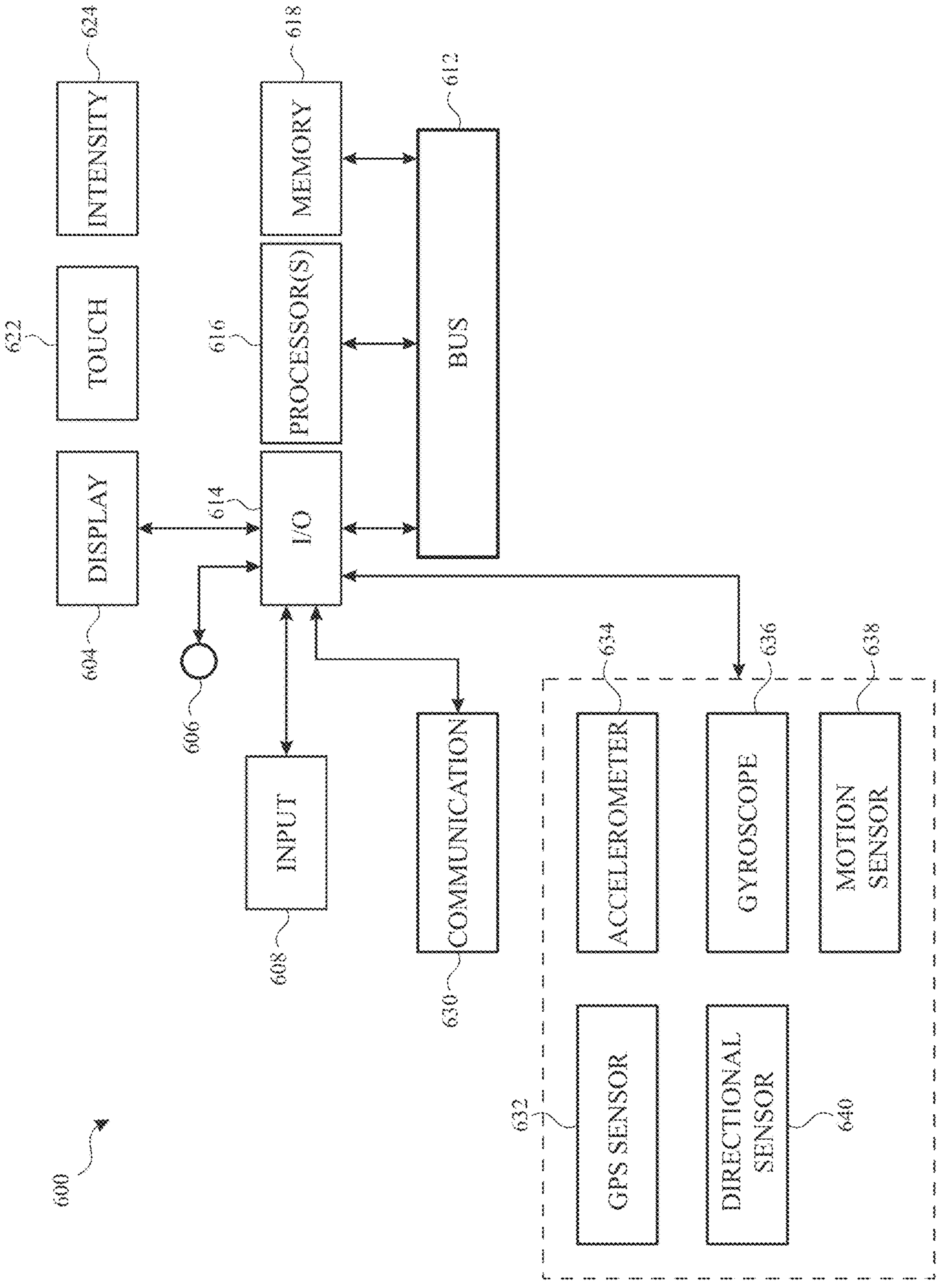
FIG. 6B is a block diagram illustrating a personal electronic device, according to various examples.

FIG. 6B depicts exemplary personal electronic device 600. In some embodiments, device 600 includes some or all of the components described with respect to FIGS. 2A, 2B, and 4A. Device 600 has bus 612 that operatively couples I/O section 614 with one or more computer processors 616 and memory 618. I/O section 614 is connected to display 604, which can have touch-sensitive component 622 and, optionally, touch-intensity sensitive component 624. In addition, I/O section 614 is connected with communication unit 630 for receiving application and operating system data, using Wi-Fi, Bluetooth, near field communication (NFC), cellular, and/or other wireless communication techniques. Device 600 includes input mechanisms 606 and/or 608. Input mechanism 606 is a rotatable input device or a depressible and rotatable input device, for example. Input mechanism 608 is a button, in some examples.

Input mechanism 608 is a microphone, in some examples. Personal electronic device 600 includes, for example, various sensors, such as GPS sensor 632, accelerometer 634, directional sensor 640 (e.g., compass), gyroscope 636, motion sensor 638, and/or a combination thereof, all of which are operatively connected to I/O section 614.

Memory 618 of personal electronic device 600 is a non-transitory computer-readable storage medium, for storing computer-executable instructions, which, when executed by one or more computer processors 616, for example, cause the computer processors to perform the techniques and processes described below. The computer-executable instructions, for example, are also stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. Personal electronic device 600 is not limited to the components and configuration of FIG. 6B but can include other or additional components in multiple configurations.

As used here, the term "affordance" refers to a user-interactive graphical user interface object that is, for example, displayed on the display screen of devices 200, 400, and/or 600 (FIG. 2A, FIG. 4A, and FIGS. 6A-6B). For example, an image (e.g., icon), a button, and text (e.g., hyperlink) each constitutes an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 455 in FIG. 4A or touch-sensitive surface 551 in FIG. 5B) while the cursor is over a particular user interface element (e.g., a button, window, slider or other user interface element), the particular user interface element is adjusted in accordance with the detected input. In some implementations that include a touch screen display (e.g., touch-sensitive display system 212 in FIG. 2A or touch screen 212 in FIG. 5A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface receives a continuous swipe contact transitioning from a start location and reaching an end location, at which point the intensity of the contact increases. In this example, the characteristic intensity of the contact at the end location is based on only a portion of the continuous swipe contact, and not the entire swipe contact (e.g., only the portion of the swipe contact at the end location). In some embodiments, a smoothing algorithm is applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

3. Digital Assistant System

Figure 7A:
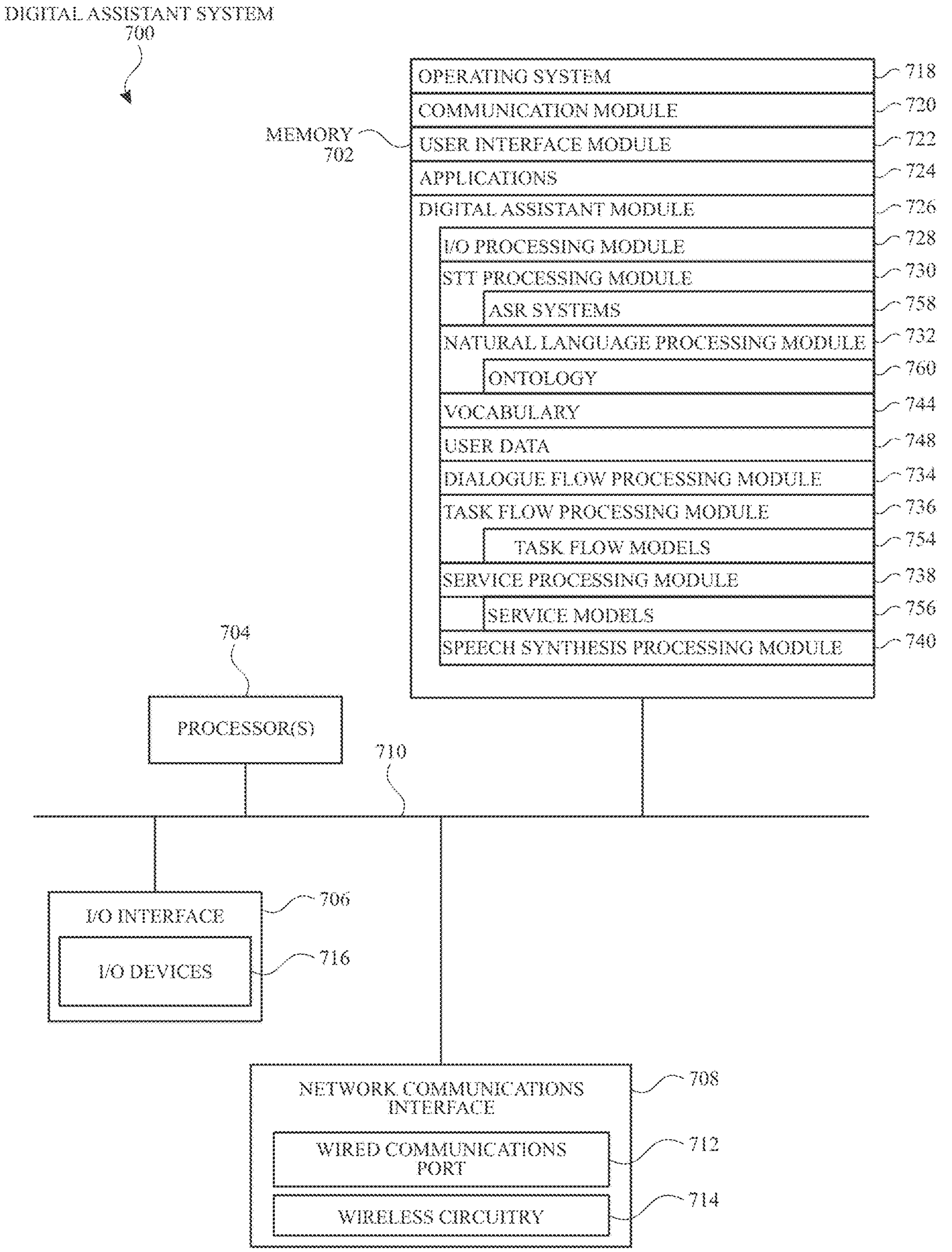
FIG. 7A is a block diagram illustrating a digital assistant system or a server portion thereof, according to various examples.

FIG. 7A illustrates a block diagram of digital assistant system 700 in accordance with various examples. In some examples, digital assistant system 700 is implemented on a standalone computer system. In some examples, digital assistant system 700 is distributed across multiple computers. In some examples, some of the modules and functions of the digital assistant are divided into a server portion and a client portion, where the client portion resides on one or more user devices (e.g., devices 104, 122, 200, 400, or 600) and communicates with the server portion (e.g., server system 108) through one or more networks, e.g., as shown in FIG. 1. In some examples, digital assistant system 700 is an implementation of server system 108 (and/or DA server 106) shown in FIG. 1. It should be noted that digital assistant system 700 is only one example of a digital assistant system, and that digital assistant system 700 can have more or fewer components than shown, can combine two or more components, or can have a different configuration or arrangement of the components. The various components shown in FIG. 7A are implemented in hardware, software instructions for execution by one or more processors, firmware, including one or more signal processing and/or application specific integrated circuits, or a combination thereof.

Digital assistant system 700 includes memory 702, one or more processors 704, input/output (I/O) interface 706, and network communications interface 708. These components can communicate with one another over one or more communication buses or signal lines 710.

In some examples, memory 702 includes a non-transitory computer-readable medium, such as high-speed random access memory and/or a non-volatile computer-readable storage medium (e.g., one or more magnetic disk storage devices, flash memory devices, or other non-volatile solid-state memory devices).

In some examples, I/O interface 706 couples input/output devices 716 of digital assistant system 700, such as displays, keyboards, touch screens, and microphones, to user interface module 722. I/O interface 706, in conjunction with user interface module 722, receives user inputs (e.g., voice input, keyboard inputs, touch inputs, etc.) and processes them accordingly. In some examples, e.g., when the digital assistant is implemented on a standalone user device, digital assistant system 700 includes any of the components and I/O communication interfaces described with respect to devices 200, 400, or 600 in FIGS. 2A, 4A, 6A-6B, respectively. In some examples, digital assistant system 700 represents the server portion of a digital assistant implementation and can interact with the user through a client-side portion residing on a user device (e.g., devices 104, 200, 400, or 600).

In some examples, the network communications interface 708 includes wired communication port(s) 712 and/or wireless transmission and reception circuitry 714. The wired communication port(s) receives and send communication signals via one or more wired interfaces, e.g., Ethernet, Universal Serial Bus (USB), FIREWIRE, etc. The wireless circuitry 714 receives and sends RF signals and/or optical signals from/to communications networks and other communications devices. The wireless communications use any of a plurality of communications standards, protocols, and technologies, such as GSM, EDGE, CDMA, TDMA, Bluetooth, Wi-Fi, VOIP, Wi-MAX, or any other suitable communication protocol. Network communications interface 708 enables communication between digital assistant system 700 with networks, such as the Internet, an intranet, and/or a wireless network, such as a cellular telephone network, a wireless local area network (LAN), and/or a metropolitan area network (MAN), and other devices.

In some examples, memory 702, or the computer-readable storage media of memory 702, stores programs, modules, instructions, and data structures including all or a subset of: operating system 718, communications module 720, user interface module 722, one or more applications 724, and digital assistant module 726. In particular, memory 702, or the computer-readable storage media of memory 702, stores instructions for performing the processes described below. One or more processors 704 execute these programs, modules, and instructions, and reads/writes from/to the data structures.

Operating system 718 (e.g., Darwin, RTXC, LINUX, UNIX, iOS, OS X, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

Communications module 720 facilitates communications between digital assistant system 700 with other devices over network communications interface 708. For example, communications module 720 communicates with RF circuitry 208 of electronic devices such as devices 200, 400, and 600 shown in FIGS. 2A, 4A, 6A-6B, respectively. Communications module 720 also includes various components for handling data received by wireless circuitry 714 and/or wired communications port 712.

User interface module 722 receives commands and/or inputs from a user via I/O interface 706 (e.g., from a keyboard, touch screen, pointing device, controller, and/or microphone), and generate user interface objects on a display. User interface module 722 also prepares and delivers outputs (e.g., speech, sound, animation, text, icons, vibrations, haptic feedback, light, etc.) to the user via the I/O interface 706 (e.g., through displays, audio channels, speakers, touch-pads, etc.).

Applications 724 include programs and/or modules that are configured to be executed by one or more processors 704. For example, if the digital assistant system is implemented on a standalone user device, applications 724 include user applications, such as games, a calendar application, a navigation application, or an email application. If digital assistant system 700 is implemented on a server, applications 724 include resource management applications, diagnostic applications, or scheduling applications, for example.

Memory 702 also stores digital assistant module 726 (or the server portion of a digital assistant). In some examples, digital assistant module 726 includes the following sub-modules, or a subset or superset thereof: input/output processing module 728, speech-to-text (STT) processing module 730, natural language processing module 732, dialogue flow processing module 734, task flow processing module 736, service processing module 738, and speech synthesis processing module 740. Each of these modules has access to one or more of the following systems or data and models of the digital assistant module 726, or a subset or superset thereof: ontology 760, vocabulary index 744, user data 748, task flow models 754, service models 756, and ASR systems 758.

In some examples, using the processing modules, data, and models implemented in digital assistant module 726, the digital assistant can perform at least some of the following: converting speech input into text; identifying a user's intent expressed in a natural language input received from the user; actively eliciting and obtaining information needed to fully infer the user's intent (e.g., by disambiguating words, games, intentions, etc.); determining the task flow for fulfilling the inferred intent; and executing the task flow to fulfill the inferred intent.

Figure 7B:
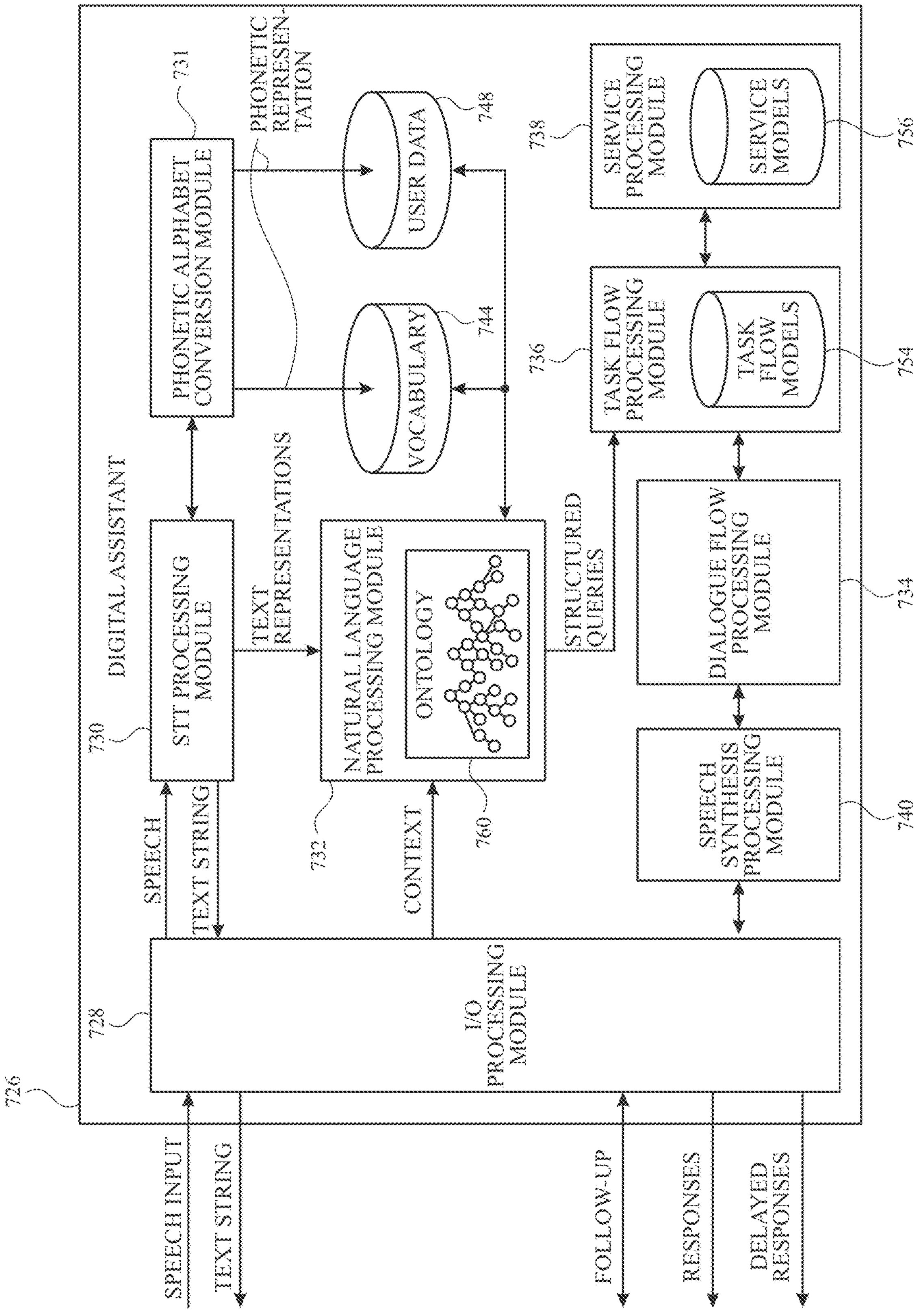
FIG. 7B illustrates the functions of the digital assistant shown in FIG. 7A, according to various examples.

In some examples, as shown in FIG. 7B, I/O processing module 728 interacts with the user through I/O devices 716 in FIG. 7A or with a user device (e.g., devices 104, 200, 400, or 600) through network communications interface 708 in FIG. 7A to obtain user input (e.g., a speech input) and to provide responses (e.g., as speech outputs) to the user input. I/O processing module 728 optionally obtains contextual information associated with the user input from the user device, along with or shortly after the receipt of the user input. The contextual information includes user-specific data, vocabulary, and/or preferences relevant to the user input. In some examples, the contextual information also includes software and hardware states of the user device at the time the user request is received, and/or information related to the surrounding environment of the user at the time that the user request was received. In some examples, I/O processing module 728 also sends follow-up questions to, and receive answers from, the user regarding the user request. When a user request is received by I/O processing module 728 and the user request includes speech input, I/O processing module 728 forwards the speech input to STT processing module 730 (or speech recognizer) for speech-to-text conversions.

STT processing module 730 includes one or more ASR systems 758. The one or more ASR systems 758 can process the speech input that is received through I/O processing module 728 to produce a recognition result. Each ASR system 758 includes a front-end speech pre-processor. The front-end speech pre-processor extracts representative features from the speech input. For example, the front-end speech pre-processor performs a Fourier transform on the speech input to extract spectral features that characterize the speech input as a sequence of representative multi-dimensional vectors. Further, each ASR system 758 includes one or more speech recognition models (e.g., acoustic models and/or language models) and implements one or more speech recognition engines. Examples of speech recognition models include Hidden Markov Models, Gaussian-Mixture Models, Deep Neural Network Models, n-gram language models, and other statistical models. Examples of speech recognition engines include the dynamic time warping based engines and weighted finite-state transducers (WFST) based engines. The one or more speech recognition models and the one or more speech recognition engines are used to process the extracted representative features of the front-end speech pre-processor to produce intermediate recognitions results (e.g., phonemes, phonemic strings, and sub-words), and ultimately, text recognition results (e.g., words, word strings, or sequence of tokens). In some examples, the speech input is processed at least partially by a third-party service or on the user's device (e.g., device 104, 200, 400, or 600) to produce the recognition result. Once STT processing module 730 produces recognition results containing a text string (e.g., words, or sequence of words, or sequence of tokens), the recognition result is passed to natural language processing module 732 for intent deduction. In some examples, STT processing module 730 produces multiple candidate text representations of the speech input. Each candidate text representation is a sequence of words or tokens corresponding to the speech input. In some examples, each candidate text representation is associated with a speech recognition confidence score. Based on the speech recognition confidence scores, STT processing module 730 ranks the candidate text representations and provides the n-best (e.g., n highest ranked) candidate text representation(s) to natural language processing module 732 for intent deduction, where n is a predetermined integer greater than zero. For example, in one example, only the highest ranked (n=1) candidate text representation is passed to natural language processing module 732 for intent deduction. In another example, the five highest ranked (n=5) candidate text representations are passed to natural language processing module 732 for intent deduction.

More details on the speech-to-text processing are described in U.S. Utility application Ser. No. 13/236,942 for "Consolidating Speech Recognition Results," filed on Sep. 20, 2011, the entire disclosure of which is incorporated herein by reference.

In some examples, STT processing module 730 includes and/or accesses a vocabulary of recognizable words via phonetic alphabet conversion module 731. Each vocabulary word is associated with one or more candidate pronunciations of the word represented in a speech recognition phonetic alphabet. In particular, the vocabulary of recognizable words includes a word that is associated with a plurality of candidate pronunciations. For example, the vocabulary includes the word "tomato" that is associated with the candidate pronunciations of tə'meɪɾoʊ and /tə'mɑtoʊ/. Further, vocabulary words are associated with custom candidate pronunciations that are based on previous speech inputs from the user. Such custom candidate pronunciations are stored in STT processing module 730 and are associated with a particular user via the user's profile on the device. In some examples, the candidate pronunciations for words are determined based on the spelling of the word and one or more linguistic and/or phonetic rules. In some examples, the candidate pronunciations are manually generated, e.g., based on known canonical pronunciations.

In some examples, the candidate pronunciations are ranked based on the commonness of the candidate pronunciation. For example, the candidate pronunciation tə'meɪɾoʊ is ranked higher than /tə'mɑtoʊ/, because the former is a more commonly used pronunciation (e.g., among all users, for users in a particular geographical region, or for any other appropriate subset of users). In some examples, candidate pronunciations are ranked based on whether the candidate pronunciation is a custom candidate pronunciation associated with the user. For example, custom candidate pronunciations are ranked higher than canonical candidate pronunciations. This can be useful for recognizing proper nouns having a unique pronunciation that deviates from canonical pronunciation. In some examples, candidate pronunciations are associated with one or more speech characteristics, such as geographic origin, nationality, or ethnicity. For example, the candidate pronunciation tə'meɪɾoʊ is associated with the United States, whereas the candidate pronunciation /tə'mɑtoʊ/ is associated with Great Britain. Further, the rank of the candidate pronunciation is based on one or more characteristics (e.g., geographic origin, nationality, ethnicity, etc.) of the user stored in the user's profile on the device. For example, it can be determined from the user's profile that the user is associated with the United States. Based on the user being associated with the United States, the candidate pronunciation tə'meɪɾoʊ (associated with the United States) is ranked higher than the candidate pronunciation /tə'mɑtoʊ/ (associated with Great Britain). In some examples, one of the ranked candidate pronunciations is selected as a predicted pronunciation (e.g., the most likely pronunciation).

When a speech input is received, STT processing module 730 is used to determine the phonemes corresponding to the speech input (e.g., using an acoustic model), and then attempt to determine words that match the phonemes (e.g., using a language model). For example, if STT processing module 730 first identifies the sequence of phonemes tə'meɪɾoʊ corresponding to a portion of the speech input, it can then determine, based on vocabulary index 744, that this sequence corresponds to the word "tomato."

In some examples, STT processing module 730 uses approximate matching techniques to determine words in an utterance. Thus, for example, the STT processing module 730 determines that the sequence of phonemes tə'meɪɾoʊ corresponds to the word "tomato," even if that particular sequence of phonemes is not one of the candidate sequence of phonemes for that word.

Natural language processing module 732 ("natural language processor") of the digital assistant takes the n-best candidate text representation(s) ("word sequence(s)" or "token sequence(s)") generated by STT processing module 730, and attempts to associate each of the candidate text representations with one or more "actionable intents" recognized by the digital assistant. An "actionable intent" (or "user intent") represents a task that can be performed by the digital assistant, and can have an associated task flow implemented in task flow models 754. The associated task flow is a series of programmed actions and steps that the digital assistant takes in order to perform the task. The scope of a digital assistant's capabilities is dependent on the number and variety of task flows that have been implemented and stored in task flow models 754, or in other words, on the number and variety of "actionable intents" that the digital assistant recognizes. The effectiveness of the digital assistant, however, also dependents on the assistant's ability to infer the correct "actionable intent(s)" from the user request expressed in natural language.

In some examples, in addition to the sequence of words or tokens obtained from STT processing module 730, natural language processing module 732 also receives contextual information associated with the user request, e.g., from I/O processing module 728. The natural language processing module 732 optionally uses the contextual information to clarify, supplement, and/or further define the information contained in the candidate text representations received from STT processing module 730. The contextual information includes, for example, user preferences, hardware, and/or software states of the user device, sensor information collected before, during, or shortly after the user request, prior interactions (e.g., dialogue) between the digital assistant and the user, and the like. As described herein, contextual information is, in some examples, dynamic, and changes with time, location, content of the dialogue, and other factors.

In some examples, the natural language processing is based on, e.g., ontology 760. Ontology 760 is a hierarchical structure containing many nodes, each node representing either an "actionable intent" or a "property" relevant to one or more of the "actionable intents" or other "properties." As noted above, an "actionable intent" represents a task that the digital assistant is capable of performing, i.e., it is "actionable" or can be acted on. A "property" represents a parameter associated with an actionable intent or a sub-aspect of another property. A linkage between an actionable intent node and a property node in ontology 760 defines how a parameter represented by the property node pertains to the task represented by the actionable intent node.

In some examples, ontology 760 is made up of actionable intent nodes and property nodes. Within ontology 760, each actionable intent node is linked to one or more property nodes either directly or through one or more intermediate property nodes. Similarly, each property node is linked to one or more actionable intent nodes either directly or through one or more intermediate property nodes. For example, as shown in FIG. 7C, ontology 760 includes a "restaurant reservation" node (i.e., an actionable intent node). Property nodes "restaurant," "date/time" (for the reservation), and "party size" are each directly linked to the actionable intent node (i.e., the "restaurant reservation" node).

Figure 7C:
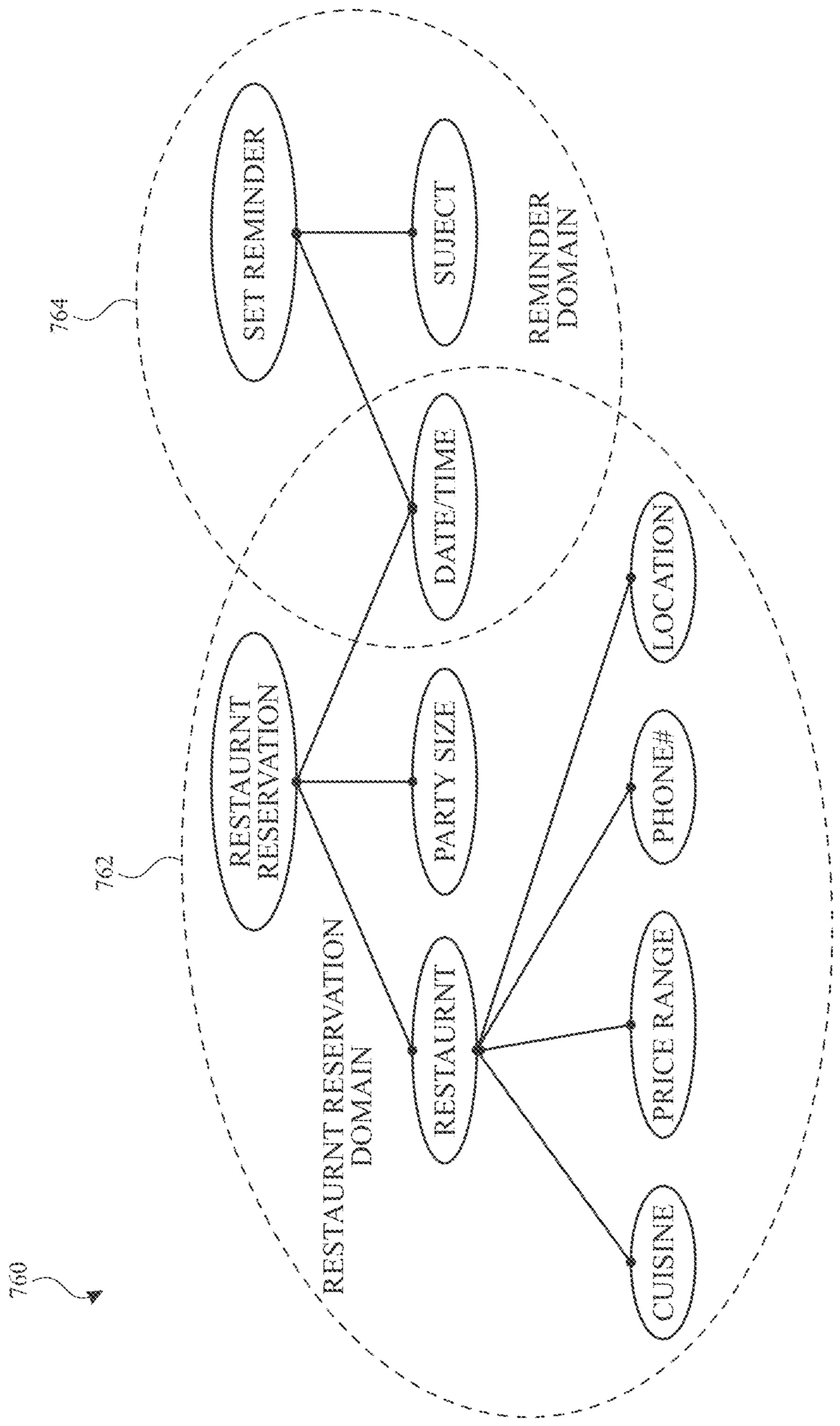
FIG. 7C illustrates a portion of an ontology, according to various examples.

In addition, property nodes "cuisine," "price range," "phone number," and "location" are sub-nodes of the property node "restaurant," and are each linked to the "restaurant reservation" node (i.e., the actionable intent node) through the intermediate property node "restaurant." For another example, as shown in FIG. 7C, ontology 760 also includes a "set reminder" node (i.e., another actionable intent node). Property nodes "date/time" (for setting the reminder) and "subject" (for the reminder) are each linked to the "set reminder" node. Since the property "date/time" is relevant to both the task of making a restaurant reservation and the task of setting a reminder, the property node "date/time" is linked to both the "restaurant reservation" node and the "set reminder" node in ontology 760.

An actionable intent node, along with its linked property nodes, is described as a "domain." In the present discussion, each domain is associated with a respective actionable intent, and refers to the group of nodes (and the relationships there between) associated with the particular actionable intent. For example, ontology 760 shown in FIG. 7C includes an example of restaurant reservation domain 762 and an example of reminder domain 764 within ontology 760. The restaurant reservation domain includes the actionable intent node "restaurant reservation," property nodes "restaurant," "date/time," and "party size," and sub-property nodes "cuisine," "price range," "phone number," and "location." Reminder domain 764 includes the actionable intent node "set reminder," and property nodes "subject" and "date/time." In some examples, ontology 760 is made up of many domains. Each domain shares one or more property nodes with one or more other domains. For example, the "date/time" property node is associated with many different domains (e.g., a scheduling domain, a travel reservation domain, a movie ticket domain, etc.), in addition to restaurant reservation domain 762 and reminder domain 764.

While FIG. 7C illustrates two example domains within ontology 760, other domains include, for example, "find a movie," "initiate a phone call," "find directions," "schedule a meeting," "send a message," and "provide an answer to a question," "read a list," "providing navigation instructions," "provide instructions for a task" and so on. A "send a message" domain is associated with a "send a message" actionable intent node, and further includes property nodes such as "recipient(s)," "message type," and "message body." The property node "recipient" is further defined, for example, by the sub-property nodes such as "recipient name" and "message address."

In some examples, ontology 760 includes all the domains (and hence actionable intents) that the digital assistant is capable of understanding and acting upon. In some examples, ontology 760 is modified, such as by adding or removing entire domains or nodes, or by modifying relationships between the nodes within the ontology 760.

In some examples, nodes associated with multiple related actionable intents are clustered under a "super domain" in ontology 760. For example, a "travel" super-domain includes a cluster of property nodes and actionable intent nodes related to travel. The actionable intent nodes related to travel includes "airline reservation," "hotel reservation," "car rental," "get directions," "find points of interest," and so on. The actionable intent nodes under the same super domain (e.g., the "travel" super domain) have many property nodes in common. For example, the actionable intent nodes for "airline reservation," "hotel reservation," "car rental," "get directions," and "find points of interest" share one or more of the property nodes "start location," "destination," "departure date/time," "arrival date/time," and "party size."

In some examples, each node in ontology 760 is associated with a set of words and/or phrases that are relevant to the property or actionable intent represented by the node. The respective set of words and/or phrases associated with each node are the so-called "vocabulary" associated with the node. The respective set of words and/or phrases associated with each node are stored in vocabulary index 744 in association with the property or actionable intent represented by the node. For example, returning to FIG. 7B, the vocabulary associated with the node for the property of "restaurant" includes words such as "food," "drinks," "cuisine," "hungry," "eat," "pizza," "fast food," "meal," and so on. For another example, the vocabulary associated with the node for the actionable intent of "initiate a phone call" includes words and phrases such as "call," "phone," "dial," "ring," "call this number," "make a call to," and so on. The vocabulary index 744 optionally includes words and phrases in different languages.

Natural language processing module 732 receives the candidate text representations (e.g., text string(s) or token sequence(s)) from STT processing module 730, and for each candidate representation, determines what nodes are implicated by the words in the candidate text representation. In some examples, if a word or phrase in the candidate text representation is found to be associated with one or more nodes in ontology 760 (via vocabulary index 744), the word or phrase "triggers" or "activates" those nodes. Based on the quantity and/or relative importance of the activated nodes, natural language processing module 732 selects one of the actionable intents as the task that the user intended the digital assistant to perform. In some examples, the domain that has the most "triggered" nodes is selected. In some examples, the domain having the highest confidence value (e.g., based on the relative importance of its various triggered nodes) is selected. In some examples, the domain is selected based on a combination of the number and the importance of the triggered nodes. In some examples, additional factors are considered in selecting the node as well, such as whether the digital assistant has previously correctly interpreted a similar request from a user.

User data 748 includes user-specific information, such as user-specific vocabulary, user preferences, user address, user's default and secondary languages, user's contact list, and other short-term or long-term information for each user. In some examples, natural language processing module 732 uses the user-specific information to supplement the information contained in the user input to further define the user intent. For example, for a user request "invite my friends to my birthday party," natural language processing module 732 is able to access user data 748 to determine who the "friends" are and when and where the "birthday party" would be held, rather than requiring the user to provide such information explicitly in his/her request.

It should be recognized that in some examples, natural language processing module 732 is implemented using one or more machine learning mechanisms (e.g., neural networks). In particular, the one or more machine learning mechanisms are configured to receive a candidate text representation and contextual information associated with the candidate text representation. Based on the candidate text representation and the associated contextual information, the one or more machine learning mechanisms are configured to determine intent confidence scores over a set of candidate actionable intents. Natural language processing module 732 can select one or more candidate actionable intents from the set of candidate actionable intents based on the determined intent confidence scores. In some examples, an ontology (e.g., ontology 760) is also used to select the one or more candidate actionable intents from the set of candidate actionable intents.

Other details of searching an ontology based on a token string are described in U.S. Utility application Ser. No. 12/341,743 for "Method and Apparatus for Searching Using An Active Ontology," filed Dec. 22, 2008, the entire disclosure of which is incorporated herein by reference.

In some examples, once natural language processing module 732 identifies an actionable intent (or domain) based on the user request, natural language processing module 732 generates a structured query to represent the identified actionable intent. In some examples, the structured query includes parameters for one or more nodes within the domain for the actionable intent, and at least some of the parameters are populated with the specific information and requirements specified in the user request. For example, the user says "Make me a dinner reservation at a sushi place at 7." In this case, natural language processing module 732 is able to correctly identify the actionable intent to be "restaurant reservation" based on the user input. According to the ontology, a structured query for a "restaurant reservation" domain includes parameters such as {Cuisine}, {Time}, {Date}, {Party Size}, and the like. In some examples, based on the speech input and the text derived from the speech input using STT processing module 730, natural language processing module 732 generates a partial structured query for the restaurant reservation domain, where the partial structured query includes the parameters {Cuisine="Sushi"} and {Time="7 pm"}. However, in this example, the user's utterance contains insufficient information to complete the structured query associated with the domain. Therefore, other necessary parameters such as {Party Size} and {Date} are not specified in the structured query based on the information currently available. In some examples, natural language processing module 732 populates some parameters of the structured query with received contextual information. For example, in some examples, if the user requested a sushi restaurant "near me," natural language processing module 732 populates a {location} parameter in the structured query with GPS coordinates from the user device.

In some examples, natural language processing module 732 identifies multiple candidate actionable intents for each candidate text representation received from STT processing module 730. Further, in some examples, a respective structured query (partial or complete) is generated for each identified candidate actionable intent. Natural language processing module 732 determines an intent confidence score for each candidate actionable intent and ranks the candidate actionable intents based on the intent confidence scores. In some examples, natural language processing module 732 passes the generated structured query (or queries), including any completed parameters, to task flow processing module 736 ("task flow processor"). In some examples, the structured query (or queries) for the m-best (e.g., m highest ranked) candidate actionable intents are provided to task flow processing module 736, where m is a predetermined integer greater than zero. In some examples, the structured query (or queries) for the m-best candidate actionable intents are provided to task flow processing module 736 with the corresponding candidate text representation(s).

Other details of inferring a user intent based on multiple candidate actionable intents determined from multiple candidate text representations of a speech input are described in U.S. Utility application Ser. No. 14/298,725 for "System and Method for Inferring User Intent From Speech Inputs," filed Jun. 6, 2014, the entire disclosure of which is incorporated herein by reference.

Task flow processing module 736 is configured to receive the structured query (or queries) from natural language processing module 732, complete the structured query, if necessary, and perform the actions required to "complete" the user's ultimate request. In some examples, the various procedures necessary to complete these tasks are provided in task flow models 754. In some examples, task flow models 754 include procedures for obtaining additional information from the user and task flows for performing actions associated with the actionable intent.

As described above, in order to complete a structured query, task flow processing module 736 needs to initiate additional dialogue with the user in order to obtain additional information, and/or disambiguate potentially ambiguous utterances. When such interactions are necessary, task flow processing module 736 invokes dialogue flow processing module 734 to engage in a dialogue with the user. In some examples, dialogue flow processing module 734 determines how (and/or when) to ask the user for the additional information and receives and processes the user responses. The questions are provided to and answers are received from the users through I/O processing module 728. In some examples, dialogue flow processing module 734 presents dialogue output to the user via audio and/or visual output, and receives input from the user via spoken or physical (e.g., clicking) responses. Continuing with the example above, when task flow processing module 736 invokes dialogue flow processing module 734 to determine the "party size" and "date" information for the structured query associated with the domain "restaurant reservation," dialogue flow processing module 734 generates questions such as "For how many people?" and "On which day?" to pass to the user. Once answers are received from the user, dialogue flow processing module 734 then populates the structured query with the missing information, or pass the information to task flow processing module 736 to complete the missing information from the structured query.

Once task flow processing module 736 has completed the structured query for an actionable intent, task flow processing module 736 proceeds to perform the ultimate task associated with the actionable intent. Accordingly, task flow processing module 736 executes the steps and instructions in the task flow model according to the specific parameters contained in the structured query. For example, the task flow model for the actionable intent of "restaurant reservation" includes steps and instructions for contacting a restaurant and actually requesting a reservation for a particular party size at a particular time. For example, using a structured query such as: {restaurant reservation, restaurant=ABC Café, date=Mar. 12, 2012, time=7 pm, party size=5}, task flow processing module 736 performs the steps of: (1) logging onto a server of the ABC Café or a restaurant reservation system such as OPENTABLE®, (2) entering the date, time, and party size information in a form on the website, (3) submitting the form, and (4) making a calendar entry for the reservation in the user's calendar.

In some examples, task flow processing module 736 employs the assistance of service processing module 738 ("service processing module") to complete a task requested in the user input or to provide an informational answer requested in the user input. For example, service processing module 738 acts on behalf of task flow processing module 736 to make a phone call, set a calendar entry, invoke a map search, invoke or interact with other user applications installed on the user device, and invoke or interact with third-party services (e.g., a restaurant reservation portal, a social networking website, a banking portal, etc.). In some examples, the protocols and application programming interfaces (API) required by each service are specified by a respective service model among service models 756. Service processing module 738 accesses the appropriate service model for a service and generates requests for the service in accordance with the protocols and APIs required by the service according to the service model.

For example, if a restaurant has enabled an online reservation service, the restaurant submits a service model specifying the necessary parameters for making a reservation and the APIs for communicating the values of the necessary parameter to the online reservation service. When requested by task flow processing module 736, service processing module 738 establishes a network connection with the online reservation service using the web address stored in the service model, and sends the necessary parameters of the reservation (e.g., time, date, party size) to the online reservation interface in a format according to the API of the online reservation service.

In some examples, natural language processing module 732, dialogue flow processing module 734, and task flow processing module 736 are used collectively and iteratively to infer and define the user's intent, obtain information to further clarify and refine the user intent, and finally generate a response (i.e., an output to the user, or the completion of a task) to fulfill the user's intent. The generated response is a dialogue response to the speech input that at least partially fulfills the user's intent. Further, in some examples, the generated response is output as a speech output. In these examples, the generated response is sent to speech synthesis processing module 740 (e.g., speech synthesizer) where it can be processed to synthesize the dialogue response in speech form. In yet other examples, the generated response is data content relevant to satisfying a user request in the speech input.

In examples where task flow processing module 736 receives multiple structured queries from natural language processing module 732, task flow processing module 736 initially processes the first structured query of the received structured queries to attempt to complete the first structured query and/or execute one or more tasks or actions represented by the first structured query. In some examples, the first structured query corresponds to the highest ranked actionable intent. In other examples, the first structured query is selected from the received structured queries based on a combination of the corresponding speech recognition confidence scores and the corresponding intent confidence scores. In some examples, if task flow processing module 736 encounters an error during processing of the first structured query (e.g., due to an inability to determine a necessary parameter), the task flow processing module 736 can proceed to select and process a second structured query of the received structured queries that corresponds to a lower ranked actionable intent. The second structured query is selected, for example, based on the speech recognition confidence score of the corresponding candidate text representation, the intent confidence score of the corresponding candidate actionable intent, a missing necessary parameter in the first structured query, or any combination thereof.

Speech synthesis processing module 740 is configured to synthesize speech outputs for presentation to the user. Speech synthesis processing module 740 synthesizes speech outputs based on text provided by the digital assistant. For example, the generated dialogue response is in the form of a text string. Speech synthesis processing module 740 converts the text string to an audible speech output. Speech synthesis processing module 740 uses any appropriate speech synthesis technique in order to generate speech outputs from text, including, but not limited, to concatenative synthesis, unit selection synthesis, diphone synthesis, domain-specific synthesis, formant synthesis, articulatory synthesis, hidden Markov model (HMM) based synthesis, and sinewave synthesis. In some examples, speech synthesis processing module 740 is configured to synthesize individual words based on phonemic strings corresponding to the words. For example, a phonemic string is associated with a word in the generated dialogue response. The phonemic string is stored in metadata associated with the word. Speech synthesis processing module 740 is configured to directly process the phonemic string in the metadata to synthesize the word in speech form.

In some examples, instead of (or in addition to) using speech synthesis processing module 740, speech synthesis is performed on a remote device (e.g., the server system 108), and the synthesized speech is sent to the user device for output to the user. For example, this can occur in some implementations where outputs for a digital assistant are generated at a server system. And because server systems generally have more processing power or resources than a user device, it is possible to obtain higher quality speech outputs than would be practical with client-side synthesis.

Additional details on digital assistants can be found in the U.S. Utility application Ser. No. 12/987,982, entitled "Intelligent Automated Assistant," filed Jan. 10, 2011, and U.S. Utility application Ser. No. 13/251,088, entitled "Generating and Processing Task Items That Represent Tasks to Perform," filed Sep. 30, 2011, the entire disclosures of which are incorporated herein by reference.

Figure 8:
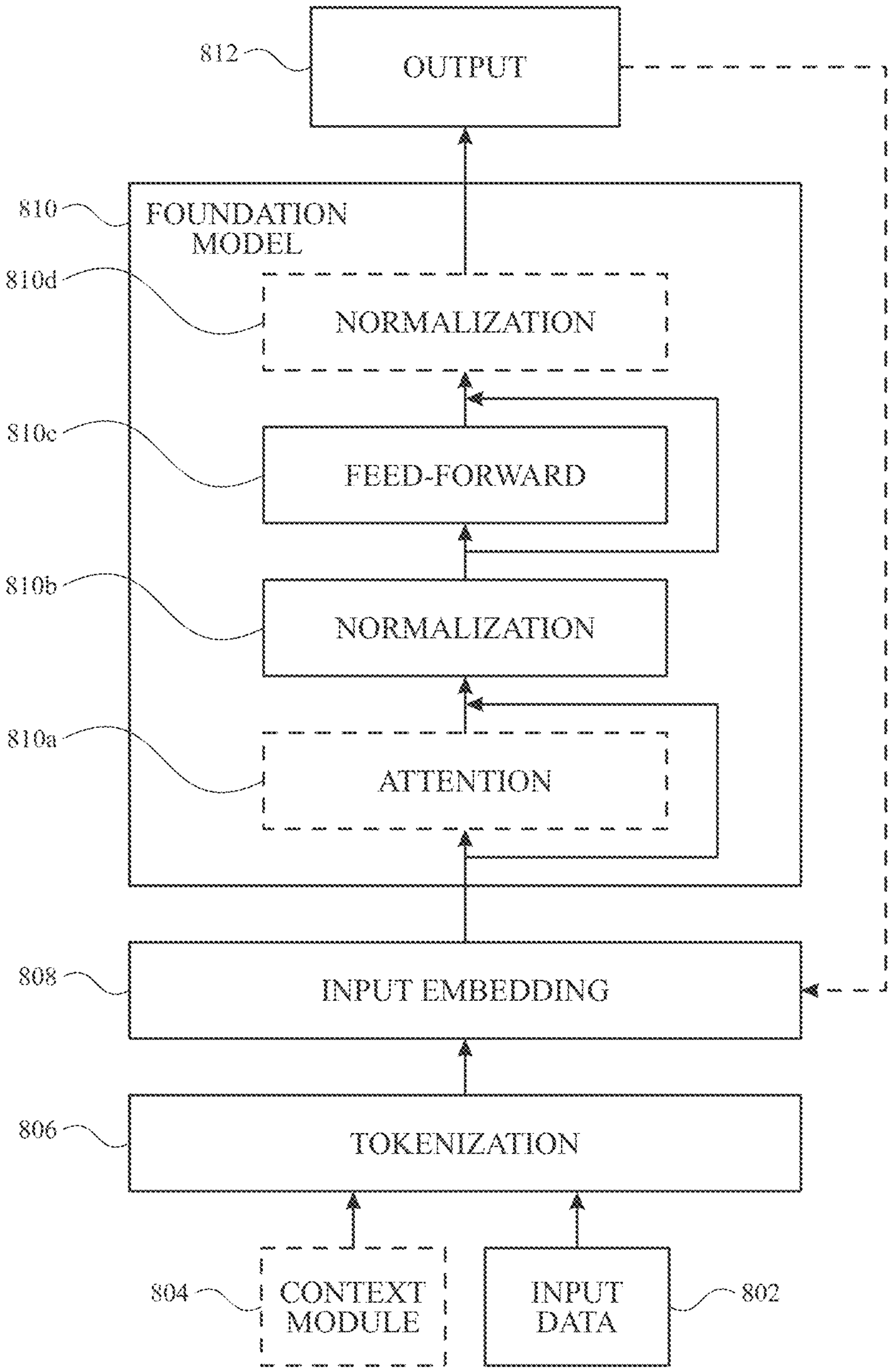
FIG. 8 illustrates exemplary a foundation system including a foundation model, according to some embodiments.

FIG. 8 illustrates exemplary foundation system 800 including foundation model 810, according to various examples. In some examples, the blocks of foundation system 800 are combined, the order of the blocks is changed, and/or blocks of foundation system 800 are removed.

Foundation system 800 includes tokenization module 806, input embedding module 808, and foundation model 810 which use input data 802 and, optionally, context module 804 to train foundation model 810 to process input data 802 to determine output 812.

In some examples, the various components of digital assistant system 700 (e.g., digital assistant module 726, operating system (e.g., 226 or 718), and/or software applications (e.g., 236 and/or 724) installed on device 104, 200, 400, 600, and/or 901) include and/or are implemented using generative artificial intelligence (AI) such as foundation model 810. In some examples, foundation model 810 include a subset of machine learning models that are trained to generate text, images, and/or other media based on sets of training data that include large amounts of a particular type of data. Foundation model 810 is then integrated into the components of digital assistant system 700 (or otherwise available to digital assistant system 700, (e.g., digital assistant module 726, operating system (e.g., 226 or 718), and/or software applications (e.g., 236 and/or 724) installed on device 104, 200, 400, 600, and/or 901 via an API) to provide text, images, and/or other media that digital assistant system 700 uses to determine tasks, perform tasks, and/or provide the outputs of tasks.

Foundation models are generally trained using large sets unlabeled data first and then later adapted to a specific task within the architecture of digital assistant system 700. Thus, a specific task or type of output is not encoded into the foundation models, rather the trained foundation model emerges based on the self-supervised training using the unlabeled data. The trained foundation model is then adapted to a variety of tasks based on the needs of the digital assistant system 700 to efficiently perform tasks for a user.

Generative AI models, such as foundation model 810, are trained on large quantities of data with self-supervised or semi-supervised learning to be adapted to a specific downstream task. For example, foundation model 810 is trained with large sets of different images and corresponding text or metadata to determine the description of newly captured image data as output 812. These descriptions can then be used by digital assistant system 700 to determine user intent, tasks, and/or other information that can be used to perform tasks. For example, generative AI models such as Midjourney, DALL-E, and stable diffusion are trained on large sets of images and are able to convert text to a generated image.

Large language models (LLM) are a type of foundation model that provide text output after being trained on large sets of input text data. As with other foundation models, LLM's can be trained in a self-supervised manner and thus the output of different LLM's trained on the same large set of input text can be different. These LLM's can then be adapted for use with digital assistant system 700 to specific types of text. Thus, in some examples, the LLM is trained to determine a summary of text provided to the LLM as an input while in other examples, the LLM is trained to predict text based on the set of input text. Thus, the LLM can efficiently process large amounts of input text to provide the digital assistant with text that can be used to determine and/or perform tasks. For example, GPT and LLAMA are exemplary large language models that process large amounts of input text and generates text that can be used by a digital assistant, a software application, and/or an operating system.

In some examples, the LLM may be trained in a semi-supervised manner and/or provided human feedback to refine the output of the LLM. In this way, the LLM may be adapted to provide the specific output required for a particular task of digital assistant system 700, such as a summary of large amounts of text or a task for digital assistant system 700 to perform. Further, the input provided to the LLM can be adapted such that the LLM processes data as or more efficiently than digital assistant system 700 could without the use of the LLM.

Once foundation model 810 (e.g., an LLM) has been fully trained, foundation model 810 can process input data 802 as discussed below to determine output 812 which may be used to further train foundation model 810 or can be processed by digital assistant 700 to perform a task and/or provide an output to the user.

Specifically, input data 802 is received and provided to tokenization module 806 which converts input data 802 into a token and/or a series of tokens which can be processed by input embedding module 808 into a format that is understood by foundation model 810. Tokenization module 806 converts input data into a series of characters that has a specific semantic meaning to foundation model 810.

In some examples, tokenization module 806 tokenizes contextual data from context module 804 to add further information to input data 802 for processing by foundation model 810. For example, context module 804 can provide information related to input data 802 such as a location that input data 802 was received, a time that input data 802 was received, other data that was received contemporaneously with input data 802, and/or other contextual information that relates to input data 802. Tokenization module 806 can then tokenize this contextual data with input data 802 to be provided to foundation model 810.

After input data 802 has been tokenized, input data 802 is provided to input embedding module 808 to convert the tokens to a vector representation that can be processed by foundation model 810. In some examples, the vector representation includes information provided by context module 804. In some examples, the vector representation includes information determined from output 812. Accordingly, input embedding module 808 converts the various data provided as an input into a format that foundation model 810 can parse and process.

For example, when foundation model 810 is a large language model (LLM) tokenization module 806 converts input data 802 into text which is then converted into a vector representation by input embedding module 808 that can be processed by foundation model 810 to determine a response to input data 802 as output 812 or to determine a summary of input data 802 as output 812. As another example, when foundation model 810 is a model that has been trained to determine descriptions of images, input data 802 of images can be tokenized into characters and then converted into a vector representation by input embedding module 808 that is processed by foundation model 810 to determine a description of the images as output 812.

Foundation model 810 processes the received vector representation using a series of layers including, in some embodiments, attention layer 810*a*, normalization layer 810*b*, feed-forward layer 810*c*, and/or normalization layer 810*d*. In some examples, foundation model 810 includes additional layers similar to these layers to further process the vector representation. Accordingly, foundation model 810 can be customized based on the specific task that foundation model 810 has been trained to perform. Each of the layers of foundation model 810 perform a specific task to process the vector representation into output 812.

Attention layer 810*a* provides access to all portions of the vector representation at the same time, increasing the speed at which the vector representation can be processed and ensuring that the data is processed equally across the portions of the vector representation. Normalization layer 810*b* and normalization layer 810*d* scale the data that is being processed by foundation model 810 up or down based on the needs of the other layers of foundation model 810. This allows foundation model 810 to manipulate the data during processing as needed. Feed-forward layer 810*c* assigns weights to the data that is being processed and provides the data for further processing within foundation model 810. These layers work together to process the vector representation provided to foundation model 810 to determine the appropriate output 812.

For example, as discussed above, when foundation model 810 is a large language model (LLM) foundation model 810 processes input text to determine a summary and/or further follow-up text as output 812. As another example, as discussed above, when foundation model 810 is a model trained to determine descriptions of images, foundation model 810 processes input images to determine a description of the image and/or tasks that can be performed based on the content of the images as output 812.

In some examples, output 812 is further processed by digital assistant system 700 (e.g., digital assistant module 726, operating system (e.g., 226 or 718), and/or software applications (e.g., 236 and/or 724) installed on device 104, 200, 400, 600, and/or 901)) to provide an output or execute a task. For example, when output 812 is a sentence describing a task that digital assistant system 700 has performed, digital assistant system 700 can use the text to create a visual or audio output to be provided to a user. As another example, when output 812 is text that includes a function and a parameter for the function, digital assistant system 700 can perform a function call to execute the function with the provided parameter.

In some examples, digital assistant system 700 includes multiple generative AI (e.g., foundation) models that work together to process data in an efficient manner. In some examples, components of digital assistant system 700 may be replaced with generative AI (e.g., foundation) models trained to perform the same function as the component. In some examples, these generative AI models are more efficient than traditional components and/or provide more flexible processing and/or outputs for digital assistant system 700 to utilize.

As described herein, content is automatically generated by one or more computers in response to a request to generate the content. The automatically-generated content is optionally generated on-device (e.g., generated at least in part by a computer system at which a request to generate the content is received) and/or generated off-device (e.g., generated at least in part by one or more nearby computers that are available via a local network or one or more computers that are available via the internet). This automatically-generated content optionally includes visual content (e.g., images, graphics, and/or video), audio content, and/or text content.

In some embodiments, novel automatically-generated content that is generated via one or more artificial intelligence (AI) processes is referred to as generative content (e.g., generative images, generative graphics, generative video, generative audio, and/or generative text). Generative content is typically generated by an AI process based on a prompt that is provided to the AI process. An AI process typically uses one or more AI models to generate an output based on an input. An AI process optionally includes one or more pre-processing steps to adjust the input before it is used by the AI model to generate an output (e.g., adjustment to a user-provided prompt, creation of a system-generated prompt, and/or AI model selection). An AI process optionally includes one or more post-processing steps to adjust the output by the AI model (e.g., passing AI model output to a different AI model, upscaling, downscaling, cropping, formatting, and/or adding or removing metadata) before the output of the AI model used for other purposes such as being provided to a different software process for further processing or being presented (e.g., visually or audibly) to a user. An AI process that generates generative content is sometimes referred to as a generative AI process.

A prompt for generating generative content can include one or more of: one or more words (e.g., a natural language prompt that is written or spoken), one or more images, one or more drawings, and/or one or more videos. AI processes can include machine learning models including neural networks. Neural networks can include transformer-based deep neural networks such as large language models (LLMs). Generative pre-trained transformer models are a type of LLM that can be effective at generating novel generative content based on a prompt. Some AI processes use a prompt that includes text to generate either different generative text, generative audio content, and/or generative visual content. Some AI processes use a prompt that includes visual content and/or an audio content to generate generative text (e.g., a transcription of audio and/or a description of the visual content). Some multi-modal AI processes use a prompt that includes multiple types of content (e.g., text, images, audio, video, and/or other sensor data) to generate generative content. A prompt sometimes also includes values for one or more parameters indicating an importance of various parts of the prompt. Some prompts include a structured set of instructions that can be understood by an AI process that include phrasing, a specified style, relevant context (e.g., starting point content and/or one or more examples), and/or a role for the AI process.

Generative content is generally based on the prompt but is not deterministically selected from pre-generated content and is, instead, generated using the prompt as a starting point. In some embodiments, pre-existing content (e.g., audio, text, and/or visual content) is used as part of the prompt for creating generative content (e.g., the pre-existing content is used as a starting point for creating the generative content). For example, a prompt could request that a block of text be summarized or rewritten in a different tone, and the output would be generative text that is summarized or written in the different tone. Similarly a prompt could request that visual content be modified to include or exclude content specified by a prompt (e.g., removing an identified feature in the visual content, adding a feature to the visual content that is described in a prompt, changing a visual style of the visual content, and/or creating additional visual elements outside of a spatial or temporal boundary of the visual content that are based on the visual content). In some embodiments, a random or pseudo-random seed is used as part of the prompt for creating generative content (e.g., the random or pseud-random seed content is used as a starting point for creating the generative content). For example when generating an image from a diffusion model, a random noise pattern is iteratively denoised based on the prompt to generate an image that is based on the prompt. While specific types of AI processes have been described herein, it should be understood that a variety of different AI processes could be used to generate generative content based on a prompt.

4. A Digital Assistant System with a Local and Remote Model

Figure 9:
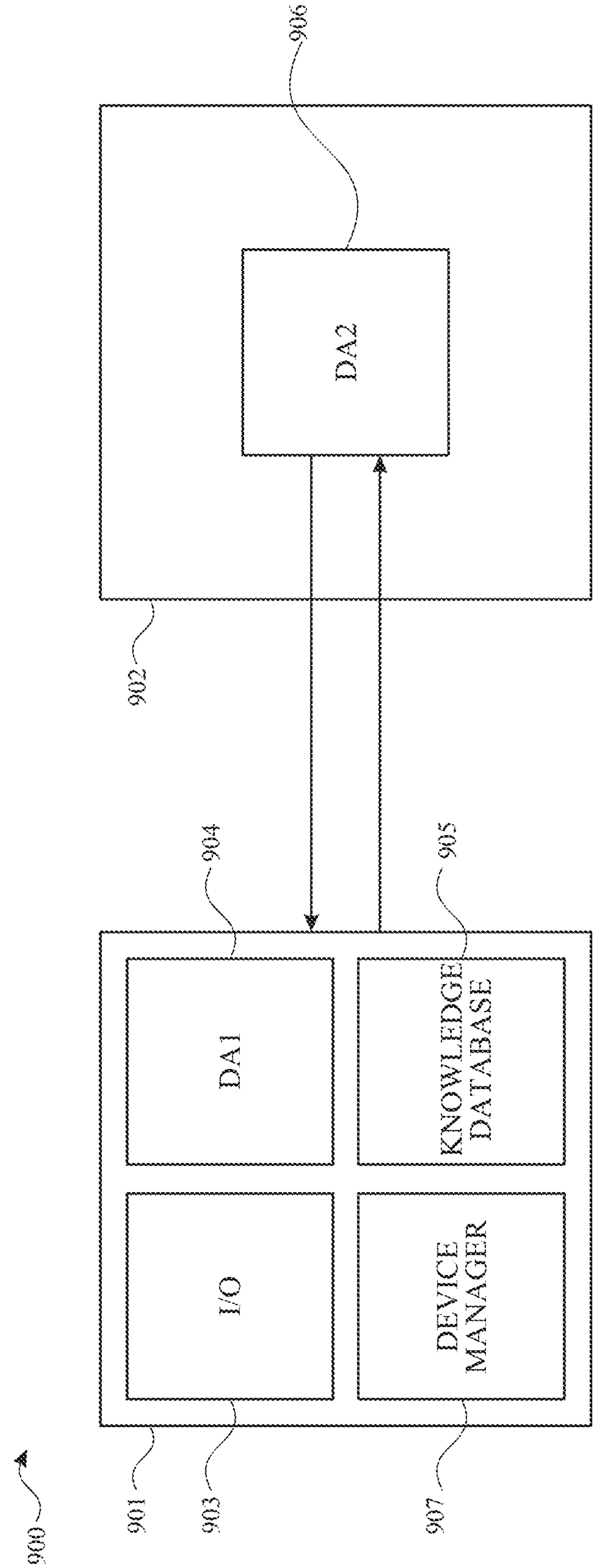
FIG. 9 illustrates a digital assistant system with a local digital assistant and a remote model, according to various examples.

FIG. 9 illustrates a client-server digital assistant system for processing an intent. As illustrated in FIG. 9, the system 900 includes electronic device 901 and electronic device 902. In some examples, electronic device 901 is local to a user (e.g., a local electronic device) and electronic device 902 is remote (e.g., a server or networked device). In some examples, an electronic device is local to the user when the electronic device is within a physical proximity to the user (e.g., within a threshold distance from the user).

As illustrated in FIG. 9, electronic device 901 includes an Inputs and Outputs module 903, a digital assistant module ("DA1") 904, a knowledge database 905, and a device manager 907. In some examples, DA1 904 is associated with a first language model. The remote electronic device 902 includes a remote model ("DA2") 906. In some examples, DA2 906 is a large-language model. In some examples, the first language model associated with DA1 904 includes fewer nodes than DA2 906. In some examples, the first language model associated with DA1 904 has less processing power than DA2 906. In some examples, DA2 906 is associated with a second digital assistant module. In some examples, the second digital assistant module is not installed on electronic device 901.

In some examples, Inputs and Outputs module 903 receives inputs from the user at electronic device 901. In some examples, Inputs and Outputs module 903 outputs responses using a speaker and/or a display connected to electronic device 901. In some examples, Inputs and Outputs module 903 transmits received inputs to DA1 904. In some examples, Inputs and Outputs module 903 receives responses from DA1 904.

In some examples, device manager 907 obtains context data associated with electronic device 901. For example, device manager 907 may obtain calendar information, contact information, location data of electronic device 901, messaging history, types of apps installed on electronic device 901, and the type of devices (speaker type, television type, communal device type, desktop type, etc.) connected to electronic device 901. In some examples, device manager 907 may transmit the context information to DA1 904.

In some examples, knowledge database 905 includes a data set of user queries. In some examples, the data set of user queries is populated based on queries that a user previously provided. In some examples, the data set is populated based on previous inquiries received by DA1 904. For example, the user may have previously provided a textual input "who is the President of the United States?" at a text field associated with DA1 904 (e.g., 1027), and thus the knowledge database would include the query of "who is the President of the United States." In some examples, the data set of user queries is predetermined upon installation of DA1 904. In some examples, each query in the data set of user queries is labeled to indicate if the labeled query is appropriate for DA1 904 to handle. In some examples, user queries are labeled based on whether a response of less than a threshold number of bits, would satisfy the query. For instance, a query of "list every player that has ever played professional basketball in North America" may require greater than a threshold number of bits and thus, the query would be labeled as inappropriate for DA1 904 to handle. In another example, a query of "which elements are noble gases?" may require fewer than a threshold number of bits since only seven are known, and accordingly, the query would be labeled as appropriate for DA1 904 to handle.

In some examples, knowledge database 905 includes a classifier. In some embodiments, the classifier compares intents of the knowledge seeking intent type from input received at Inputs and Outputs module 903 to labeled user queries in knowledge database 905. For example, if electronic device 901 received an intent "what is the most commonly grown crop in the US?" the classifier would compare the knowledge seeking intent to the queries in the data set of user queries. In some examples, the classifier matches the received intent to a user query in knowledge database 905 and accordingly classifies the received intent as appropriate or not appropriate for DA1 904 to handle. Continuing the example, if the classifier matches the intent to a query in the data set of queries labeled as appropriate for DA1 904 to handle, then the classifier labels the received intent as appropriate for DA1 904 to handle. In some examples, if the classifier cannot match the received intent to any queries in the data set of user queries, the classifier labels the received intent as inappropriate for DA1 904 to handle.

In some examples, system 900 in FIG. 9 is implemented using a client-server system (e.g., system 100). In some examples, the local electronic device (e.g., a personal or client electronic device (e.g., a mobile device (e.g., iPhone®), a communal device (e.g., Apple HomePod®), a tablet computer (e.g., iPad®), a smart watch (e.g., Apple Watch®), a desktop (e.g., iMac®), or a laptop (e.g., MacBook®)) or a communal electronic device (e.g., a smart TV (e.g., Apple TV®), virtual reality headset (e.g., VR headset), smart vehicle, or augmented reality headset (e.g., smart glasses)) (e.g., user device 600) may be connected to a communications network (e.g., local area networks (LAN) or wide area networks (WAN), e.g., the internet). The electronic device may include a display (e.g., 212), which may provide an input interface and an output interface between the electronic device and a user. The input interface may be an icon of a digital assistant or a software application for a user to provide user requests.

Figure 10B:
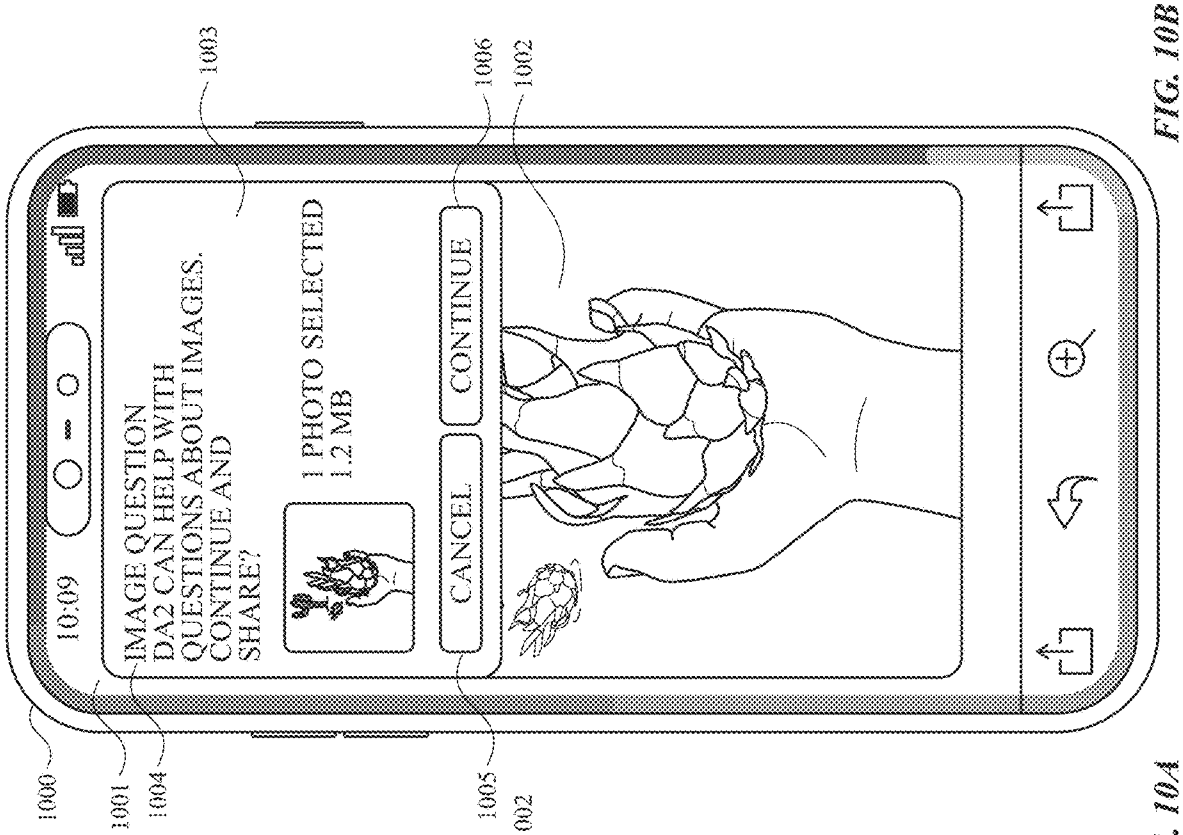
FIGS. 10A-10N illustrate a digital assistant system using a remote model to process an intent, in accordance with some embodiments.
Figure 10A:
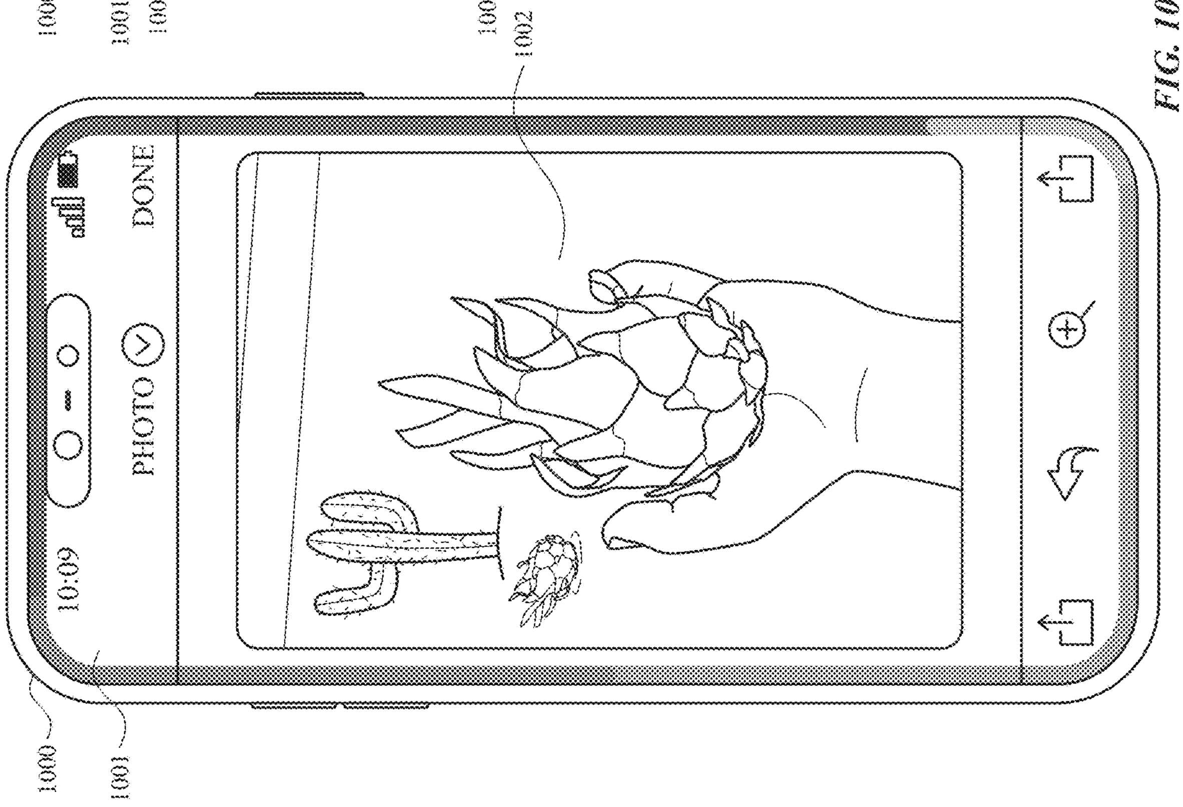
Figure 10D:
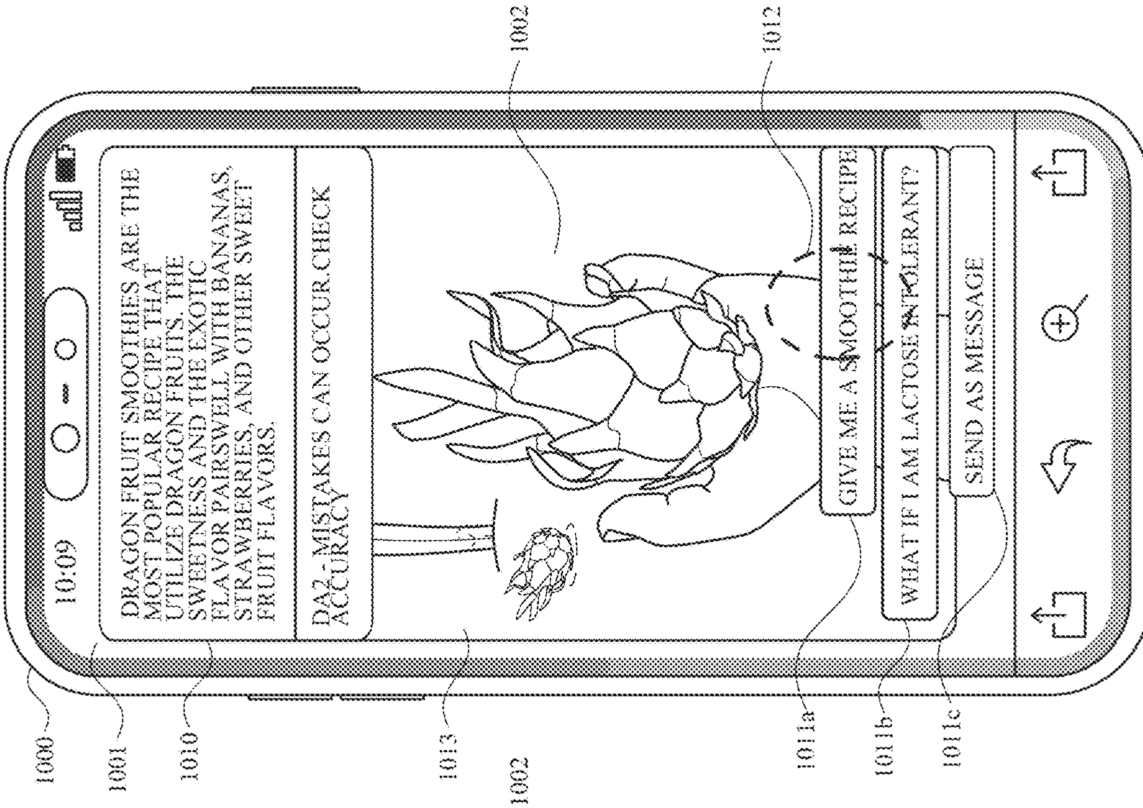
Figure 10C:
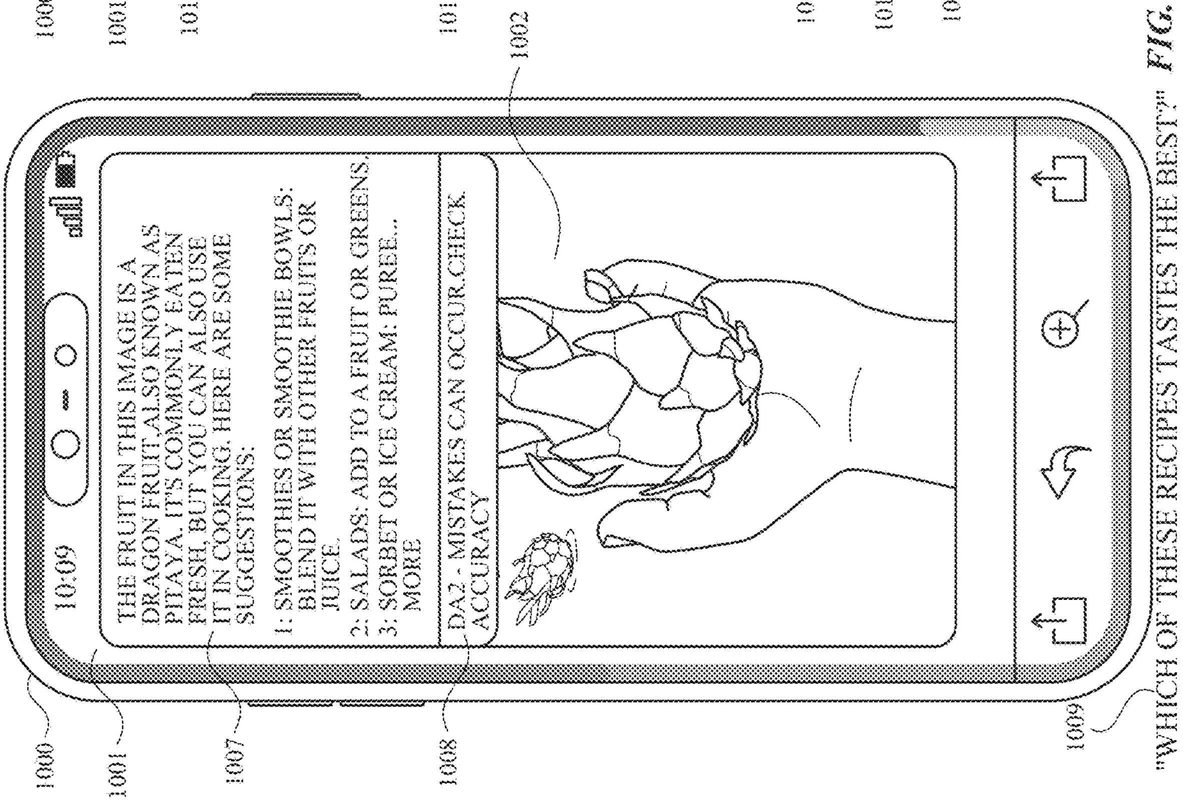
Figure 10F:
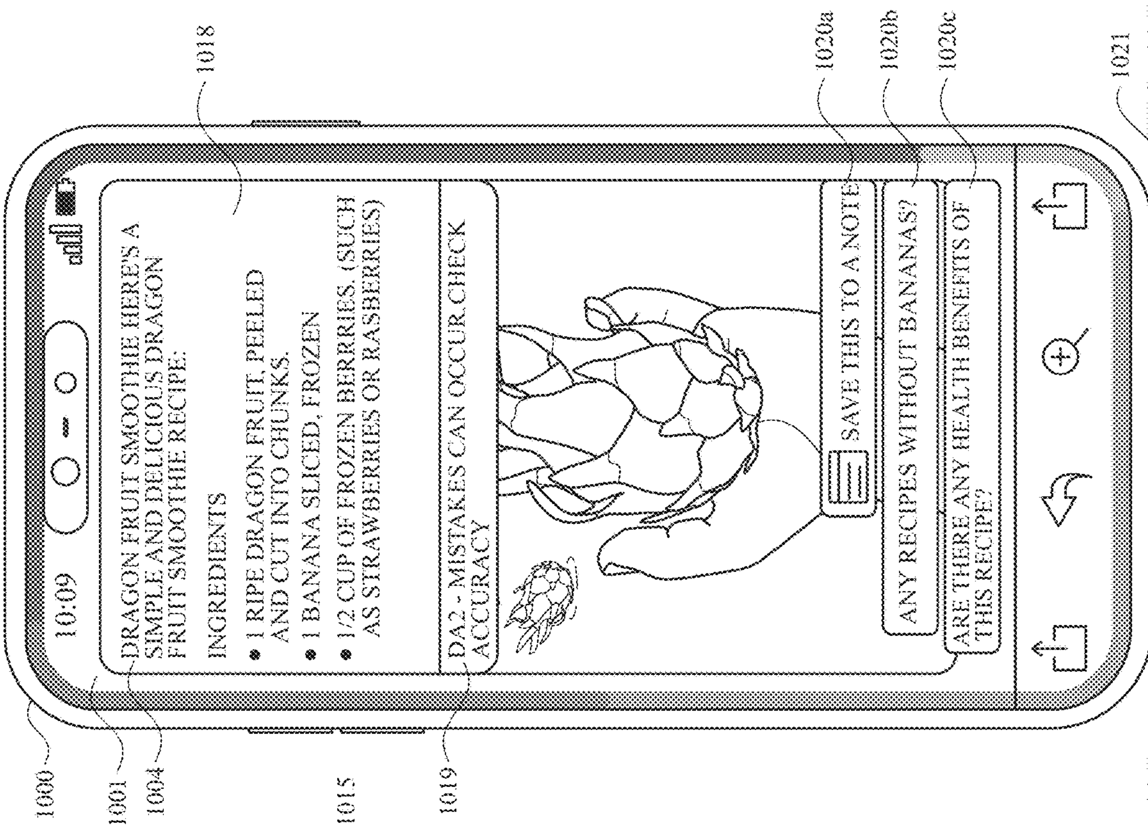
Figure 10E:
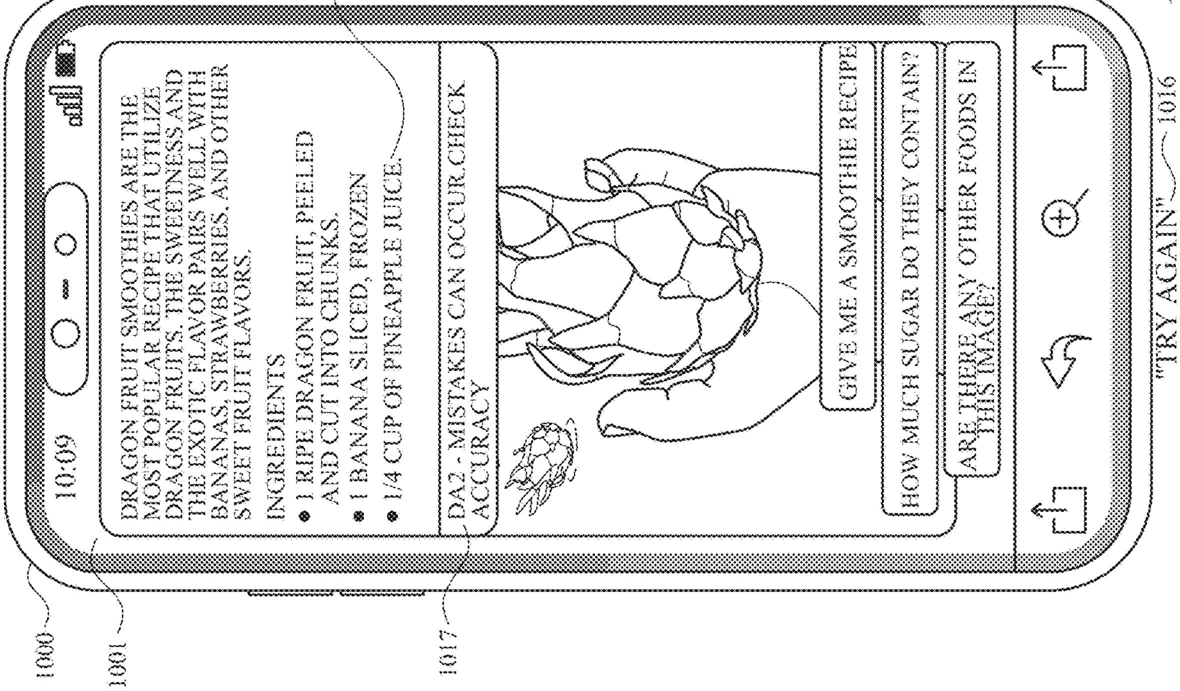
Figure 10G:
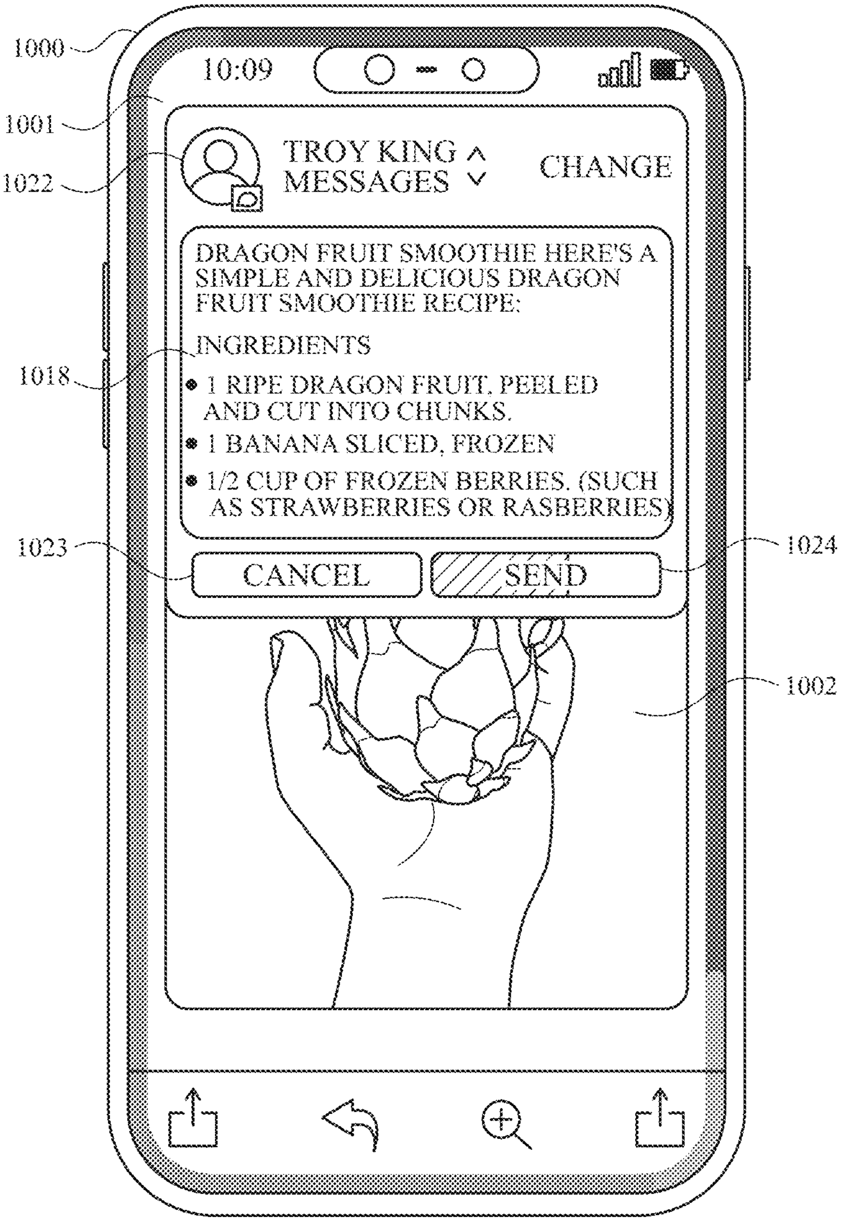
Figure 10H:
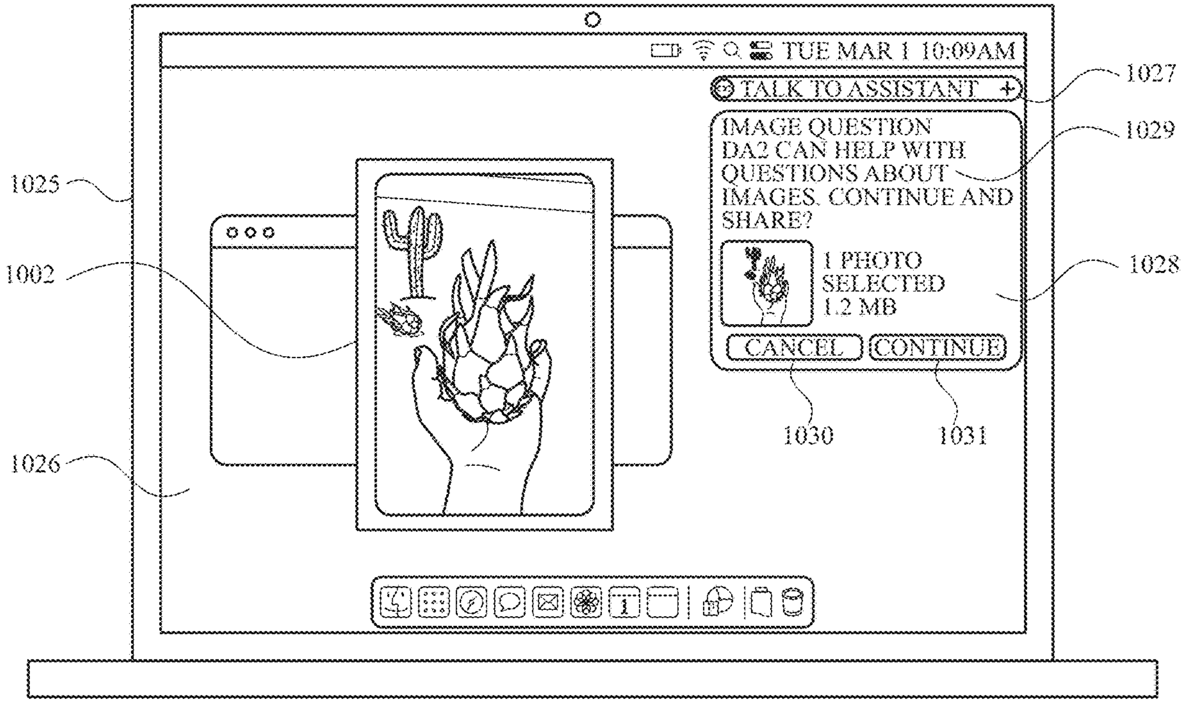
Figure 10I:
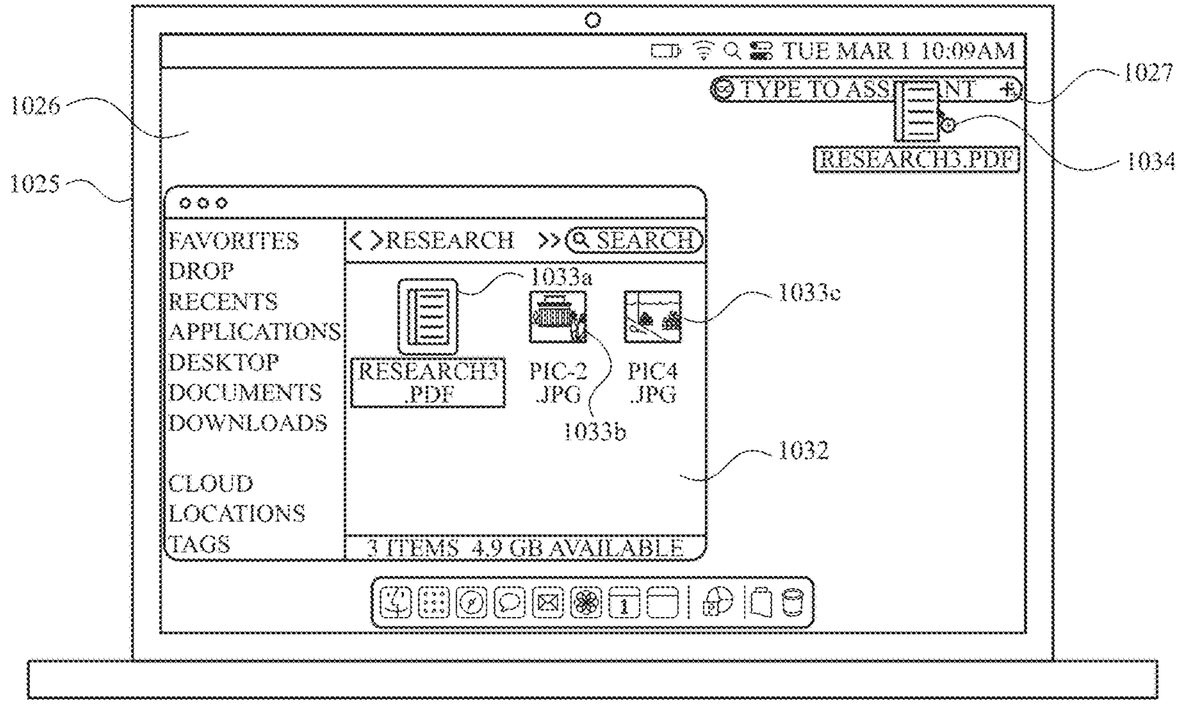
Figure 10J:
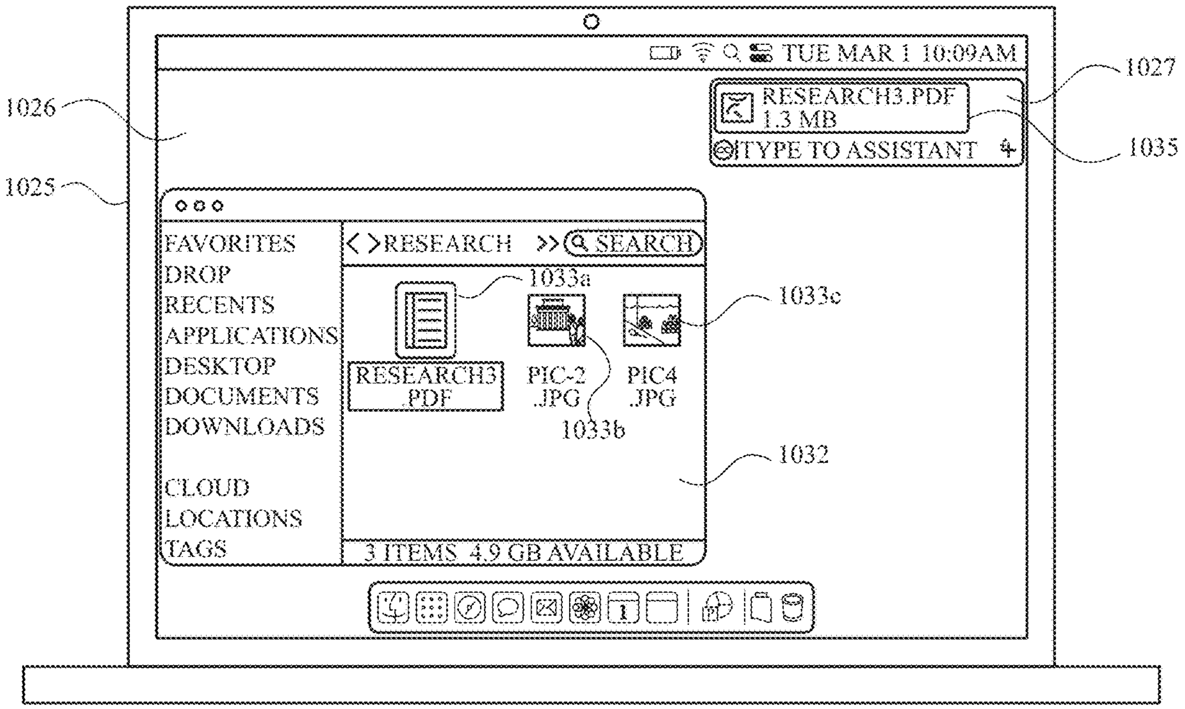
Figure 10K:
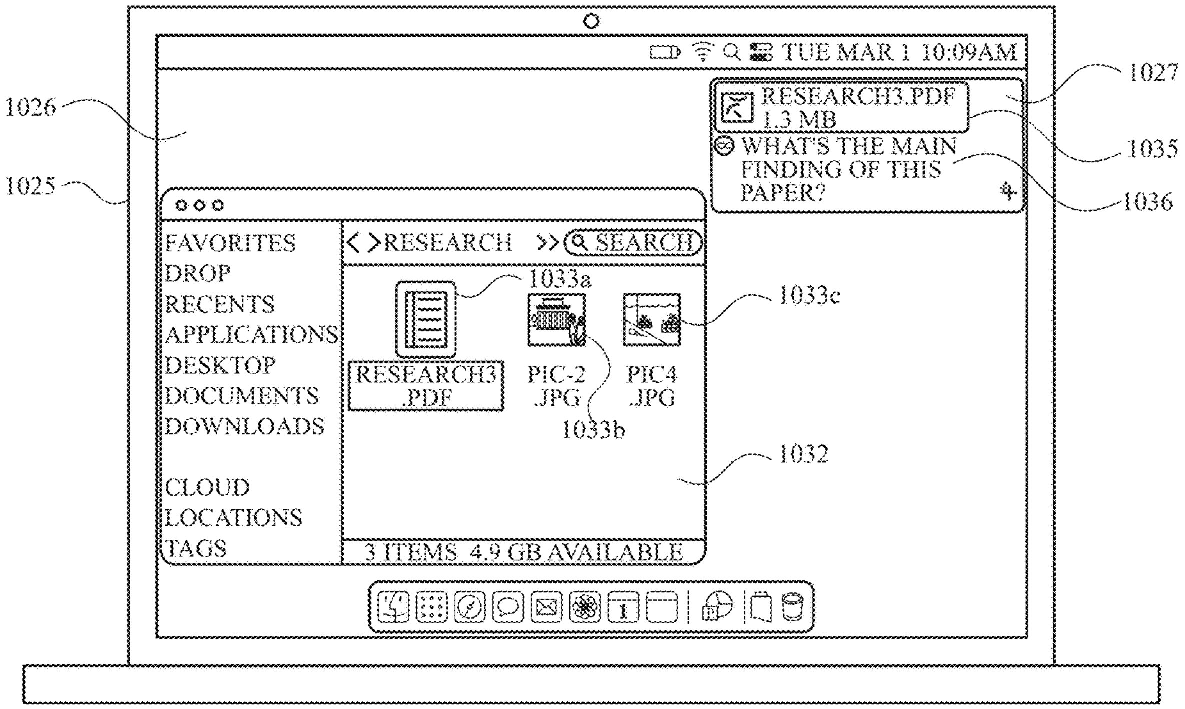
Figure 10L:
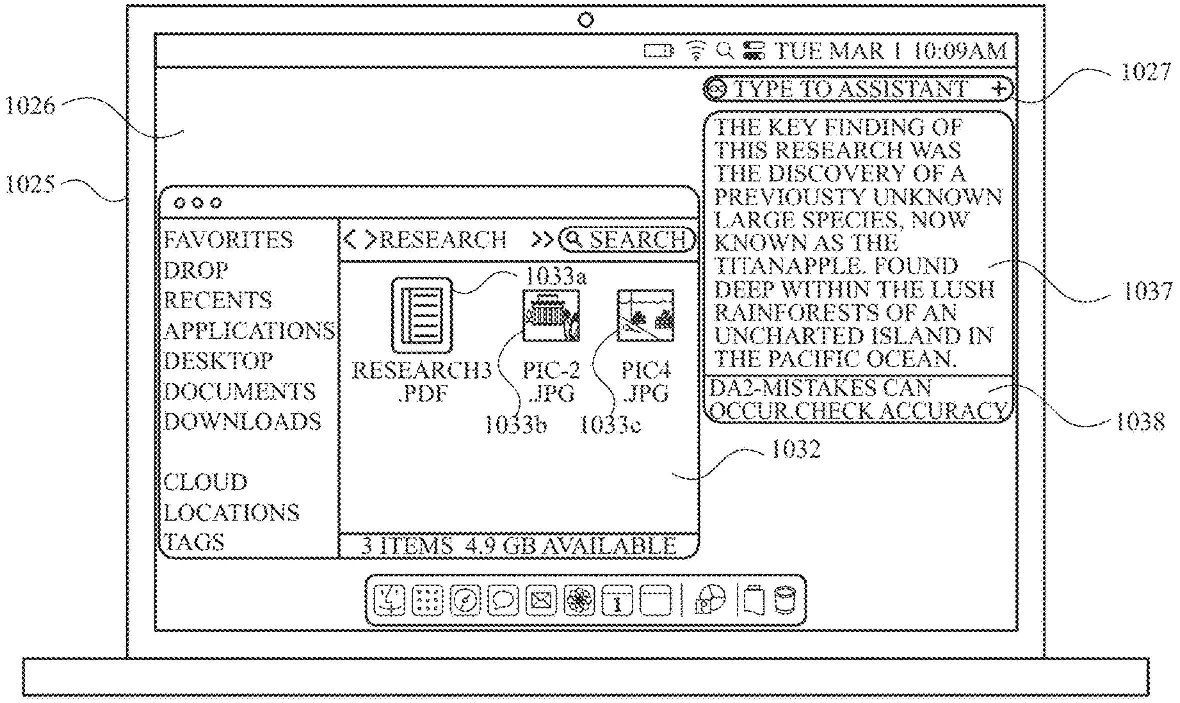
Figure 10M:
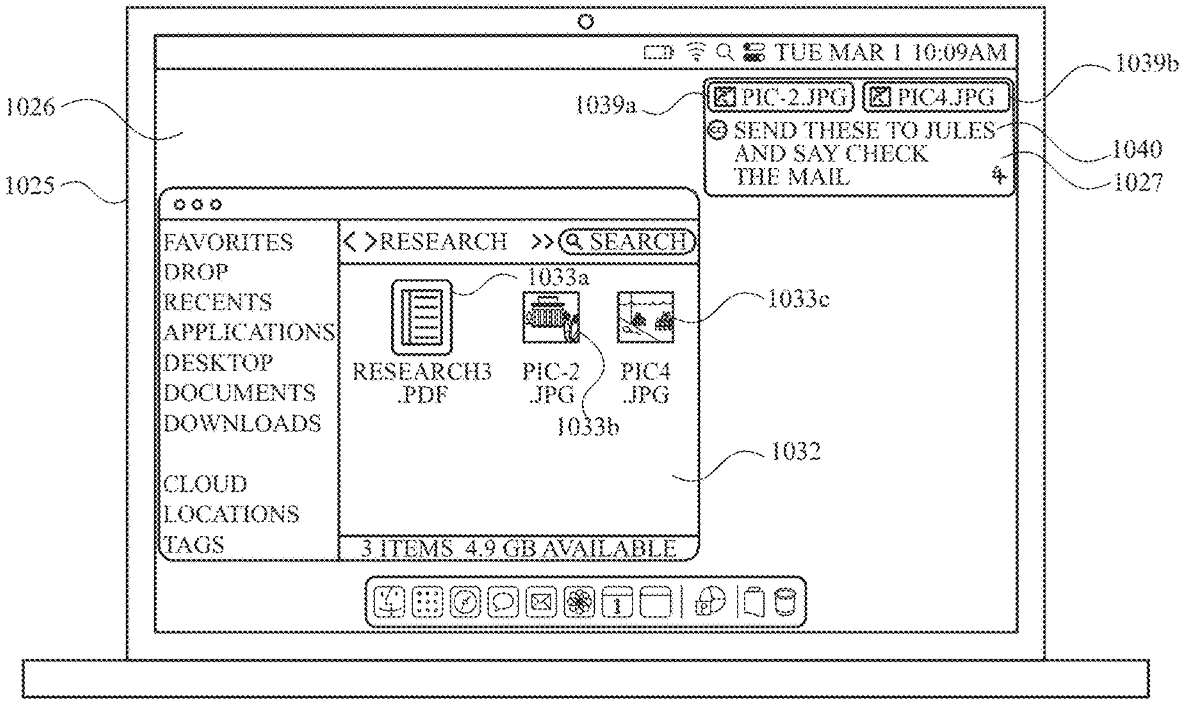
Figure 10N:
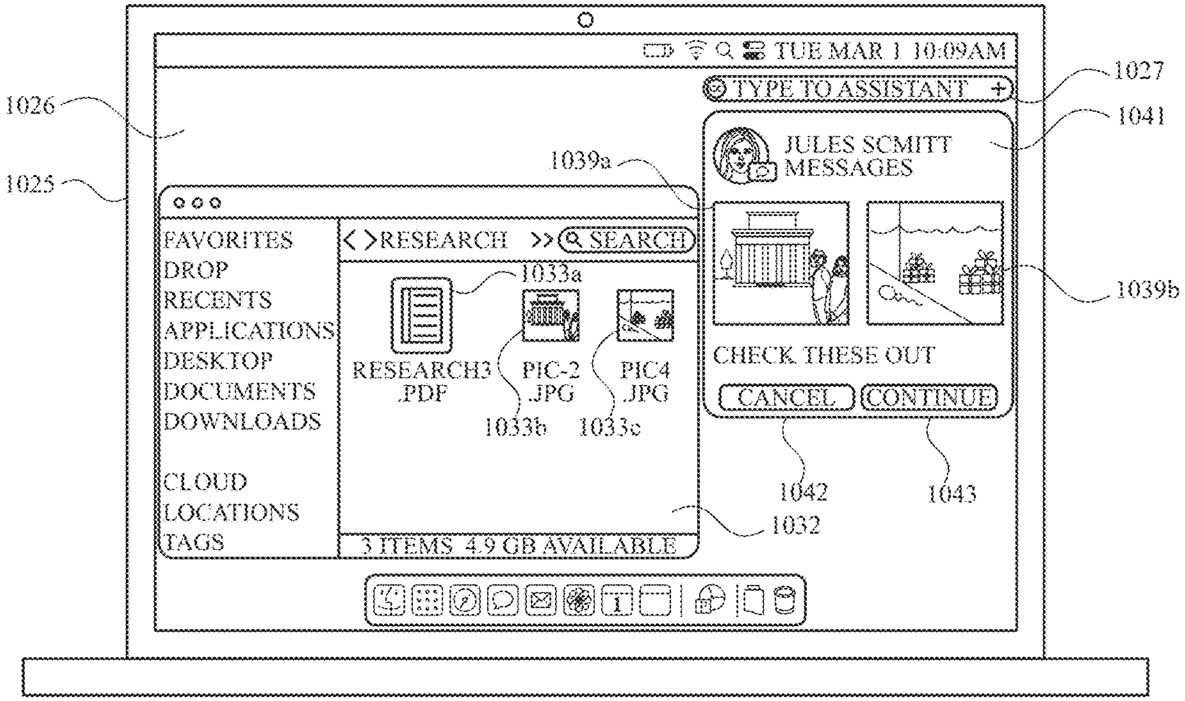

FIGS. 10A-10N illustrate a digital assistant system using a local and/or remote model to process an intent, according to various examples. In some examples, FIGS. 10A-10N implement the client-server digital assistant system described in FIG. 9.

FIG. 10A illustrates the electronic device 1000 (e.g., 901) displaying image 1002 on display 1001. In some examples, electronic device 1000 is an electronic device (as described with respect to FIG. 9). In some examples, the local electronic device is displaying a text document. In some examples, no image or electronic document is displayed.

In some examples, the electronic device 1000 receives an input associated with an intent. In some examples, the input is an audio input. For example, electronic device 1000 may receive a speech input "What can I make with this?" In some examples, the input is a textual input. For example, electronic device 1000 may receive a textual input "What are some uses of this?" In some examples, the input is a gesture. For example, electronic device 1000 may receive a press and hold input on the fruit in image 1002.

In some examples, prior to receiving the input, electronic device 1000 receives an input invoking DA1 904 on electronic device 1000. For example, a user may provide an invocation input (e.g., a trigger phrase associated with DA1 904 or a press and hold gesture on a DA1 904 affordance) to invoke DA1 904.

In some examples, in response to receiving an input associated with an intent, a local digital assistant (e.g., 904) determines, based on the intent (associated with the input), an intent type as described below. In some examples, determining the intent type includes determining whether the local digital assistant can satisfy the intent. In some examples, satisfying the intent includes performing an action associated with the input. In accordance with a determination that the local digital assistant (e.g., 904) can satisfy the intent, the local digital assistant determines the intent is a first intent type. In accordance with a determination that the local digital assistant cannot satisfy the intent, the local digital assistant determines the intent is a second intent type where the second type is different than the first type.

In some examples, the local digital assistant (e.g., 904) determines the intent type based on context data (e.g., using device manager 907). In some examples context data includes a displayed (or actively running) application. In some examples, context includes an application specified in the input. For instance, if the application is a system settings application or a first-party application, the local digital assistant may bias its determination towards determining the intent is a first intent type. For example, if the electronic device 1000 received an input of "play music on Music App" the local digital assistant can determine the local digital assistant can handle the intent because "Music App" is a first party app (e.g., an application that DA1 904 recognizes as installed on electronic device 1000).

In some examples, context data includes a displayed image (e.g., 1002). For instance, if the input references elements in a displayed image (e.g., "what is in this picture?") the local digital assistant may bias its determination towards determining the intent is a second intent type because more than a threshold amount of processing power would be required to analyze the image.

In some examples, context data includes keywords in the input (e.g., "this," "create," "generate," etc.). For example, if electronic device 1000 receives an input of "write a letter," the local digital assistant may bias its determination towards determining the intent is a second intent type because "write" is a key word associated with a remote model (e.g., 906).

In some examples, context data includes a domain associated with the input. In some examples, context data includes a user defined set of rules. For example, a user may define a set of conditions when the local digital assistant (e.g., 904) will handle an intent and when the remote model (e.g., 906) is to handle the intent. For example, a user may set a rule for using the local digital assistant for local related domains (e.g., "Get me directions to X") and using the remote model for food recommendation domains (e.g., "What cuisine is the best in San Francisco, CA?").

In some examples, context data includes a determined amount of data required to satisfy the intent. For example, if the local digital assistant determines the amount of data required to satisfy the intent is greater than a threshold, then the local digital assistant will transfer the input and intent to the remote model. In some examples, context data includes whether the intent requires private data related to the user. For example, if the intent requires private data related to the user, the local digital assistant may determine the intent is a first intent type. In some examples, context data includes whether a previous intent provided by the user was satisfied using the remote model (e.g., 906).

In some examples, the context data includes whether the immediately previous intent alone was satisfied using the remote model. For example, if a previous intent was satisfied by the remote model, then the local digital assistant may bias towards determining the intent is a second intent type to maintain continuity of a conversation with the user.

In some examples, determining the intent type includes determining the intent is the first intent type based on whether the input is associated with and/or intended for a first party software application. For example, a digital assistant application or an operating system software application may be first party software applications because they are created and/or distributed by the creator/distributer of electronic device 1000. In some examples, first party software applications include software applications that are preinstalled on electronic device 1000. In some examples, first party software applications include software applications installed and configured to work with DA1 904. In some examples, first-party applications are applications associated with the local digital assistant (e.g., system settings) and/or third-party applications installed on the electronic device 1000 and integrated with DA1 904 (e.g., applications that accept inputs and/or are recognized by DA1 904). For example, a messaging application may be a first party-application because the messaging application can accept inputs from DA1 904 and is recognized by DA1 904. In some examples, determining the intent type includes determining the intent is the first intent type when the input includes a trigger associated with the local digital assistant. For example, an input such as "DA1, what is in this image" may be determined to be a first intent type because the input includes an explicit trigger (e.g., "DA1") associated with the local digital assistant.

In some examples, determining the intent type includes determining the intent is the second intent type when the input includes an associated electronic document. For example, if a user provides a textual input into a text field associated with the local digital assistant (e.g., 904) and drags and drops an electronic document into the text field, the local digital assistant may determine the intent is a second intent type of intent because the electronic document is greater than a threshold number of bits in size and would require an amount of processing power more appropriate for the remote model. In some examples, determining the intent type includes determining the intent is the second intent type when the input includes a trigger associated with the remote model (e.g., 906). For example, an input such as "DA2, what is in this image" may be a second intent type because the input includes an explicit reference or trigger associated with the remote model. In some examples, the input includes a trigger associated with DA1 904 and a trigger associated with DA2 906 (e.g., "Hey DA1, ask DA2 'what can I make with this?'"). Continuing the example, in accordance with a determination that the input includes a trigger associated with DA1 904 and a trigger associated with DA2 906, electronic device 1000 determines the intent type is the second intent type.

In some examples, determining the intent type includes determining the input has an ambiguous term. In some examples, an ambiguous term is a term where the meaning is unclear without context data. For example, the term "this" in the input phrase "What can I make with this?" is ambiguous in the context of the input. In accordance with a determination that the input includes an ambiguous term, the local digital assistant (e.g., 904) disambiguates the ambiguous term using context data (using device manager 907). In some examples, the local digital assistant disambiguates the ambiguous term using a displayed element (e.g., a displayed application user interface or a displayed image). In some examples, the local digital assistant (e.g., 904) disambiguates the ambiguous term using a displayed element (e.g., image 1002), wherein the displayed element is an element the user most recently interacted with. For example, if the user most recently opened image 1002 before providing the input "What can I make with this?" the local digital assistant may disambiguate "this" as image 1002.

In some examples, in accordance with a determination that the intent is the first intent type, electronic device 1000 causes the local digital assistant (e.g., 904) to perform an action associated with the intent. For example, if the intent is "play music" and the local digital assistant (e.g., 904) determines the intent is the first intent type, then electronic device 1000 would cause the local digital assistant to perform the action of playing music using a first-party application.

In some examples, in accordance with a determination that the intent is the second intent type, wherein the second intent type is different than the first intent type, the local digital assistant displays local digital assistant user interface 1003 as illustrated in FIG. 10B.

FIG. 10B illustrates electronic device 1000 displaying local digital assistant user interface 1003 on display 1001 with image 1002 in accordance with a determination that the intent (e.g., image question) is a second intent type. As illustrated in FIG. 10B, local digital assistant user interface 1003 includes prompt 1004, where prompt 1004 indicates the input and/or intent can be shared to the remote model (e.g., 906) to satisfy the intent. For example, FIG. 10B illustrates prompt 1004 in local digital assistant user interface 1003 where prompt 1004 says "DA2 can help with questions about images. Continue and share?" In some examples, prompt 1004 includes affordances wherein a first affordance is associated with permitting the sharing of data with the remote model (e.g., continue affordance 1006), and a second affordance is associated with denying permission to share data with the remote model (e.g., cancel affordance 1005). In some examples, after displaying prompt 1004, the local digital assistant (e.g., 904) receives a user input associated with the prompt. For example, electronic device 1000 receives an input selecting cancel affordance 1005 in FIG. 10B, and in response to receiving the input, the local digital assistant (e.g., 904) forgoes processing the intent, forgoes performing an action based on the intent, and does not share the input with the remote model (e.g., 906). In another example, electronic device 1000 receives an input selecting continue affordance 1006 and in response to receiving the input, the local digital assistant (e.g., 904) transmits instructions to a remote model (e.g., 906).

In some examples, the local digital assistant (e.g., 904) displays, based on a user preference, prompt 1004 indicating the input can be shared to a remote model to satisfy the intent. For example, if the user sets a preference (e.g., in digital assistant settings or device settings) to not request permission to share inputs/intents to the remote model, then the local digital assistant would not display prompt 1004 and operate in accordance with the user preferences (e.g., always transmitting the intent or never transmitting the intent to the remote model).

In some examples, in accordance with a determination that the intent is a second intent type, the local digital assistant (e.g., 904) transmits instructions DA2 906 where DA2 906 is different than the local digital assistant (e.g., 904), and where the model is remote from electronic device 1000 and the local digital assistant. In some examples, a model is remote from electronic device 1000 and the local digital assistant when the model is installed on an external device (e.g., 902) and is not installed on electronic device 1000 (as depicted in FIG. 9). In some examples, transmitting the instructions includes transmitting the input and/or the intent associated with the input. In some examples, the transmitted instructions cause the remote model to perform an action associated with the intent. For example, when electronic device 1000 receives an input selecting continue affordance 1006 in FIG. 10B, the local digital assistant may transmit the input ("What can I make with this") to the remote model (e.g., 906). In some examples, transmitting the instructions includes transmitting context data (e.g., the displayed image). In some examples, transmitting the instructions does not include transmitting context data.

In some examples, after transmitting the instructions to the remote model (e.g., 906), the local digital assistant (e.g., 904) receives a response from the remote model. In some examples, the response (e.g., 1007) includes text that satisfies the intent. In some embodiments, the response includes a confirmation that the remote model performed a task associated with the intent. In response to receiving the response, the local digital assistant provides the response to the user (e.g., visually, audibly, or both) as illustrated in FIG. 10C.

In some examples, the local digital assistant receives a plurality of responses from the digital assistant, where each response is associated with the intent. In some examples, the plurality of responses includes a first response, a second response, and a third response. In some examples, the first response is an auditory mode response (e.g., provides an auditory response). In some examples, the second response is a visual mode response (e.g., displays a visual as a response). In some examples, the third response is a mixed mode response (e.g., displays a visual and outputs audio as a response). In some examples, providing the response to the user includes the local digital assistant determining which response of the plurality of responses to provide the user.

In some examples, the local digital assistant (e.g., 904) may use context data to determine which response of the plurality of responses to provide the user. In some examples, the context data includes determining a type of a second electronic device where the second electronic device is currently connected to the local electronic device at the time of determination. For example, if a speaker type of device is connected to the local digital assistant, the local digital assistant may determine to use an auditory response. In some examples, the context data includes whether audio is being outputted at electronic device 1000. For example, if audio is being outputted at electronic device 1000, the local digital assistant may determine to provide a visual response to not interrupt the user's listening. In some examples, context includes data detected by sensors on electronic device 1000. In another example, if the local digital assistant determines electronic device 1000 is in the user's pocket (e.g., based on light sensors), the local digital assistant may provide an auditory response. In some examples, the context data includes whether a user gaze is detected at electronic device 1000. In another example, if the local digital assistant detects a user gaze at electronic device 1000, the local digital assistant may determine to provide a visual response.

FIG. 10C illustrates electronic device 1000 displaying response 1007 received from the remote model (e.g., 906) (as discussed with respect to FIG. 10B) on display 1001. As illustrated in FIG. 10C, response 1007 includes generated text in a visual response, where the generated text explains the type of fruit depicted in image 1002 and what types of recipes a user can make with it. FIG. 10C further illustrates response 1007 includes indication 1008 (e.g., "DA2—Mistakes can occur. Check accuracy.") that the remote model (e.g., 906) generated response 1007.

As illustrated by FIG. 10C, after providing response 1007, the local digital assistant (e.g., 904) receives follow-up input 1009 ("Which of these recipes tastes the best") from the user associated with a second intent. In some examples, follow-up input 1009 is an audio input. In some examples, follow-up input is a textual input received at a text field associated with DA1 904 (e.g., 1027).

In some examples, the local digital assistant (e.g., 904) determines the second intent is a follow-up intent type. In some examples, a follow-up intent type is an intent related to a response, but the intent is not related to redoing an action or reprocessing the intent (e.g., a re-generate intent type). For example, FIG. 10C illustrates a user providing follow-up input 1009 ("Which of these recipes tastes the best?"). In this example, follow-up input 1009 is associated with a follow-up intent type because the keywords "these" and "recipes" correlate to response 1007. Accordingly, the local digital assistant may determine follow-up input 1009 is associated with a follow-up intent type. In accordance with a determination that the second intent is a follow-up intent type, the local digital assistant determines whether the local digital assistant (e.g., 904) performed the immediately preceding action or the remote model (e.g., 906) performed the immediately preceding action.

In accordance with a determination that the local digital assistant performed the immediately previous action, the local digital assistant performs a second action associated with the second input. For example, if DA1 904 performed the action of identifying the fruit in image 1002, then DA1 904 will perform the action of identifying a smoothie recipe. In accordance with a determination that the remote model (e.g., 906) performed the immediately previous action, the local digital assistant transmits instructions to the remote model where the instructions cause the remote model to perform a second action associated with the second input. For example, if DA2 906 performed the task of identifying the fruit in image 1002, then DA2 906 will perform the action of identifying a smoothie recipe.

In some examples, in accordance with a determination that follow-up input 1009 is a follow-up intent type and in accordance with a determination that the remote language model (e.g., 906) performed the immediately previous action, electronic device 1000 determines whether follow-up input 1009 corresponds to a system action (e.g., open system settings, answer call, turn down brightness, turn off device, open an application). For example, system actions include actions related to first party applications (e.g., applications created and/or distributed by the creator/distributor of electronic device 1000). In some examples, in accordance with a determination that the follow-up input 1009 corresponds to a system action, electronic device 1000 uses the local digital assistant (e.g., 904) to perform the task of determining which recipe tastes the best. In some examples, in accordance with a determination that the follow-up input 1009 does not correspond to a system action, electronic device 1000 transmits instructions, via the local digital assistant (e.g., 904), to the remote language model to perform the task of determining which recipe tastes the best.

In some examples, in accordance with a determination that follow-up input 1009 is a follow-up intent type and in accordance with a determination that the remote language model (e.g., 906) performed the immediately previous action, electronic device 1000 determines whether follow-up input 1009 corresponds to an action on response 1007 (as depicted with respect to FIG. 10F and FIG. 10G). For example, actions on responses include sending a response using a messaging application to another device, saving the response to a note application on electronic device 1000, and/or copying the response to the user's electronic clipboard.

In some examples, follow-up input 1009 includes a trigger associated with the first digital assistant (e.g., 904). In some examples, in accordance with a determination that the third intent is a follow-up intent type and follow-up input 1009 includes a trigger associated with the first digital assistant, electronic device 1000 performs the action using the first digital assistant. For example, if the follow-up input is "Use DA1 to tell me which of these recipes tastes the best," then the local digital assistant (e.g., 904) will perform the action (associated with the previously received input) of providing the user with the recipe that tastes the best. In accordance with a determination that the third intent is a follow-up intent type and input 1009 includes a trigger associated with the remote model (e.g., 906), the local digital assistant transmits instructions to the remote model. For example, if input 1009 included "Use DA2 to tell me which of these recipes tastes the best," then the local digital assistant may transmit instructions to the remote model (e.g., 906) which cause the remote model to perform the action of providing the user with the recipe that tastes the best. In accordance with a determination that the third intent is a follow-up intent type and input 1009 includes a trigger associated with the first digital assistant and a trigger associated with the remote language model, electronic device 1000 determines, based on the content of input 1009, whether to use the first digital assistant or the remote language model to perform the action. For example, if input 1009 includes "DA1, use DA2 to determine what recipe tastes the best," then electronic device 1000 may determine to use the remote language model to determine the best recipe because the content of input 1009 includes an indication to "use DA2." In another example, if input 1016 includes "DA1, determine which recipe tastes the best without using DA2," then electronic device 1000 may determine to use the local digital assistant (e.g., 904) to perform the task because the content of input 1009 includes an indication to "without using DA2."

In accordance with a determination that the remote model (e.g., 906) performed the immediately previous action (e.g., answering "what can I make with this?"), the local digital assistant transmits instructions to the remote model (e.g., 906) where the transmitted instructions cause the remote model (e.g., 906) to perform a second action of providing a second response (e.g., 1008) explaining smoothies are the tastiest recipes that use the identified fruit as illustrated in FIG. 10D. After transmitting the instructions using the local digital assistant (e.g., 904), the local digital assistant may receive response 1010 from the remote model (e.g., 906). In some examples, the local digital assistant may provide response 1010 to the user as depicted in FIG. 10D. In some examples, providing response 1010 is performed in a similar manner as the response is provided as described with respect to FIGS. 10B-10C.

As illustrated in FIG. 10D, the electronic device 1000 displaying response 1010 (e.g., explanation that smoothies are the most popular recipe that use the identified fruit (from image 1002)) on display 1001. In some examples, providing response 1010 is performed in the same manner as providing response 1007 (as described with respect to FIGS. 10B-10C). As illustrated in FIG. 10D, the local digital assistant provides indication 1013, indicating the response was generated by the remote model (e.g., 906). FIG. 10D further illustrates refinement prompt 1011*a*, refinement prompt 1011*b*, and refinement prompt 1011*c*. In some examples, refinement prompt 1011*a* (and refinement prompt 1011*b* and refinement prompt 1011*c*) is selectable.

In some examples, receiving response 1010 from the remote model (e.g., 906) includes receiving a plurality of refinement prompts (e.g., 1011*a*, 1011*b*, 1011*c*). In some examples, refinement prompts include suggested inputs based on response 1010. In some examples, a refinement prompt may display (or provide audibly) natural language suggested inputs as refinement prompts. For example, refinement prompt 1011*b* provides a natural language suggested input "what if I am lactose intolerant?". In this example, the prompt "what if I am lactose intolerant?" is a refinement prompt because the refinement prompt narrows response 1010. In some examples, refinement prompts are suggested inputs that are likely to be asked by the user. In another example, refinement prompt 1011*c* provides a natural language suggested input "send as a message." In this example, the prompt "send as a message" is a refinement prompt because the "send as a message" performs an action on response 1010 (e.g., in this case, creating a message with the response as depicted in FIG. 10G).

In some examples, refinement prompts are determined by the remote model (e.g., 906) based on similar requests the remote model (e.g., 906) received from other users. In some examples, the refinement prompts (e.g., 1011*a*, 1011*b*, 1011*c*) are determined by the remote model (e.g., 906) based on the number of characters in the response (e.g., 1010). For example, if the response has greater than a threshold number of characters, the refinement prompt may include an intent associated with adding the response to a text editor application (as depicted in FIG. 10G). In some examples, the refinement prompts are determined by the remote model based on at least one application installed on electronic device 1000. For example, if a note taking application is installed on electronic device 1000, the local digital assistant (e.g., 904) may transmit that information to the remote model (e.g., 906) so that the remote model can generate a refinement response such as "add this to my notes." In some examples, the refinement prompts are determined by at least one query commonly requested by other users from the remote model. For instance, if other users commonly ask "what if I am lactose intolerant" in response to receiving a response highlighting smoothie recipes, then the remote model may generate refinement prompt 1011*b* for the user.

In some examples, each refinement prompt includes a suggested natural language input and a refinement response to the suggested natural language input. For example, when the remote model (e.g., 906) performs the action and generates a response, the remote model (e.g., 906) may generate a plurality of refinement prompts and generate a plurality of refinement responses to said plurality of refinement prompts so that the local digital assistant (e.g., 904) will not need to transmit instructions to the remote model again if a refinement prompt is selected (e.g., 1011*a*).

As illustrated in FIG. 10D, the local digital assistant receives input 1012 selecting refinement prompt 1011*a*. FIG. 10D further illustrates, in response to receiving input 1010, electronic device 1000 displays FIG. 10E.

As illustrated in FIG. 10E, in response to receiving input 1010, the local digital assistant (e.g., 904) receives response 1015 from the remote model (e.g., 906). In some examples, the local digital assistant process input 1012 in a similar manner as the first input (as described with respect to FIGS. 10A-10B). As illustrated in FIG. 10E, electronic device 1000 displays response 1015 on display 1001, where response 1015 includes a recipe for dragon fruit as the user requested in input 1012. FIG. 10E further illustrates electronic device 1000 displaying indication 1017 indicating response 1015 was generated by the remote model (e.g., 906). As illustrated in FIG. 10E, the local digital assistant provides response 1011. As illustrated in FIG. 10E, local digital assistant receives input 1016 (e.g., "Try Again") associated with a third intent.

In response to receiving input 1016, the local digital assistant (e.g., 904) determines, based on input 1016, an intent type associated with the third intent. In some examples, the determination of the intent type of the third intent is performed using the same process as processing the first input (as described with respect to FIGS. 10A-10B). In some examples, the local digital assistant (e.g., 904) determines the intent type associated with the second intent is a re-generate intent type. In some examples, re-generate types are intent types that are associated with rephrasing or retrying an action based on an immediately previously received input (e.g., input 1012). For example, the input "Try again" would be a re-generate intent type because the input is associated with processing input 1012 again. In some examples, a re-generate intent type includes an explicit term referencing the previously received input (e.g., "give me a different response to my previous question").

In some examples, in accordance with a determination that the third intent is associated with a re-generate intent type: the local digital assistant (e.g., 904) determines whether the local digital assistant (e.g., 904) performed the action associated with the response or the remote model (e.g., 906) performed the action associated with the response. In accordance with a determination that the local digital assistant performed the action associated with the response (and the third intent is not a knowledge seeking intent (as discussed with respect to FIGS. 11A-11B)), electronic device 1000 uses the local digital assistant to perform an action associated with the third intent. In some examples, the action associated with the third intent is the same action as the action performed immediately previous to receiving input 1016. For example, when electronic device 1000 receives input 1016 after or while electronic device 1000 displays response 1015, the local digital assistant may attempt to perform the action again, based on the input 1012. In some examples, performing the action again includes performing the action again using a seed different from a seed used to generate response 1015. In accordance with a determination that the remote model (e.g., 906) performed the action associated with response 1015 (and the third intent is not a knowledge seeking intent (as discussed with respect to FIGS. 11A-11B)), the local digital assistant transmits instructions to the remote model (e.g., 906) where the instructions cause the remote model to perform an action associated with the second intent using a seed different from a seed used to generate response 1014.

In some examples, input 1016 includes a trigger associated with the first digital assistant (e.g., 904). In some examples, in accordance with a determination that the third intent is a re-generate intent type and input 1016 includes a trigger associated with the first digital assistant, electronic device 1000 performs the action using the first digital assistant. For example, if the second input is "Have DA1 answer this time" then the local digital assistant (e.g., 904) will perform the action (associated with the previously received input). In accordance with a determination that the third intent is a re-generate intent type and input 1016 includes a trigger associated with the remote model (e.g., 906), the local digital assistant transmits instructions to the remote model. For example, if input 1016 included "Have DA2 answer this time" then the local digital assistant may transmit instructions to the remote model (e.g., 906) which cause the remote model to perform the action. In accordance with a determination that the third intent is a re-generate intent type and input 1016 includes a trigger associated with the first digital assistant and a trigger associated with the remote language model, electronic device 1000 determines, based on the content of input 1016, whether to use the first digital assistant or the remote language model to perform the action. For example, if input 1016 includes "DA1, repeat that using DA2," then electronic device 1000 may determine to use the remote language model to perform the action because the content of input 1016 includes an indication to "use DA2." In another example, if input 1016 includes "DA1, try that again without using DA2," then electronic device 1000 may determine to use the local digital assistant (e.g., 904) to perform the task because the content of input 1016 includes an indication to "not use DA2."

As illustrated in FIG. 10F, in accordance with a determination that the third intent (associated with input 1016) is a re-generate intent type, electronic device 1000 displays response 1018 at display 1001. As illustrated in FIG. 10F, response 1018 provides the user with a recipe for a dragon fruit smoothie different from the recipe in response 1015. For example, response 1018 replaced an ingredient of pineapple juice in response 1015 with an ingredient of frozen berries. FIG. 10F further illustrates indication 1019 indicating response 1018 was generated by remote model (e.g., 906). FIG. 10F further illustrates displaying refinement prompt 1020*a*, refinement prompt 1020*b*, and refinement prompt 1020*c*. In some examples, refinement prompt 1020*a* (and refinement prompt 1020*b* and refinement prompt 1020*c*) perform processes in a similar manner as refinement prompt 1011*a*.

FIG. 10F further illustrates the local digital assistant receiving input 1021 (e.g., "Send this as a message to Troy") associated with a fourth intent (e.g., send a message). In some examples, the local digital assistant determines an intent type of the fourth intent. For example, the local digital assistant may determine the fourth intent is a first type of intent because the fourth intent requires the use of a first party application associated with the local digital assistant (e.g., messaging application). In accordance with a determination that the third intent is of the first intent type, the local digital assistant performs a task (e.g., preparing a message to Troy (based on contact information on electronic device 1000) with the dragon fruit recipe (e.g., response 1018) and provides a response (e.g., 1022) as illustrated in FIG. 10G.

As illustrated in FIG. 10G. the electronic device 1000 displays response 1022 (e.g., message to Troy with response 1018) on display 1001. FIG. 10G further illustrates electronic device 1000 forgoes displaying any indication the response was generated by the remote model when the digital assistant performed the task. For example, since the messaging application is a first-party application, the digital assistant (e.g., 904) determines it can handle the request and in accordance with a determination that the intent to send a message is a first intent type, the digital assistant performs the task of generating a message to Troy and provides response 1022.

In some examples, providing response 1022 includes displaying affordances associated with an application. For example, FIG. 10G illustrates response 1022 including affordance 1023 and affordance 1024 where each affordance is associated with the messaging application. In some examples, the local digital assistant receives an input selecting one of the affordances (e.g., 1023 or 1024) and in response, the local digital assistant may perform an action using the application associated with the affordance. For example, if the local digital assistant receives an input selecting affordance 1024 in response 1022, the local digital assistant may use the messaging application (e.g., a first-party application) to send response 1022 to another electronic device (e.g., an electronic device associated with Troy King).

FIG. 10H illustrates an electronic device 1025 displaying image 1002 on display 1026. In some examples, electronic device 1025 includes the features described with respect to electronic device 901 and electronic device 1000. FIG. 10H further illustrates electronic device 1025 receiving an input (e.g., "what can I make with this?") associated with an intent and in response to receiving the input, displaying text field 1027 and local digital assistant user interface 1028 where local digital assistant user interface 1028 includes prompt 1029 based on the intent. As illustrated in FIG. 10H, prompt 1029 indicates an intent can be shared to a remote model (e.g., 906) to satisfy the intent. For example, FIG. 10H illustrates prompt 1029 in local digital assistant user interface 1028 where prompt 1029 includes the following text: "DA2 can help with questions about images. Continue and share?" In some examples, prompt 1029 includes affordances wherein a first affordance is associated with permitting the sharing of data with the remote model (e.g., continue affordance 1031), and a second affordance is associated with denying permission to share data with the remote model (e.g., cancel affordance 1030).

In some examples, after displaying prompt 1029, the local digital assistant (e.g., 904) receives an input associated with prompt 1029. For example, the local digital assistant receives an input selecting cancel affordance 1030, and in response to receiving the input selecting cancel affordance 1030, the local digital assistant cancels the request and does not share the input with the remote model (e.g., 906). In another example, the local digital assistant receives an input selecting continue affordance 1031, and the local digital assistant transmits instructions to the remote model in accordance with a determination that the intent is the second intent type. Accordingly, the processes described in FIGS. 10A-10G and FIG. 12 are performed.

FIG. 10I illustrates electronic device 1025 displaying user interface 1032 on display 1026 with electronic text file 1033*a* (e.g., "RESEARCH3.PDF"), electronic image 1033*b* (e.g., "PIC-2.JPG"), and electronic image 1033*c* (e.g., "PIC4.JPG"). FIG. 10I also illustrates electronic device 1025 receiving a click and drag input 1034 dragging electronic text file 1033*a* (e.g., "RESEARCH3.PDF") to text field 1027. As illustrated in FIG. 10I, in response to receiving click and drag input 1034, electronic device 1025 displays FIG. 10J.

FIG. 10J illustrates electronic device 1025 displaying icon 1035 which is representative of electronic file 1033*a* being dropped into text field 1027 (after click and drag input 1034 in FIG. 10I) on display 1026. In some embodiments text field 1027 is associated with the local digital assistant. For example, inputs provided at text field 1027 are associated with an intent to invoke the local digital assistant and cause the local digital assistant to perform an action. FIG. 10J further illustrates user interface 1032 with electronic text file 1033*a*, electronic image 1033*b*, and electronic image 1033*c*.

FIG. 10K illustrates electronic device 1025 displaying user interface 1032 with electronic text file 1033*a*, electronic image 1033*b*, electronic image 1033*c*, and icon 1035 in text field 1027. FIG. 10K further illustrates electronic device 1025 receiving a textual input 1036 "What's the main finding of this paper?" in the text field 1027. In response to receiving textual input 1036, the local digital assistant (e.g., 904) may determine an intent based on textual input 1036. In some examples, after determining the intent associated with textual input 1036, the local digital assistant determines an intent type of the determined intent (as described with respect to FIGS. 10A-10G and FIGS. 11A-11B).

In accordance with a determination that the intent type of the determined intent is a second intent type, different than the first intent type, the local digital assistant (e.g., 904) transmits instructions to the remote model (e.g., 906) where the instructions cause the remote model to perform an action associated with the intent (e.g., determine the primary finding of the attached "RESEARCH3.PDF"). In some examples, the local digital assistant receives a response from the remote digital assistant (as described with respect to FIGS. 10A-10B). In some examples, in response to receiving the response from the remote digital assistant, the local digital assistant provides the response to the user (as described with respect to FIG. 10B) as illustrated in FIG. 10L.

FIG. 10L illustrates electronic device 1025 providing response 1037 based on textual input 1036. For example, the response in FIG. 10L discusses the key findings of the research in "RESEARCH3.PDF." In some examples, providing response 1037 includes providing indication 1038 that indicates the response was generated by the remote digital assistant (e.g., "DA2—Mistakes can occur. Check accuracy") as illustrated in FIG. 10L. FIG. 10L further illustrates electronic device 1025 displaying user interface 1032 with electronic text file 1033*a*, electronic image 1033*b*, and electronic image 1033*c*.

FIG. 10M illustrates electronic device 1025 displaying user interface 1032 with text file 1033*a*, image file 1033*b*, and image file 1033*c* on display 1026. FIG. 10M further illustrates electronic device 1025 receiving icon 1039*a* representative of image file 1033*b* and icon 1039*b* representative of image file 1033*c* to text field 1027. FIG. 10M further illustrates electronic device 1025 receiving textual input 1040 (e.g., "Send these to Jules and say check these out") associated with the intent to send a message.

In response to receiving textual input 1040, the local digital assistant (e.g., 904) determines an intent type from the intent to send a message. In some examples, the local digital assistant determines the intent to send a message is a first intent type (as discussed with FIGS. 10A-10B). For example, the local digital assistant may determine that it is capable of handling the intent because the intent requires the use of a first party application (e.g., messaging application associated with the local digital assistant). Accordingly, the local digital assistant may determine the intent to send a message is a first type of intent. In accordance with a determination that the intent type is the first type of intent, the electronic device causes the local digital assistant (e.g., 904) to perform a task associated with the intent (e.g., prepare a message on messaging application with the attached images) as illustrated in FIG. 10N.

FIG. 10N illustrates in response to performing the task associated with the intent to send a message using the local digital assistant (e.g., 904), electronic device 1025 displays response 1041 which includes a message for Jules Scmitt, icon 1039*a* representative of image file 1033*b*, and icon 1039*b* representative of image file 1033*c* attached to the message. FIG. 10N further illustrates displaying user interface 1032 with text file 1033*a*, image file 1033*b*, and image file 1033*c*. FIG. 10N further illustrates electronic device 1025 displaying a first affordance 1042 and a second affordance 1043 where first affordance 1042 corresponds to performing a first action with the messaging application and second affordance 1043 corresponds to performing a second action (different from the first action) with the messaging application.

5. Knowledge Based Intents

Figure 11B:
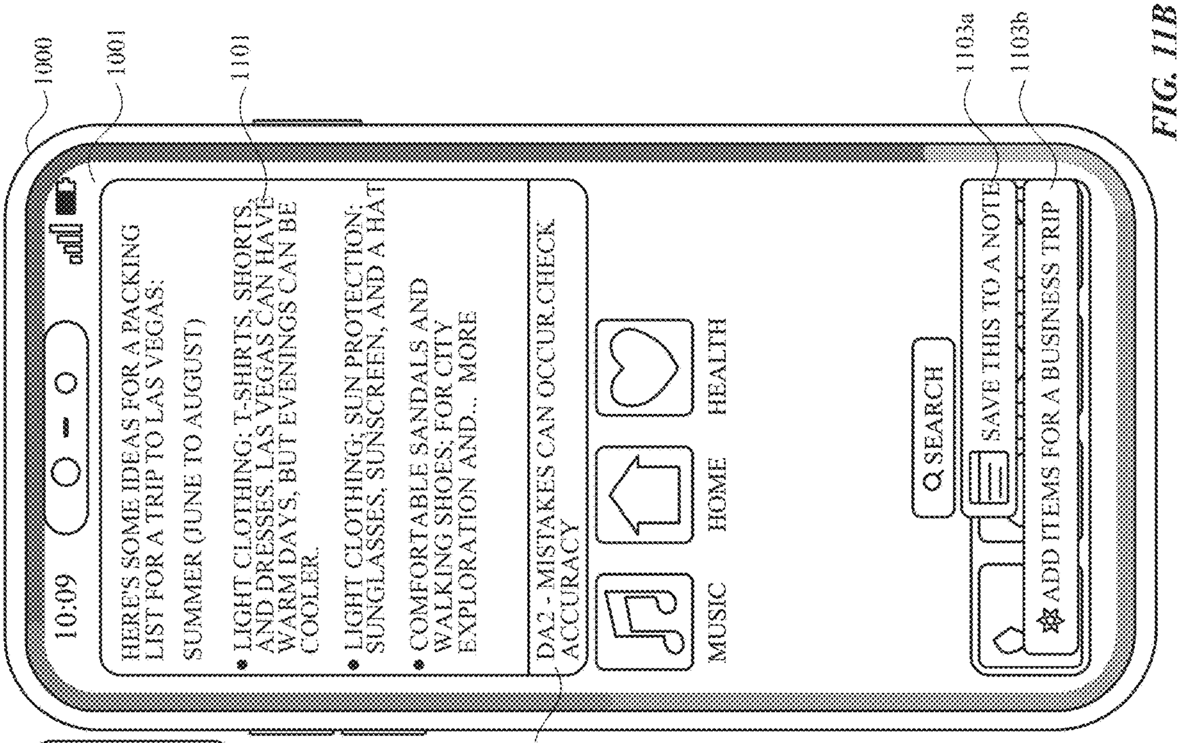
FIGS. 11A-11B illustrate a digital assistant system using a remote model to process a knowledge seeking intent, in accordance with some embodiments.
Figure 11A:
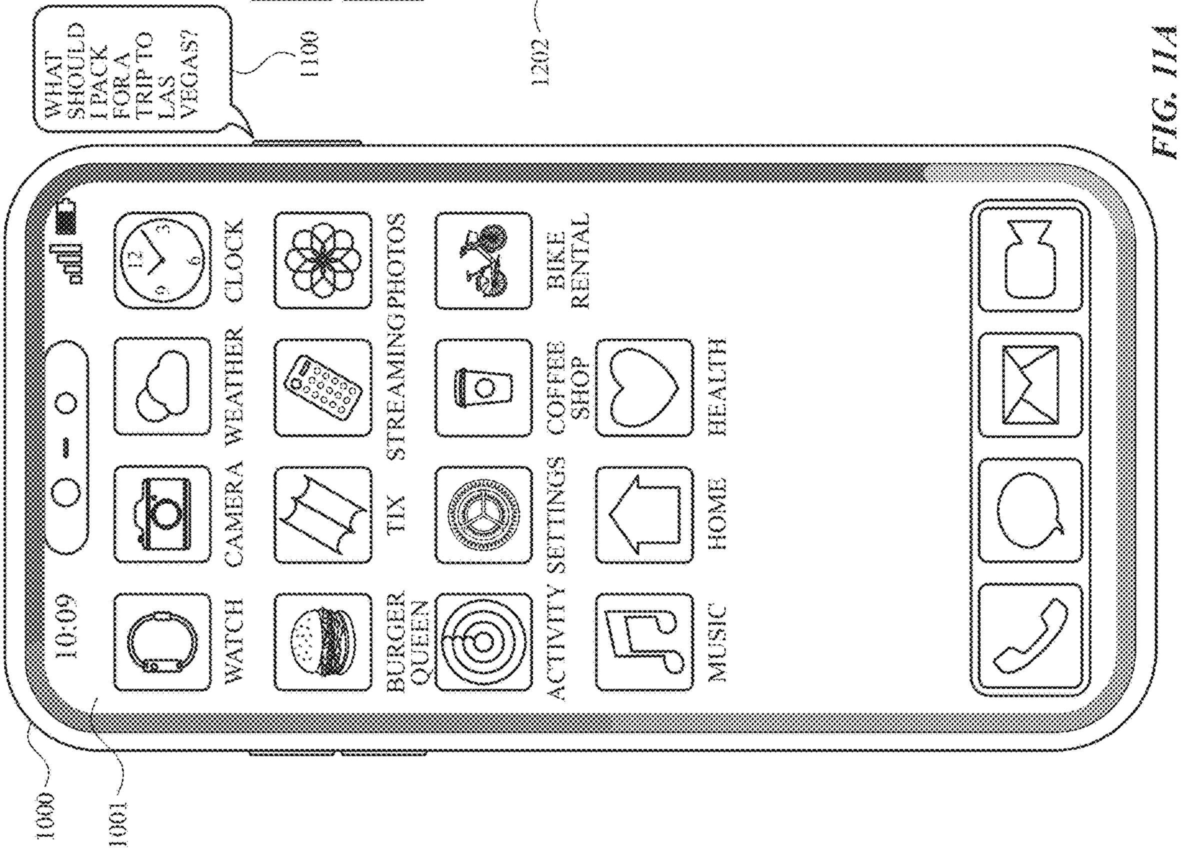

FIGS. 11A-11B illustrate a digital assistant system using a remote model to process an intent, according to various examples. In some examples, FIGS. 11A-11B implement the client-server digital assistant system described in FIG. 9.

As illustrated in FIG. 11A, electronic device 1000 receives input 1100 (e.g., "What are some ideas for a packing list for a trip to Las Vegas?"). In some examples, the local digital assistant (e.g., 904) determines an intent type based on the intent. In some examples, the local digital assistant determines the intent type in a similar manner as the methods described with respect to FIG. 9 and FIGS. 10A-10B. In some examples, the local digital assistant determines the intent is a knowledge seeking intent type. In some examples, a knowledge seeking intent type is an intent associated with a request for information. In some examples, a knowledge seeking intent type is an intent associated with a request that would require DA1 904 and/or DA2 906 to perform an internet search/look up. In some examples, a knowledge seeking intent type does not include analyzing an image file or an electronic text file. For example, an intent of identifying an element in image 1001 (as depicted in FIGS. 10A-10B) would not be a knowledge seeking intent type because the intent requires analysis of an image. In another example, an intent of determining key findings in text file 1033*a* would not be a knowledge secking intent type because the intent requires analysis of a text file. In some examples, a knowledge seeking intent type is associated with a request for information wherein satisfying the intent requires providing a response with greater than a threshold amount of bits or data. In another example, electronic device 1000 may receive an input "who are the current members of the European Union?". Such an intent is a knowledge seeking intent type because the input is a request for information.

In some examples, in accordance with a determination that the intent type is a knowledge seeking intent type, the local digital assistant (e.g., 904) determines if the local digital assistant can satisfy the intent. In some examples, determining if the local digital assistant can satisfy the intent includes foregoing determining whether a previous intent provided by the user was satisfied using the remote model (e.g., 906). In some examples, the local digital assistant does not consider whether the remote model or the local digital assistant provided a previous response to the user as context when determining whether the local digital assistant can satisfy the intent. For example, if electronic device 1000 received a previous input of "where is the hottest place on earth?" and the remote model (e.g., 906) satisfied that request (e.g., by providing a response of "Death Valley in CA recorded the hottest temperature in history"), the local digital assistant would not bias towards using the remote model to satisfy the intent associated with input 1100.

In some examples, determining if the local digital assistant can satisfy the knowledge seeking intent includes using knowledge database 905. In some examples, knowledge database 905 includes a classifier. In some embodiments, the classifier compares intents of the knowledge seeking intent type from input received at Inputs and Outputs module 903 to labeled user queries in knowledge database 905. For example, if electronic device 901 received an intent "what is the most commonly grown crop in the US?" the classifier would compare the knowledge secking intent to the queries in the data set of user queries. In some examples, the classifier matches the received intent to a user query in knowledge database 905 and accordingly classifies the received intent as appropriate or not appropriate for DA1 904 to handle. Continuing the example, if the classifier matches the intent to a query in the data set of queries labeled as appropriate for DA1 904 to handle, then the classifier labels the received intent as appropriate for DA1 904 to handle. In some examples, if the classifier cannot match the received intent to any queries in the data set of user queries, the classifier labels the received intent as inappropriate for DA1 904 to handle.

In some examples, in accordance with a determination that the local digital assistant can satisfy the intent, the local digital assistant (e.g., 904) performs an action associated with the intent. For example, the local digital assistant may determine it can generate a list of items to bring on a trip to Las Vegas and will generate the list accordingly. In some examples, in accordance with a determination that the local digital assistant cannot satisfy the intent, the local digital assistant may transmit instructions to the remote model (e.g., 906) where the instructions cause the remote model to perform an action associated with the intent. For example, the local digital assistant may determine the intent of providing knowledge regarding "what should I pack for Las Vegas" cannot be satisfied by the local digital assistant (e.g., because the local digital assistant lacks sufficient detail regarding the knowledge) and thus, the local digital assistant transmits the intent and instructions to the remote model to provide a response and seek information.

In some examples, after transmitting the instructions to the remote model (e.g., 906), the local digital assistant (e.g., 904) may receive a response from the remote model where the response is based on the intent. The response may be received in the same manner as described with respect to FIGS. 10A-10B. In some examples, in response to receiving the response, the local digital assistant provides the response (e.g., in a similar manner as described with respect to FIGS. 10A-10B). For example, FIG. 11B illustrates electronic device 1000 displaying response 1201 (e.g., received from the remote model) with a list of packing items for a trip to Las Vegas. In some examples, the local digital assistant may receive a plurality of responses (as described with respect to FIGS. 10A-10B). FIG. 11B further illustrates electronic device 1000 displaying indication 1202 that the response was generated by the remote model.

As illustrated in FIG. 11B, the displaying response 1101 includes displaying refinement prompt 1103*a* and refinement prompt 1103*b*. In some examples, refinement prompt 1103*a* and refinement prompt 1103*b* behave in a similar manner to refinement prompts as described with respect to FIGS. 10B-10C. For example, in response to receiving an input selecting refinement prompt 1103*a*, the local digital assistant would add response 1101 to a note in a note taking app (in accordance with the processes described with respect to FIGS. 10B-10C).

Figure 12:
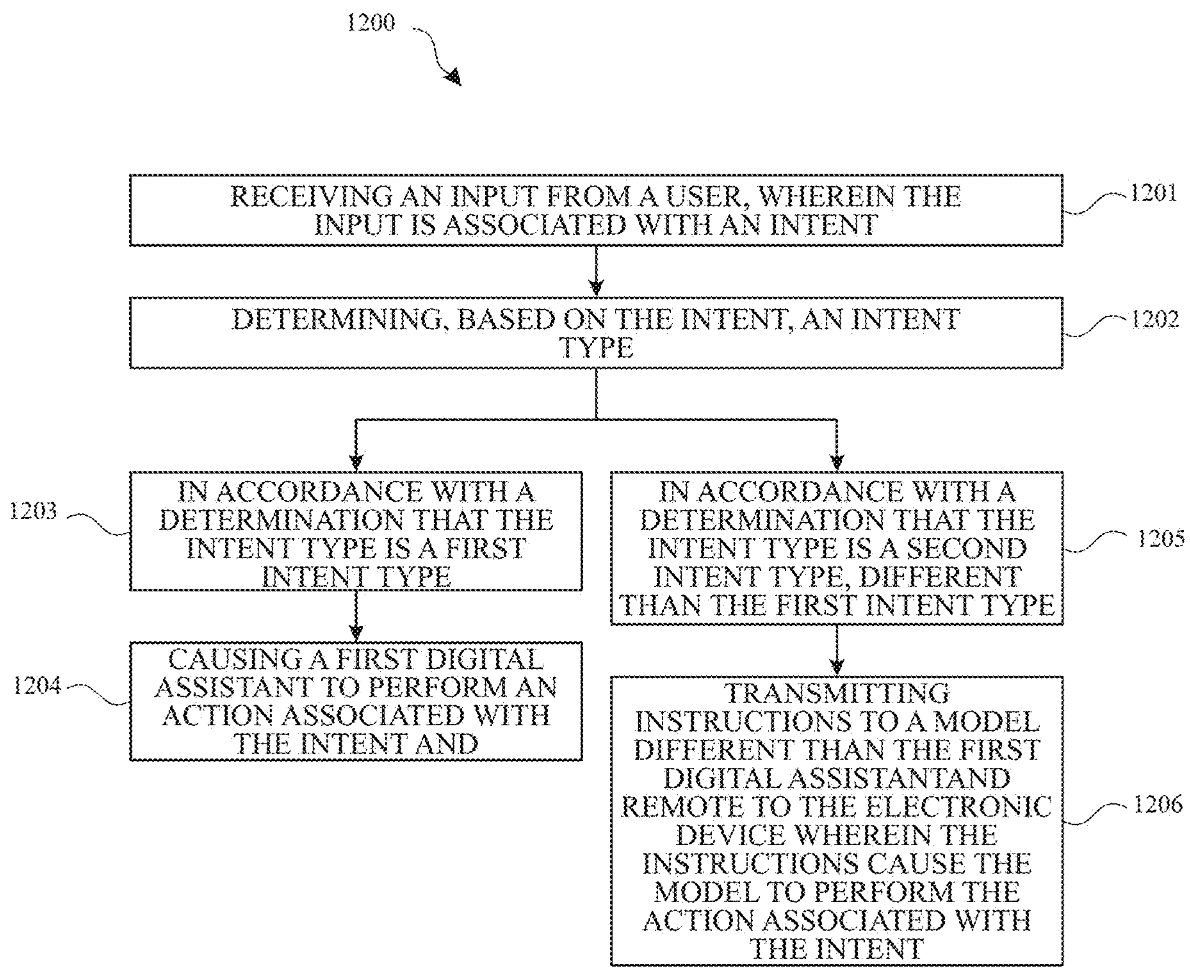
FIG. 12 illustrates a flow diagram illustrating a process for processing intents using a digital assistant and a remote model, in accordance with some embodiments.

FIG. 12 illustrates a flow diagram illustrating a process for processing an intent using a digital assistant and a remote model, according to various examples. Process 1200 is performed, for example, using one or more electronic devices implementing a digital assistant (e.g., electronic devices 600, 901, 1000, or 1025). In some examples, one or more blocks of process 1200 are performed by one or more remote devices (e.g., one or more remote servers, one or more local servers, a cloud computing system, and/or the like). Alternatively, the one or more blocks of process 1200 are performed by the one or more client electronic devices implementing a digital assistant or a software application. For example, the blocks of process 1200 are divided up in any manner between one or more servers (e.g., DA server) and a client device (e.g., 600, 901, 1000, or 1025). Thus, while portions of process 1200 are described herein as being performed by particular devices, it will be appreciated that process 1200 is not so limited. In another example, the process 1200 is performed using only a client device (e.g., electronic device 600) or multiple client devices. In process 1200, some blocks are, optionally, combined, the order of some blocks is, optionally, changed, and some blocks are, client devices (e.g., 600), optionally, omitted. In some examples, additional steps may be performed in combination with process 1200.

In some examples, the electronic device (e.g., a personal or client electronic device (e.g., a mobile device (e.g., iPhone®), a tablet computer (e.g., iPad®), a smart watch (e.g., Apple Watch®), a desktop (e.g., iMac®), or a laptop (e.g., MacBook®)) or a communal electronic device (e.g., a smart TV (e.g., Apple TV®), virtual reality headset (e.g., VR headset), smart vehicle, or augmented reality headset (e.g., smart glasses))) (e.g., electronic device 600 or 800) may be connected to a communications network (e.g., local area networks (LAN) or wide area networks (WAN), e.g., the Internet). The electronic device may include a display (e.g., 212) which may provide an input interface and an output interface between the electronic device and a user. The input interface may be an icon of a digital assistant or a software application for a user to provide user requests.

In some examples, at block 1201, the electronic device (e.g., 901, 1000, or 1025) receives an input from a user, wherein the input is associated with an intent. For example, the electronic device may receive an input "What can I make with this?" associated with an image question intent (as described with respect to FIGS. 10A-10B).

In some examples, at block 1202, the electronic device (e.g., 901, 1000, or 1025) determines, based on the intent, an intent type (as described with respect to FIGS. 10A-10B) (e.g., using an AI process or a generative AI process). In some examples, the electronic device determines the intent is a first intent type. For example, a first intent type can include intents that require a response of less than a threshold number of bits in size. In another example, a first intent type can include intents that are associated with a first party application (e.g., messaging application) (e.g., 1021 or 1040). In another example, a first intent type can include an intent that was received subsequent to the electronic device providing a response generated by a local digital assistant (e.g., 904). In some examples, the electronic device determines the intent is a second intent type. For example, a second intent type can include intents that require a response of greater than or equal to a threshold number of bits in size. In another example, a second intent type can include intents associated with an image question (e.g., "What can I make with this?" in FIG. 10A). In another example, a second intent type can include intents associated with analyzing a text file or an image file (e.g., input 1036). In another example, a first intent type can include an intent that was received subsequent to the electronic device providing a response generated by a remote model (e.g., 906).

In some examples, at block 1203, in accordance with a determination that the intent type is a first intent type (as described with respect to FIGS. 10A-10B), block 1204 is performed. In some examples, at block 1204, the electronic device (e.g., 901, 1000, or 1025) causes a first digital assistant (e.g., 904) (e.g., a language model and/or generative model) (e.g., installed on the electronic device) to perform an action associated with the intent (e.g., using an AI process or a generative AI process). For example, if the electronic device receives the input "Send this to Troy" and determines the intent is a first intent type (e.g., because the first digital assistant satisfied a previously received intent), then the electronic device would cause the first digital assistant to perform the action of generating a response of recipes a user could make with an object in an image (e.g., 1001).

In some examples, at block 1205, in accordance with a determination that the intent is a second intent type (as described with respect to FIGS. 10A-10B), block 1206 is performed. In some examples, at block 1206, the electronic device (e.g., 901, 1000, or 1025) transmits instructions to a model (e.g., 906) different than the first digital assistant (e.g., 904) and remote to the electronic device, wherein the instructions cause the model to perform the action associated with the intent (as described with respect to FIGS. 10A-10B) (e.g., using an AI process or a generative AI process). For example, if the electronic device receives the input "What can I make with this?" associated with the image question intent while displaying image 1002, the electronic device determines the intent is an intent of the second type because the intent is associated with an image question, and accordingly, the electronic device would transmit instructions to a remote model (e.g., 906) so that the remote model can analyze image 1002 to identify elements in the image.

In some examples, after transmitting the instructions to the model (e.g., remote model 906) the electronic device, at the first digital assistant, a response (e.g., 1007, 1010, and/or 1018) from the model (e.g., 906), and the electronic device (e.g., using the first digital assistant) provides the response (e.g., to the user).

In some examples, receiving the response (e.g., 1007, 1010, 1015, and/or 1018) from the model includes the electronic device receiving, at the first digital assistant, a plurality of responses associated with the intent, and providing the response includes providing a response from the plurality of responses based on context data.

In some examples, the context data includes whether a user gaze is detected at the electronic device. For example, if the electronic device detects a user gaze, the electronic device may use context to elect to provide a visual response since the user is already gazing at the electronic device.

In some examples, the context data includes whether audio is being outputted at the electronic device. For example, if the electronic device is outputting music using a media application installed on the electronic device, the electronic device may use the context to elect to provide a visual response (e.g., displaying a graphical representation of the response (e.g., 1007, 1010, 1015, and/or 1018) instead of an audio response (e.g., providing the response as an audio output).

In some examples, the context includes determining a type (e.g., speaker, television, smart watch, desktop, laptop, smart phone, and/or AR headset) of a second electronic device, wherein the second electronic device is currently connected to the electronic device. For example, if a speaker device (e.g., earphones with speakers) is connected to the electronic device, the electronic device may use that context to elect to provide an audio response instead of a visual response since the connected speaker is best used to provide audio responses.

In some examples, after providing the response, the electronic device receives a second input (e.g., 1009, 1012, 1016, and/or 1021) from the user, wherein the second input is associated with a second intent. In some examples, the electronic device determines, based on the second input, an intent type associated with the second intent. In some examples, in accordance with a determination that the second intent is a regenerate intent type (e.g., 1016), the electronic device determines which digital assistant (e.g., first digital assistant (e.g., 904) and/or the model (e.g., 906)) performed the action. In some examples, the electronic device determines whether the first digital assistant performed the action, or the model performed the action. In some examples, in accordance with a determination that the first digital assistant performed the action, the electronic device performs the action using the first digital assistant. In some examples, the electronic device performs the action using a different seed (e.g., a random or pseudo-random seed is used as part of the prompt for creating generative content (e.g., the random or pseud-random seed content is used as a starting point for creating the generative content)) than when the electronic device performed the action originally. In some examples, in accordance with a determination that the model performed the action, the electronic device transmits second instructions to the model, wherein the second instructions cause the model to perform the action. In some examples, the second instructions cause the model to perform the action using a different seed than when the model performed the action originally.

In some examples, after providing the response, the electronic device receives a second input (e.g., 1009, 1012, 1016, and/or 1021) from the user, wherein the second input is associated with a second intent. In some examples, the electronic device determines, based on the second input, an intent type associated with the second intent. In some examples, in accordance with a determination that the second intent is a follow-up intent type (e.g., 1009), the electronic device determines which digital assistant (e.g., first digital assistant (e.g., 904) and/or the model (e.g., 906)) performed the action. In some examples, the electronic device determines whether the first digital assistant performed the action, or the model performed the action. In some examples, in accordance with a determination that the first digital assistant performed the action, the electronic device performs a second action associated with the second intent using the first digital assistant. In some examples, in accordance with a determination that the model (e.g., 906) performed the action, the electronic device transmits third instructions to the model, wherein the third instructions cause the model to perform the second action using the model.

In some examples, receiving the response from the model includes, receiving a plurality of refinement prompts, and providing the response includes concurrently providing the response and at least one refinement prompt (e.g., 1011*a*, 1011*b*, and/or 1011*c*) of the plurality of refinement prompts.

In some examples, each refinement prompt of the plurality of refinement prompts comprises: a suggested natural language input (e.g., "Give me a smoothie recipe" as depicted in FIG. 10D) and a refinement response (e.g., 1015) to the suggested natural language input.

In some examples, the electronic device receives a second user input (e.g., 1009, 1012, 1016, and/or 1021) wherein the second user input is associated with a refinement prompt (e.g., 1012). In some examples, in accordance with a determination that the second input is associated with a refinement prompt: the electronic device provides, using the first digital assistant, the refinement response. In some examples, the electronic device provides the refinement response using the model.

In some examples, the plurality of refinement prompts are determined based on: a number of characters in the response, at least one application installed on the electronic device, and/or at least one query commonly requested by other users.

In some examples, determining the intent type includes determining the intent type is the first intent type when the input is associated with a first-party application. For example, if the input explicitly references (e.g., by name and/or keyword) a messaging application (e.g., that was created by the distributor of the electronic device), the electronic device may determine the input is associated with the first intent type.

In some examples, determining the intent type includes determining the intent type is the first intent type when the input includes a trigger associated with the first digital assistant. For example, if the input includes a wakeword or trigger corresponding to the first digital assistant (e.g., "Hey Assistant, . . . "), then the electronic device may determine the intent type is the first intent type.

In some examples, determining the intent type includes determining the intent type is the second intent type when the input (e.g., 1034) includes an associated electronic document (e.g., 1033*a*). (As described with respect to FIGS. 10I-10L.)

In some examples, determining the intent type includes determining the intent type is the second type when the input includes a trigger associated with the model.

In some examples, determining the intent type includes: the electronic device determining whether the first digital assistant can satisfy the intent. In some examples, determining the intent type includes, in accordance with a determination that the first digital assistant can satisfy the intent, the electronic device determining the intent type is the first intent type. In some examples, determining the intent type includes, in accordance with a determination that the first digital assistant cannot satisfy the intent, the electronic device determining the intent type is the second intent type.

In some examples, the electronic device determines the intent type based on context data, wherein the context data includes: a displayed application; a displayed image specified in the input; a user defined set of rules; at least one keyword in the input; an application specified in the input; a domain of the input; an amount of data necessary to satisfy the intent; whether the intent requires private information related to the user; and/or whether a previous intent provided by the user was satisfied using the model.

In some examples, determining the intent type includes: the electronic device determining the input includes an ambiguous term (e.g., this, his, her, they, them, it, and/or that), and in accordance with the determination that the input includes an ambiguous term, disambiguating the ambiguous term using a displayed element, wherein the displayed element is an element that the user most recently interacted with. For example, if the user taps on a word in an electronic document displayed on a word processor application and provides the input "what does this mean?", the electronic device can disambiguate the term "this" to include the word the user tapped on.

In some examples, transmitting the instructions occurs in response to a second user input (e.g., 1006). In some examples, in accordance with a determination that the intent type is the second intent type: the electronic device displays a prompt (e.g., 1003), wherein the prompt indicates the request can be shared to the model to satisfy the intent (e.g., FIG. 10B), and the electronic device receives a second input (e.g., selecting continue affordance 1006) associated with the prompt.

In some examples, the prompt (e.g., 1003) is displayed based on a user preference. For example, a user may enable (e.g., via a user profile and/or a system settings application installed on the electronic device) the electronic device to provide the prompt anytime the electronic device determines the intent type is a second intent type. In another example, a user may enable the electronic device to provide the prompt whenever the input and/or intent corresponds to personal information (e.g., intent requires user health information, email information, messaging information, and/or biometric information).

Figure 13:
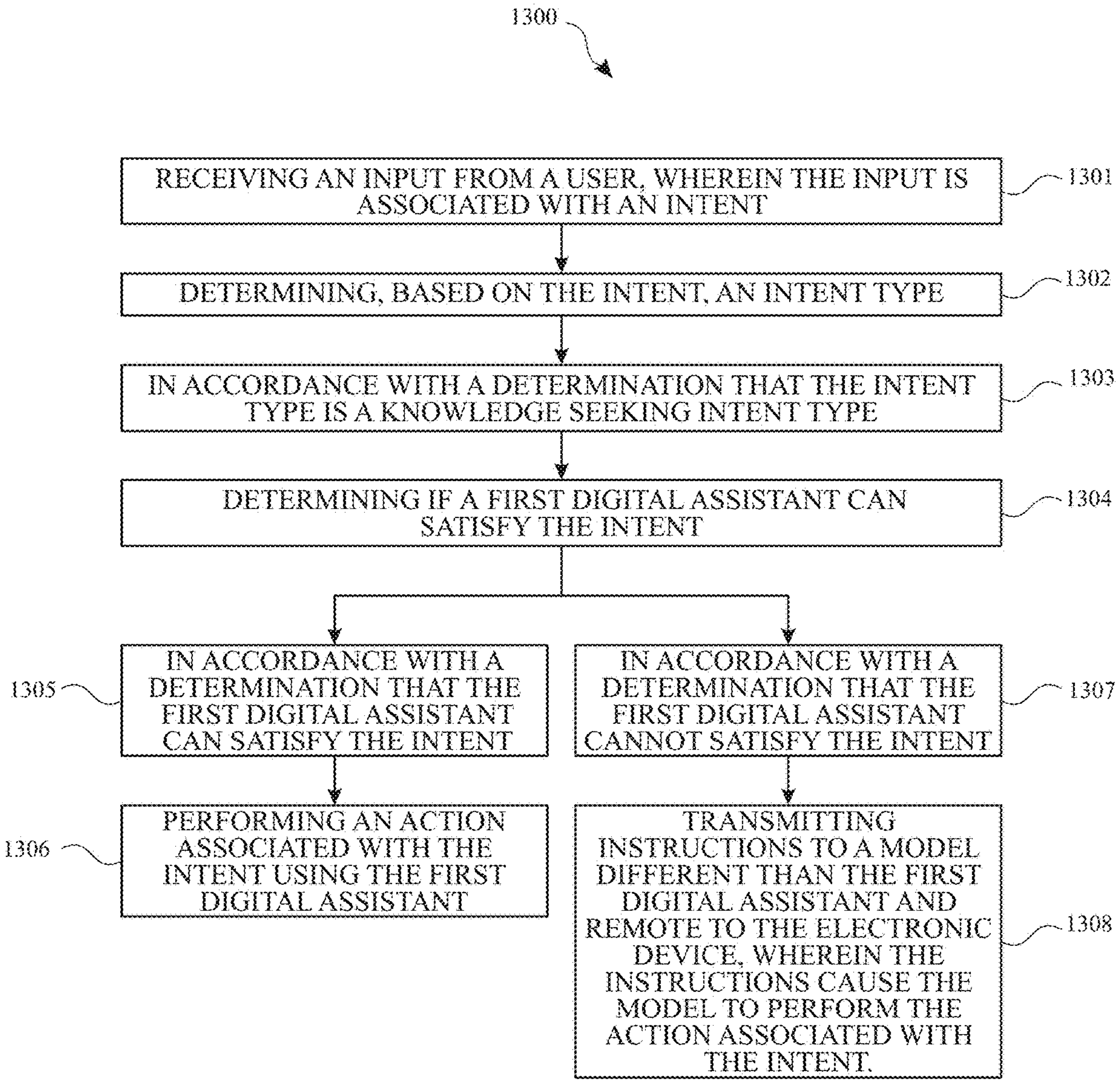
FIG. 13 illustrates a flow diagram illustrating a process for processing knowledge seeking intents using a digital assistant and a remote model, in accordance with some embodiments.

FIG. 13 illustrates a flow diagram illustrating a process for processing knowledge seeking intents using a digital assistant and a remote model, according to various examples. Process 1300 is performed, for example, using one or more electronic devices implementing a digital assistant (e.g., electronic devices 600, 901, 1000, or 1025) or a software application for a digital assistant computing system in a similar manner to Process 1200 (as discussed previously with respect to FIG. 12).

In some examples, at block 1301, the electronic device (e.g., 901, 1000, or 1025) receives an input from a user, wherein the input I (e.g., input 1100) is associated with an intent. For example, the electronic device may receive an audio input which is associated with a knowledge seeking intent "What should I pack for a trip to Las Vegas?" (as described with respect to FIG. 11A).

In some examples, at block 1302, the electronic device (e.g., 901, 1000, or 1025) determines, based on the intent, an intent type (as described with respect to FIGS. 11A-11B) (e.g., using an AI process or a generative AI process). For example, the electronic device may determine the intent "What should I pack for a trip to Las Vegas" is a knowledge seeking intent type because the intent corresponds to a request to obtain information.

In some examples, at block 1303, in accordance with a determination that the intent type is a knowledge seeking intent type (as described with respect to FIG. 11A), block 1304 is performed. In some examples, at block 1304, the electronic device (e.g., 901, 1000, or 1025) determines if a first digital assistant can satisfy the intent (as described with respect to FIG. 11A) (e.g., using an AI process or a generative AI process). For example, the electronic device may use a classifier to compare the knowledge seeking intent "What should I pack for a trip to Las Vegas?" to compare the knowledge seeking intent to a dataset of queries in knowledge database 905.

In some examples, at block 1305, in accordance with a determination that the first digital assistant (e.g., 904) can satisfy the intent (as described with respect to FIGS. 11A-11B), block 1306 is performed. In some examples, at block 1306, the electronic device (e.g., 901, 1000, or 1025) performs an action associated with the intent using the first digital assistant (e.g., 904) (as described with respect to FIGS. 11A-11B) (e.g., using an AI process or a generative AI process). For example, if the classifier matches the knowledge seeking intent to a user query in the data set of user queries and the matched user query is labeled as appropriate for DA1 904 to handle, DA1 904 will perform an internet search and provide a response with a list of what is commonly packed for a trip to Las Vegas.

In some examples, at block 1307, in accordance with a determination that the first digital assistant (e.g., 904) cannot satisfy the intent (as described with respect to FIGS. 11A-11B), block 1308 is performed. In some examples, at block 1308, the electronic device (e.g., 901, 1000, or 1025) transmits instructions to a model (e.g., 906) different than the first digital assistant (e.g., 904) and remote to the electronic device (as exemplified in FIG. 9), wherein the instructions cause the model to perform the action associated with the intent (as described with respect to FIGS. 11A-11B). For example, if the classifier matches the knowledge seeking intent to a user query in the data set of user queries and the matched user query is labeled as inappropriate for DA1 904 to handle, DA1 904 will transmit the instructions to DA2 906 (as described with respect to FIG. 11A) and DA2 906 will generate response 1101 (e.g., automatically-generated visual content and/or generative visual content) (e.g., automatically-generated audio content and/or generative audio content) with a list of items to pack for a trip to Las Vegas.

In some examples, after transmitting the instructions to the model: the electronic device receives, at the first digital assistant, a response (e.g., 1101) from the model, and the electronic device provides the response (e.g., via a visual and/or audio and/or mixed response type).

In some examples, receiving the response from the model includes, receiving a plurality of refinement prompts (e.g., 1103*a* and/or 1103*b*), and wherein providing the response includes providing the response and at least one refinement prompt of the plurality of refinement prompts (e.g., as depicted in FIG. 11B).

In some examples, each refinement prompt of the plurality of refinement prompts comprises: a suggested natural language input (e.g., "Add Items for a Business Trip" as depicted in FIG. 11B) and a refinement response (e.g., 1015) to the suggested natural language input.

In some examples, the electronic device receives a second user input (e.g., 1012), wherein the second user input is associated with a refinement prompt. In some examples, in accordance with a determination that the second input is associated with a refinement prompt, the electronic device provides, using the first digital assistant, the refinement response (e.g., 1015).

In some examples, the plurality of refinement prompts are determined based on: a number of characters in the response, at least one application installed on the electronic device, and/or at least one query commonly requested by other users.

In some examples, determining if the first digital assistant can satisfy the intent includes foregoing determining whether a previous intent provided by the user was satisfied using the model.

In some examples, determining if the first digital assistant can satisfy the intent includes using a local knowledge base (e.g., 905), wherein the local knowledge base includes a data set of user queries associated with the first digital assistant. For examples, the data set of user queries may include a queries the user previously provided that were satisfied by the first digital assistant. In another example, the data set of user queries may include queries that were provided by the distributor and/or manufacturer of the electronic device that are labeled as appropriate for the first digital assistant to respond to.

In some examples, each user query in the data set of user queries is associated with a predetermined indication as to whether the query is either appropriate or not appropriate for the first digital assistant to handle. For example, common knowledge requests or requests that require lower than a threshold amount of processing power to satisfy may be labeled as appropriate for the first digital assistant to handle.

In some examples, determining if the first digital assistant can satisfy the intent using a knowledge base includes, comparing the intent to the data set of user queries.

In some examples, comparing the intent to the data set includes using a classifier (as described with respect to FIG. 9).

In accordance with some implementations, an electronic device (e.g., a portable electronic device) is provided that comprises one or more processors and memory storing one or more programs for execution by the one or more processors, the one or more programs including instructions for performing any of the methods or processes described herein.

7. Processing Intents Using a Local and/or Remote Model

Figure 14A:
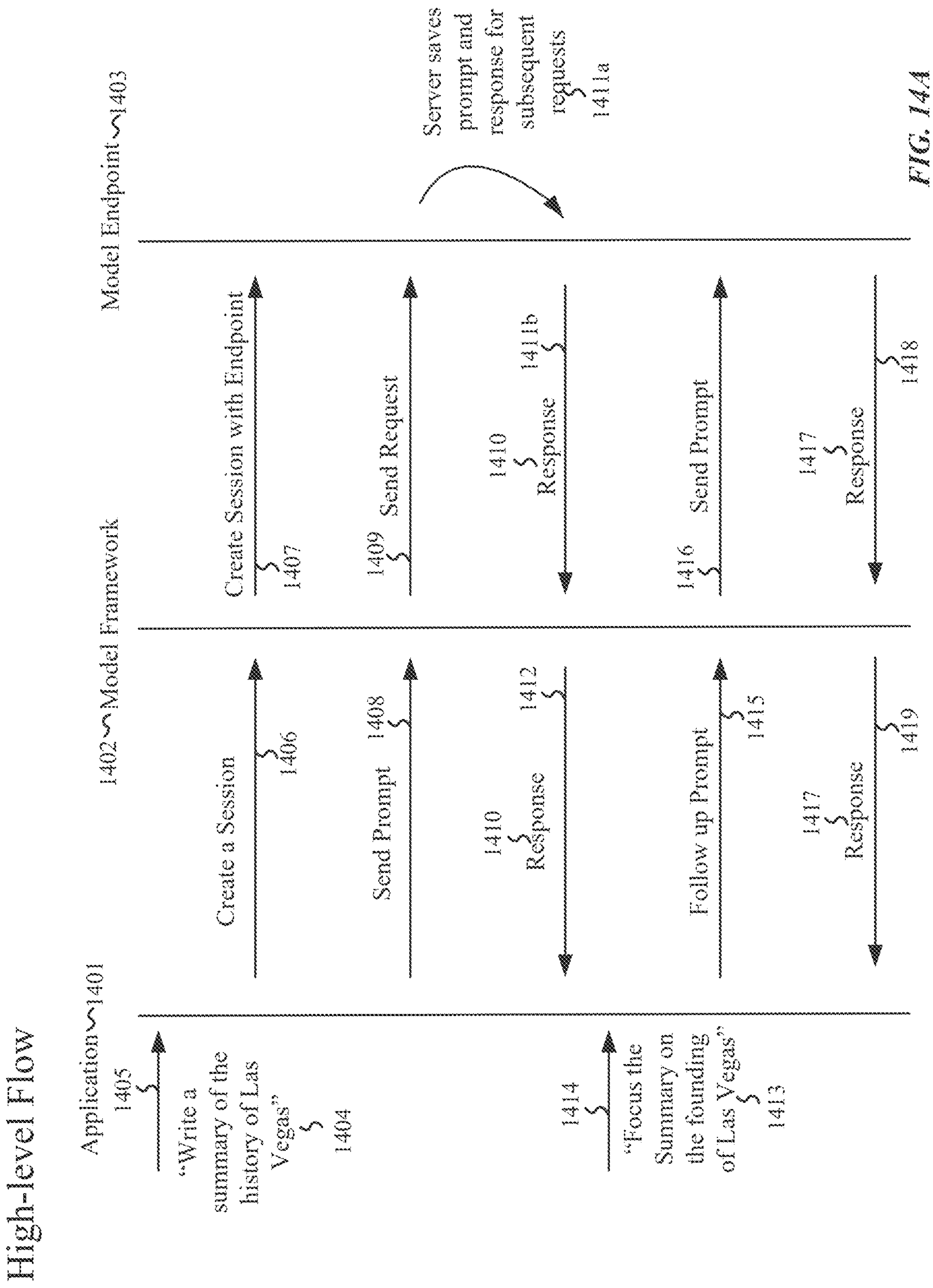
FIGS. 14A-14C illustrate an exemplary system for processing intents using a language model in accordance with some embodiments.
Figure 14B:
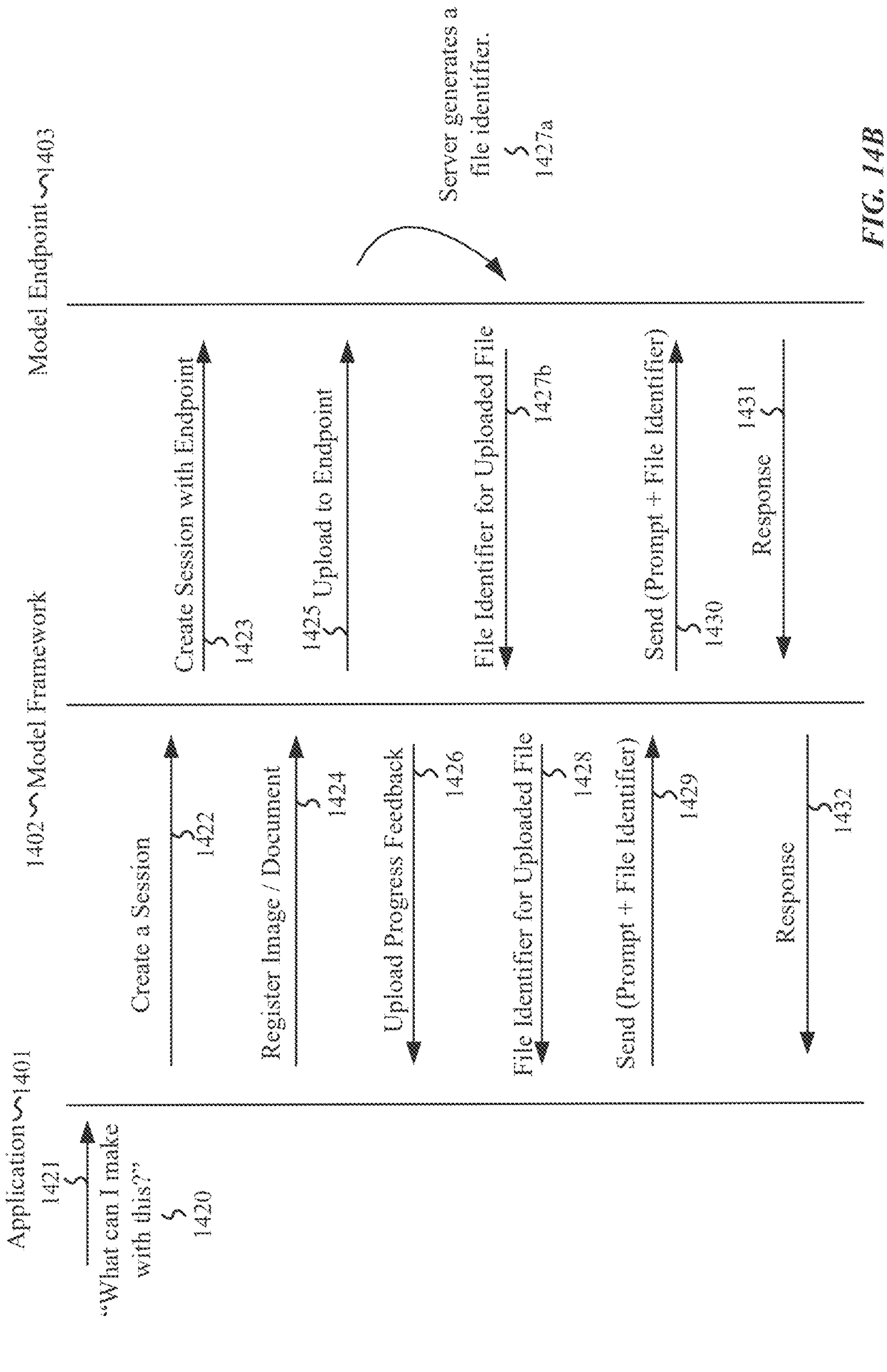
Figure 14C:
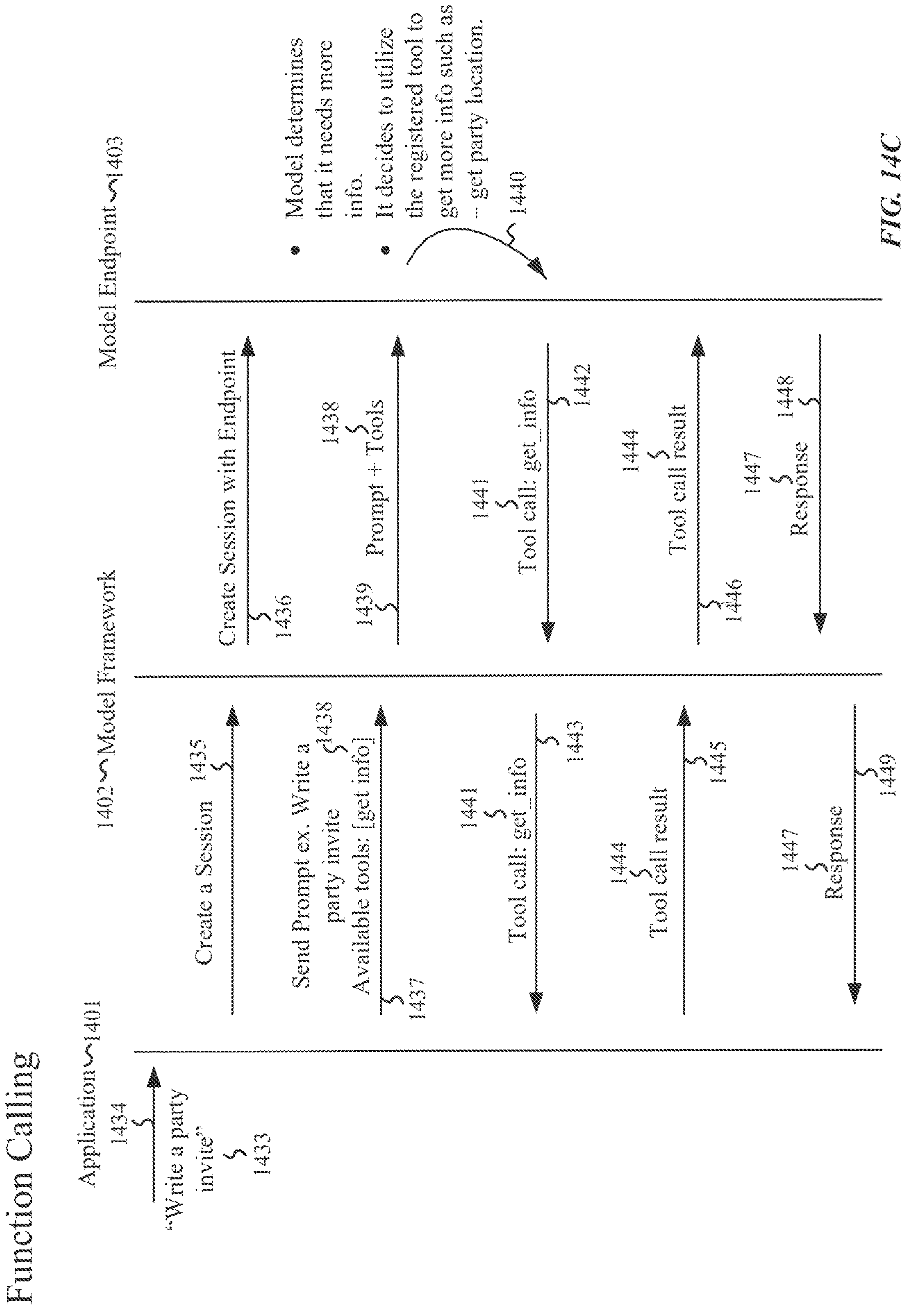
Figure 15A:
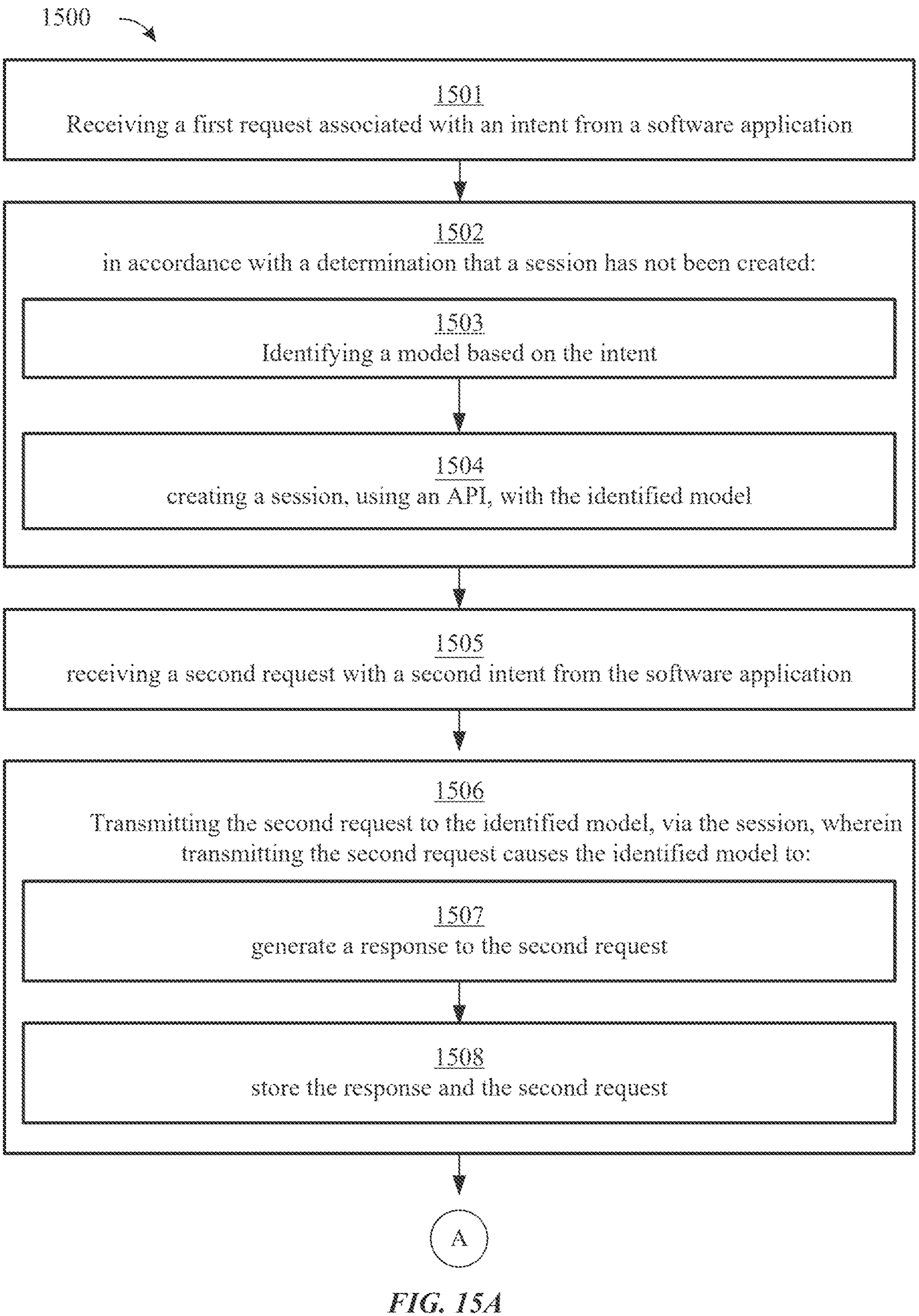
FIGS. 15A-15B illustrate flow diagrams illustrating a process for processing intents using a local or remote language model, in accordance with some embodiments.
Figure 15B:
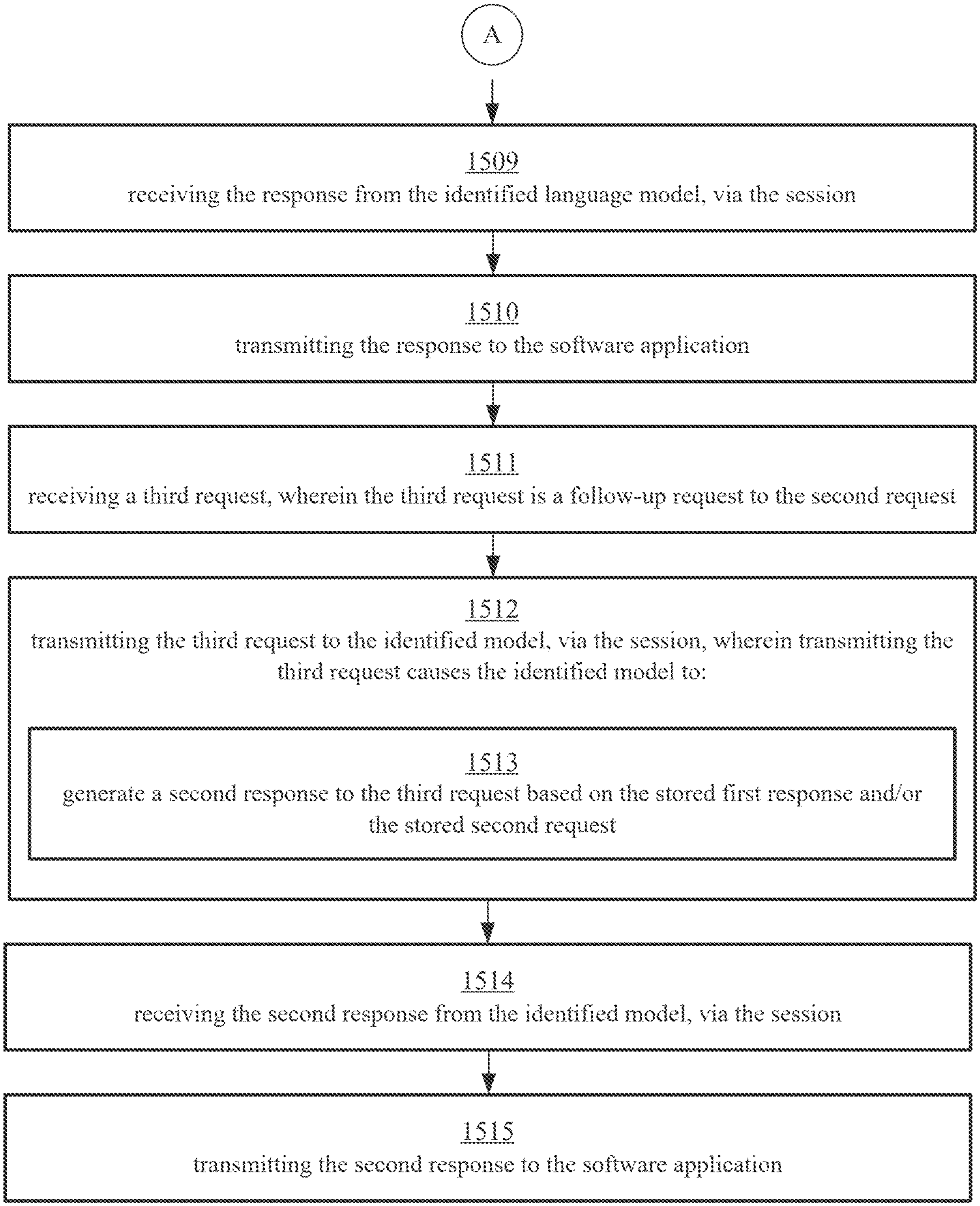

FIGS. 14A-14C illustrate an exemplary system for processing intents using a language model (e.g., local (e.g., installed on electronic device 1000) and/or remote (e.g., 906)) in accordance with some embodiments. FIGS. 15A-15B are flow diagrams of an exemplary method 1500 for processing intents using a local and/or remote language model.

FIGS. 14A-14C illustrate diagrams of components installed and/or available to electronic device 1000. Specifically, FIGS. 14A-14C illustrate application 1401 (e.g., digital assistant application, text generation application, internet browser application, video game application, multi-media application, messaging application, etc.) installed on electronic device 1000 that can communicate with model framework 1402. In some examples, model framework 1402 is a module or a software library installed on electronic device 1000. In some examples, model framework 1402 is a module in communication with the operating system (e.g., of electronic device 1000). In some examples, model framework 1402 is a collection of functions integrated into the operating system of electronic device 1000. In some examples, the collection of functions integrated into the operating system of electronic device 1000 include subroutines and/or functions that enable communication between application 1401 and model endpoint 1403. In some examples, model framework 1402 is accessible to users and/or components of electronic device 1000 via one or more APIs. In some examples, FIGS. 14A-14C further illustrate model framework 1402 being in communication with model endpoint 1403 via an API). In some embodiments, the API is a Representational State Transfer (REST)

API. In some examples, model endpoint 1403 corresponds to a local model (e.g., 904) and/or a remote model (e.g., 906). In some examples, a local model and/or a remote model are large language models (LLMs). In some embodiments, model endpoint corresponds to a single model of a plurality of models available to electronic device 1000.

FIG. 14A illustrates electronic device 1000 receiving input 1404 ("Write a summary of the history of Las Vegas") using application 1401 as depicted by arrow 1405. For example, a digital assistant application may receive a speech and/or textual input such as input 1404. In some embodiments, application 1401 performs natural language processing (e.g., using a natural language processor (e.g., 732)) to determine an intent from input 1404. For example, application 1401 on electronic device 1000 may determine input 1404 is associated with a knowledge-based intent (e.g., as described with respect to process 1300).

FIG. 14A further illustrates, in response to receiving input 1404, model framework 1402 receives a request from application 1401 to create a session with a model as illustrated by arrow 1406. In some examples, a session includes generating a session id to store and leverage requests from previous iterations using the same model. For example, if the identified model was used to provide a response to an input "When is the next professional baseball game near me?", then the model framework can use the session (via a session id) to inform the identified model that any further request may use the information about the next professional baseball game as context information. Continuing the example, after notifying the user that the next baseball game near them is on the coming Saturday, the user may follow-up with "How much are tickets?" and by assigning that follow-up with the same session id, the model framework can inform the identified model that the model can and/or should use the previous response to "when the next professional baseball game near me" to answer the follow-up request "How much are tickets?". In some examples, the request from application 1401 instructs model framework 1402 to create a session with a remote model (e.g., 906).

In some examples, in response to receiving the request to create the session, model framework 1402 determines if a session has been created. In some examples, in accordance with a determination that a session has not been created, model framework 1402 identifies a model from a plurality of models to create the session. In some examples, the request to create the session includes parameters associated with input 1404 and identifying the model is based on the parameters associated with input 1404. In some examples, parameters associated with input 1404 include an intent (e.g., generate text about the history of Las Vegas), an intent type (e.g., knowledge-seeking type, textual generation type, and/or image processing type), user preferences (e.g., associated with electronic device 1000 and/or associated with application 1401), capabilities of each of the one or more models, a response type (e.g., audio response, visual response, mixed response), and/or a bit size necessary to respond to input 1404. For example, if an intent associated with input 1404 requires greater than a threshold number of bits to satisfy, then electronic device 1000 may identify a remote model of a plurality of models to satisfy the request. In another example, a user may select a setting on application 1401 that prefers to utilize models installed on electronic device 1000 when satisfying intents using application 1401, and accordingly, electronic device 1000 may identify, based on that user preference, a local model from a plurality of models. In another example, if the intent type is a knowledge-seeking intent type, model framework 1402 may determine if a local model may satisfy the intent (e.g., using process 1300) (e.g., using knowledge database 905). Continuing the example, if the local model can satisfy the intent, model framework 1402 identifies the local model (e.g., installed on electronic device 1000) from a plurality of models.

In some examples, model framework 1402 identifies a model from a plurality of models using process 1200 and/or process 1300.

As illustrated in FIG. 14A, in response to identifying a model, model framework 1402 creates a session, using an API, with model endpoint 1403 corresponding to the identified model as depicted by arrow 1407. In some examples, creating the session includes receiving a session id from the identified model. In some examples, the session id corresponds to the identified model. In some examples, creating the session includes authenticating the user who provided input 1404. For example, electronic device 1000 (e.g., using application 1401) may request a user provide user credentials (e.g., passcode and/or biometric information) to authenticate the user. In some examples, creating the session includes transmitting the user credentials to the identified model (e.g., using model endpoint 1403). In some examples, the model generates the session id based on the user credentials. For example, after a user authenticates themselves by providing user credentials, model framework 1402 transmits the user credentials to model endpoint 1403, and model framework 1402 receives a session id associated with the user credentials from model endpoint 1403. In some examples, the created session allows the identified model to remember information about the user (e.g., associated with the user credentials) across multiple requests/intents.

As illustrated in FIG. 14A, model framework receives a prompt associated with input 1404 from application 1401 as depicted by arrow 1408. In some examples, input 1404 includes an intent. For example, model framework 1402 receives an intent to generate a summary of the history of Las Vegas.

As illustrated in FIG. 14A, in response to receiving the prompt, model framework 1402 transmits the prompt to model endpoint 1403 (as depicted by arrow 1409), which causes the identified model to generate response 1410 to the prompt and store the prompt with generated response 1410 on an electronic device associated with the identified model (e.g., electronic device 1000 and/or a remote electronic device in communication with electronic device 1000) (e.g., a electronic device that the identified language model is installed on) as depicted by arrow 1411*a*.

In some examples, generated response 1410 and the prompt are associated with the created session (e.g., using a session id). In some examples, generated response 1410 and the prompt are stored while the session is active and/or until the session is closed or ended. In some examples the session is closed after providing a response and a predetermined amount of time elapses without receiving a follow-up request. For example, if electronic device 1000 provides generated response 1410 and does not receive input after a threshold amount of time (e.g., 10 sec), the electronic device where the identified language model is installed on (e.g., electronic device 1000 and/or an electronic device in communication with electronic device 1000) may release memory associated with generated response 1410 and the prompt.

FIG. 14A further illustrates that model framework 1402 receives generated response 1410 from model endpoint 1403 as depicted by arrow 1411*b*. In some examples, generated response 1410 includes a visual, auditory, and/or a mixed mode (as described with respect to FIG. 10C). In some examples, electronic device 1000 determines which mode to present generated response 1410 using the process described with respect to FIGS. 10A-10C and FIG. 12.

FIG. 14A illustrates, in response to receiving response 1407, model framework 1402 transmits generated response 1410 to application 1401 as depicted by arrow 1412. In some examples, transmitting generated response 1410 to application 1401 causes application 1401 to provide generated response 1410 to the user (e.g., using a display generation component on electronic device 1000 and/or using an auditory component on electronic device 1000).

FIG. 14A illustrates, after causing application 1401 to provide generated response 1407, application 1401 receives follow-up input 1413 "focus the summary of this on the founding of Las Vegas" as depicted by arrow 1414. In some examples, a follow-up input is an input that references a generated response from the identified model. For example, "this" in follow-up input 1408 refers to generated response 1410 which was provided by application 1401. In some examples, model framework 1402 receives a follow-up prompt corresponding to follow-up input 1408 as depicted by arrow 1415. For example, the follow-up prompt may include an intent to generate a summary of text on the founding of Las Vegas based on generated response 1410. In some examples, in accordance with a determination that the follow-up prompt is received within a threshold amount of time, model framework 1402 forgoes identifying a model and transmits the follow-up prompt to model endpoint 1403 using the created session which causes the identified model that generated response 1410 to generate response 1417 (as depicted by arrow 1416). In some examples, the identified model stores generated response 1417 and the follow-up prompt in response to receiving the follow-up prompt (e.g., in a similar manner to generated response 1410 and the prompt).

In some examples, the identified model generates generated response 1417 based on a session id, the stored prompt, and/or generated response 1410. For example, the identified model in FIG. 14A may generate a modified version of generated response 1410 to focus on the founding of Las Vegas which would conserve processing power by leveraging the stored response 1410 that includes the text the user wants to "focus . . . on the founding of Las Vegas" rather than require application 1401 to provide generated response 1410 to model endpoint 1403.

In some examples, model framework 1402 receives generated response 1417 from model endpoint 1403 (in a similar manner as response 1410) as depicted by arrow 1418. In some examples, in response to receiving generated response 1417, model framework 1402 transmits generated response 1417 to application 1401 as depicted by arrow 1419, which causes electronic device 1000 to provide generated response 1417 to the user (e.g., in a similar manner as response 1410).

FIG. 14B illustrates application 1401 receiving input 1420 "What can I make with this?" as depicted by arrow 1421. In some examples, input 1420 is associated with an image file (e.g., png/jpeg) and/or an electronic document (e.g., pdf/txt). In some examples, input 1420 is associated with an image identifier and/or electronic document identifier. In some examples, input 1420 is associated with an image/electronic document when the input is received while displaying an image/electronic document. In some examples, input 1420 is associated with an image/electronic document when the input refers to a selected or displayed image/electronic document. For example, as depicted in FIGS. 10A-10C, the input "What can I make with this?" is associated with image 1002 because "this" in the input references image 1002, and image 1002 is displayed when the input is received. In another example, input 1036 "What's the main finding of this paper" is associated with electronic document 1033*a* because the input includes icon 1035.

In some examples, in response to receiving input 1420, model framework 1402 receives a request to create a session with a model from application 1401 as depicted by arrow 1422. In some examples, the request to create the session includes parameters associated with input 1420. In some examples, the parameters include an intent, an intent type, user preferences, and/or a bit size necessary to respond to input 1420.

In FIG. 14B, in response to receiving the request to create the session, model framework 1402 determines if a session has been created. In some examples, in accordance with a determination that the session has not been created, model framework 1402 identifies a model from a plurality of models to create a session with. In some examples, the request to create the session includes parameters associated with input 1420 and identifying the model is based on the parameters (as described with respect to FIG. 14A).

As illustrated in FIG. 14B, in response to identifying a model, model framework 1402 creates a session, using an API, with model endpoint 1403 corresponding to the identified model (in a similar manner as described with respect to FIG. 14A) as depicted by arrow 1423.

As illustrated in FIG. 14B, model framework 1402 receives a request to register an image/electronic document from application 1401 as depicted by arrow 1424. In some examples, the request to register an image/electronic document includes the image and/or electronic document file that is associated with input 1420. For example, in FIG. 10A, the image of the dragon fruit would be included in the request to register the image/electronic document since the image of the dragon fruit is referenced in the input "What can I make with this?". As illustrated in FIG. 14B, the request to register the image/electronic document includes an intent to register the image/electronic document on the identified model. In some examples, prior to transmitting the request to register then image/document to model framework 1402, application 1401 prompts the user requesting permission to share and/or store the image and/or electronic document on the identified model (as described with respect to FIG. 10B). In some examples, prompting the user requesting permission includes displaying the prompt on a display generation component in communication with electronic device 1000. In some examples, the system requests permission from the user to share and/or store the image and/or electronic document by audibly requesting permission using an auditory component in communication with electronic device 1000. In some examples, model framework 1402 receives the request to register the image/electronic document from application 1401 in response to receiving an input associated with an intent to share and/or store the image/electronic document with/on the identified model.

FIG. 14B illustrates in response to receiving the request to register the image/electronic document, model framework 1402 uploads, using the created session and/or an API, the image/electronic document to model endpoint 1403 as depicted by arrow 1425. In some examples, uploading the image/electronic document to model endpoint 1403 includes causing the identified model to store the image/electronic document on the electronic device associated with the identified model. As illustrated in FIG. 14B, uploading the image/electronic document to model endpoint 1403 includes generating a file identifier associated with the image/electronic document as depicted by arrow 1427*a*. In some examples, the file identifier is associated with an authenticated user. In some examples, the user is authenticated in a similar manner as described with respect to FIG. 14A.

FIG. 14B illustrates while uploading the image/electronic document to model endpoint 1403, model framework 1402 may transmit progress feedback to application 1401 as depicted by arrow 1426. For example, model framework 1402 may stream the progress in real time as the identified model is allocating memory for the image/electronic document. In another example, model framework 1402 may transmit progress feedback whenever the upload reaches a milestone (e.g., 25% and/or 50% upload progress).

FIG. 14B illustrates model framework 1402 receiving a file identifier from model endpoint 1403 as depicted by arrow 1427*b*. In response to receiving the file identifier from model endpoint 1403, model framework 1402 transmits the file identifier to application 1401 as depicted by arrow 1428.

FIG. 14B illustrates model framework 1402 receiving a prompt associated with input 1420 and the file identifier from application 1401 as depicted by arrow 1429. In some examples, the prompt includes an intent. For example, the prompt in FIG. 14B includes an intent to analyze image 1002 and generate a response with culinary information regarding the image (as depicted in FIGS. 10A-10C).

FIG. 14B illustrates in response to receiving the prompt associated with input 1420 and the file identifier from application 1401, model framework 1402 transmits, using the created session, the prompt and the file identifier to model endpoint 1403 as depicted by arrow 1430. In some examples, transmitting the prompt and the file identifier to model endpoint 1403 causes the identified model to generate a response based on the stored image/electronic document associated with the file identifier. For example, the identified model may generate a response such as response 1007 in FIG. 10C describing a dragon fruit in image 1002 and the culinary uses of dragon fruit. In some examples, causing the identified model to generate the response (e.g., 1007) includes storing the generated response (e.g., 1007) and the prompt associated with input 1420 is stored on the electronic device (e.g., 1000 and/or a electronic device in communication with electronic device 1000) that the identified model is installed on.

In some examples, model framework 1402 receives a generated response (e.g., response 1007) from model endpoint 1403 as depicted by arrow 1431.

In some examples, model framework 1402 transmits the generated response to application 1401 (e.g., in a similar manner as described with respect to FIG. 14A) as depicted by arrow 1432. In some examples, transmitting the generated response to application 1401 causes application 1401 to provide the response in a visual, auditory, and/or mixed mode (e.g., as described with respect to FIG. 14A).

In some examples, follow-up inputs received from application 1401 are processed in a similar manner as described with respect to FIG. 14A.

FIG. 14C illustrates application 1401 receiving input 1433 "Write a party invite" as depicted by arrow 1434. In some examples, input 1433 is a speech and/or a textual input.

FIG. 14C illustrates model framework 1402 receiving a request to create a session with a model from application 1401 as depicted by arrow 1435. In some examples, the request to create the session includes parameters associated with input 1433. In some examples, the parameters include an intent, an intent type, user preferences, and/or a bit size necessary to respond to input 1433.

In FIG. 14C, in response to receiving the request to create the session with a model, model framework 1402 determines if a session has been created. In some examples, in accordance with a determination that the session has not been created, model framework 1402 identifies a model from a plurality of models to create a session. In some examples, the request to create the session includes parameters associated with input 1433 and identifying the model is based on the parameters (as described with respect to FIG. 14A and FIG. 14B).

As illustrated in FIG. 14C, in response to identifying a model, model framework 1402 creates a session, using an API, with model endpoint 1403 corresponding to the identified model (in a similar manner as described with respect to FIG. 14A and FIG. 14B) as depicted by arrow 1436.

FIG. 14C illustrates, after creating the session with model endpoint 1403, model framework 1402 receives a prompt associated with input 1433 as depicted by arrow 1437. In some examples, the prompt associated with input 1433 includes an intent. For example, the prompt in FIG. 14C includes the intent to write a party invite. In some examples, the prompt includes one or more tool functions that a model can register. For example, FIG. 14C illustrates the prompt including tool function 1438 "[get_info]." In some examples, tool function 1438 includes a process to transform a state of the application and/or an electronic device associated with application 1401 (e.g., 1000). For example, the tool function can be used to invoke a text editor mode on application 1401 to display any generated response. In some examples, tool function 1438 includes a process to gather context data. For example, the tool function can be used to gather a user's location.

FIG. 14C illustrates, in response to receiving the prompt associated with input 1433 and tool function 1438, model framework 1402 transmits the prompt and tool function 1438 to model endpoint 1403 as depicted by arrow 1439. In some examples, transmitting the prompt and tool function 1438 to model endpoint 1403 causes the identified model to store (e.g., register) tool function 1438 on the electronic device (e.g., 1000 and/or electronic device in communication with electronic device 1000) that the identified model is installed on. In some examples, tool function 1438 allows the identified model to satisfy requests that are not exhaustive and/or do not include sufficient information to satisfy.

FIG. 14C illustrates the identified model determining that more information is necessary to satisfy the prompt as depicted by arrow 1440. In some examples, in accordance with a determination that more information is necessary to satisfy the prompt associated with input 1433, the identified model invokes tool function 1438 to gather the information necessary to satisfy prompt. For example, the identified model in FIG. 14C may determine a party location is necessary to write a party invite.

FIG. 14C illustrates, in response to the invocation of tool function 1438 by the identified model, model framework 1402 receives tool call 1441 from model endpoint 1403 as depicted by arrow 1442.

FIG. 14C further illustrates, in response to receiving tool call 1420 from model endpoint 1403, model framework 1402 transmits tool call 1420 to application 1401 as depicted by arrow 1443. In some examples, transmitting tool call 1420 to application 1401 causes application 1401 and/or electronic device 1000 to run the function associated with tool function 1438. For example, in FIG. 14C, electronic device 1000 may run a function to determine a user's home address (e.g., using contact application, user's current location, calendar application, and/or a user's previously sent messages).

FIG. 14C illustrates, model framework 1402 receiving tool call result 1444 from application 1401 as depicted by arrow 1445. In some examples, tool call result 1444 includes context information such as: a location, contact information, messaging information, authentication information, electronic device 1000 information (e.g., device type, battery life, size of display generation component, device types in communication with electronic device 1000), etc. For example, tool call result 1444 includes the location of the user's house based on a user's calendar entry stored on electronic device 1000 where the user indicated they will host a dinner party.

FIG. 14C further illustrates model framework 1402 transmitting tool call result 1444 to model endpoint 1403 as depicted by arrow 1446.

FIG. 14C further illustrates, in response to receiving tool call result 1444 from model framework 1402, the identified model generates response 1447 based on tool call result 1444. For example, generated response 1447 may include a party invitation text such as: "Hello everyone, I am hosting a dinner party tomorrow at my house (222 Blank Street, Blank City, CA, 99999). Let me know if you can attend" where the house address is based on tool call result 1444. In some examples, the identified model stores generated response 1447 and the prompt associated with input 1433 on the electronic device (e.g., 1000 and/or electronic device in communication with electronic device 1000) that the identified model is installed on. In some examples, generated response 1447 and the prompt are stored in a similar manner as described with respect to FIG. 14A and FIG. 14B.

FIG. 14C illustrates model framework 1402 receiving generated response 1447 from model endpoint 1403 as depicted by arrow 1448. In some examples, generated response 1447 includes one or more responses in different modes (e.g., visual, auditory, and/or mixed mode) (as described with respect to FIG. 14A).

FIG. 14C illustrates model framework transmitting generated response 1447 to application 1401 as depicted by arrow 1449. In some examples, transmitting generated response 1447 to application 1401 causes application 1401 to provide generated response 1447 to the user. In some examples, providing generated response 1447 to the user includes providing generated response 1447 in a visual, audio, and/or mixed mode (as described with respect to FIG. 14A).

In some examples, follow-up inputs are processed in a similar manner as described with respect to FIG. 14A.

FIGS. 15A-15B illustrate a flow diagram illustrating a process for processing intents using a local and/or a remote model, according to various examples. Process 1500 is performed, for example, using one or more electronic devices implementing a digital assistant (e.g., electronic devices 600, 901, 1000, or 1025). In some examples, one or more blocks of process 1500 are performed by one or more remote devices (e.g., one or more remote servers, one or more local servers, a cloud computing system, and/or the like). Alternatively, the one or more blocks of process 1500 are performed by the one or more client electronic devices implementing a digital assistant or a software application. For example, the blocks of process 1500 are divided up in any manner between one or more servers (e.g., DA server) and a client device (e.g., 600, 901, 1000, or 1025). Thus, while portions of process 1500 are described herein as being performed by particular devices, it will be appreciated that process 1500 is not so limited. In another example, the process 1500 is performed using only a client device (e.g., electronic device 600) or multiple client devices. In process 1500, some blocks are, optionally, combined, the order of some blocks is, optionally, changed, and some blocks are, client devices (e.g., 600), optionally, omitted. In some examples, additional steps may be performed in combination with process 1500.

In some examples, the electronic device (e.g., a personal or client electronic device (e.g., a mobile device (e.g., iPhone®), a tablet computer (e.g., iPad®), a smart watch (e.g., Apple Watch®), a desktop (e.g., iMac®), or a laptop (e.g., MacBook®)) or a communal electronic device (e.g., a smart TV (e.g., Apple TV®), virtual reality headset (e.g., VR headset), smart vehicle, or augmented reality headset (e.g., smart glasses))) (e.g., electronic device 600 or 800) may be connected to a communications network (e.g., local area networks (LAN) or wide area networks (WAN), e.g., the Internet). The electronic device may include a display (e.g., 212) which may provide an input interface and an output interface between the electronic device and a user. The input interface may be an icon of a digital assistant or a software application for a user to provide user requests.

In some examples, at block 1501, at an electronic device (e.g., 600, 901, 1000, or 1025), a model framework (e.g., 1402) receives (e.g., 1406, 1422, and/or 1435) a first request associated with an intent from a software application (e.g., 1401) (e.g., digital assistant application, first party application, third party application).

In some examples, at block 1502, in accordance with a determination that a session has not been created: the model framework identifies (block 1503) a model (e.g., model installed/stored on a second electronic device or on the electronic device) (e.g., model is identified from a plurality of language models) (e.g., 906) based on the intent.

In some examples, at block 1504, in accordance with a determination that a session has not been created: the model framework creates the session (e.g., 1407, 1423, and/or 1436) (in some examples, creating a session includes receiving a session id from the identified language model) (in some examples, creating a session includes authenticating the user (e.g., receiving user credentials) and transmitting user credentials to the identified model) (in some examples, the model generates the session id based on the user credentials) (e.g., session allows the identified model to remember information about the user across multiple requests), using an API, with the identified model (e.g., large language model or generative model).

In some examples, at block 1505, the model framework receives (e.g., 1408, 1429, and/or 1437) a second request with a second intent (in some examples, the second request includes a user input (e.g., 1404, 1420, and/or 1433) received at the application from the software application.

In some examples, at block 1506, the model framework transmits (e.g., 1409, 1430, and/or 1439) the second request to the identified model via the session (e.g., using the API), wherein transmitting the second request causes the identified model to generate (e.g., block 1507) a response (e.g., 1410 and/or 1447) to the second request and to store (e.g., 1411*a*) (e.g., block 1508) the response and the second request (e.g., stored on an electronic device that the identified model is installed on) (in some examples, the response and the second request are associated with the created session (e.g., session id)) (in some examples, the response and the second request are stored while the session is active and/or until the session is closed or ended (e.g., a predetermined amount of time elapses without receiving a request after the application receives a response)).

In some examples, at block 1509, the model framework receives (e.g., 1411*b*, 1431, and/or 1448) (e.g., the response from the identified model via the session.

In some examples, at block 1510, the model framework transmits (e.g., 1412, 1432, and/or 1449) the response to the software application.

In some examples, at block 1511, the model framework receives (e.g., 1415) a third request, wherein the third request is a follow-up request (e.g., 1413) (e.g., request contains an intent associated with the response and/or the second request) (e.g., "try that again", "add bananas to this", "add the response to my notes", "Focus the Summary on the founding of Las Vegas") to the second request.

In some examples, at block 1512, the model framework transmits (e.g., 1416) the third request to the identified model via the session, wherein transmitting the third request causes the identified model to generate (e.g., block 1513) a second response (e.g., 1417) to the third request based on the stored response and/or the stored second request.

In some examples, at block 1514, the model framework receives (e.g., 1418) the second response from the identified model via the session.

In some examples, at block 1515, the model framework transmits (e.g., 1419) the second response to the software application.

In some examples, identifying the model comprises: the model framework determining a type of the second intent (e.g., knowledge-seeking, image analysis, application specific intent) and identifying the model based on the type of the second intent (as described with respect to FIG. 15A).

In some examples, identifying the model comprises: in accordance with a determination that the second intent is a knowledge-seeking type of intent (e.g., requesting knowledge and/or information related to a subject) (e.g., "What is the most popular resort in Las Vegas?", "How much does a flight to Las Vegas cost?", "Who owns my local sports team?"): the model framework determines if a local (e.g., installed on the electronic device) model (e.g., of one or more models) can satisfy the second intent.

In some examples, in accordance with a determination that the local model can satisfy the second intent (e.g., because the bit size necessary to satisfy the first request is below a threshold amount of bits), identifying the local model as the identified model.

In some examples, the model framework determines if the local model can satisfy the second intent based on a knowledge pool.

In some examples, the model framework identifies the model based on a database of one or more models (e.g., database including model identifiers) (in some examples, the one or more models include models local to (e.g., installed on) the electronic device and/or models remote to (e.g., installed on a second electronic device in communication with) the electronic device.

In some examples, the model framework identifies the model based on user preferences (e.g., user preferences associated with the application and/or user preferences associated with the electronic device).

In some examples, the model framework identifies the model based on a determination that a bit size to satisfy the second intent is greater than a threshold (e.g., greater and/or less than a threshold amount of bits).

In some examples, the identified model is installed on the electronic device (in some examples, the model is installed on the same electronic device as the software application).

In some examples, the electronic device is a first electronic device, and the model is installed on a second electronic device, different from the first electronic device (in some examples, the second electronic device is in communication with the first electronic device) (in some examples, the application is not installed on the second electronic device).

In some examples, the second request includes an image and/or electronic document identifier (e.g., 1429) associated with an image file (e.g., jpeg file, png file, heic file) (e.g., 1002, 1033*b*, and/or 1033*c*) and/or electronic document file (e.g., 1033*a*) (e.g., electronic document including text (e.g., word document, txt file, pdf file)).

In some examples, prior to receiving the second request: the model framework receives (e.g., 1424) a third request from the software application, wherein the third request is associated with an intent to register the image file and/or electronic document file and transmits (e.g., via the session) the image file and/or electronic document file to the identified model. In some examples, prior to receiving the second request and in response to transmitting the image file and/or electronic document file to the identified model the model framework receives (e.g., 1427*b*) the image and/or electronic document identifier (e.g., generated by the identified model (e.g., 1427*a*) associated with the image file and/or electronic document file. In some examples, prior to receiving the second request, the model framework transmits the image and/or electronic document identifier to the software application.

In some examples, the model framework transmits (e.g., 1428) the image file and/or electronic document file causes the model to store (in some examples, upload) the image file and/or electronic document file on an electronic device associated with the identified model (e.g., electronic device the identified model is installed on) (e.g., the electronic device or a second electronic device in communication with the electronic device).

In some examples, transmitting the image file and/or electronic document file comprises: the model framework transmitting (e.g., 1426) feedback data (e.g., via a stream) indicating the progress of transmitting the image file and/or electronic document file to the software application.

In some examples, the second request includes a tool function 1438 (e.g., function associated with the software application) (e.g., function that when invoked can gather information and/or transform the state of the software application).

In some examples, the tool function is associated with a process to gather user data (e.g., location of the electronic device, contact information, other electronic devices connected to the electronic device, calendar information, messages received on the electronic device, emails, and/or user biometric information).

In some examples, the tool function is associated with a process to transform the state of the software application (e.g., open a text editor in the software application).

In some examples, the tool function is associated with a process to transform the state of the electronic device (e.g., lock the electronic device).

In some examples, transmitting the second request to the identified model includes registering (e.g., storing on an electronic device that the model is installed on) the tool function to the identified model.

In some examples, the response is generated based on a tool function result (e.g., 1444), and transmitting the second request to the identified model includes: the model framework receiving (e.g., 1442) a tool function call (e.g., 1441) from the identified model, transmitting (e.g., 1443) the tool function call to the software application (in some examples, transmitting the tool function call to the software application causes the application to run the tool function on the electronic device that the software application is installed on), receiving (e.g., 1445) a tool function result (e.g., 1444) from the software application, transmitting (e.g., 1446) the tool function result to the identified model.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

Some embodiments described herein can include use of artificial intelligence and/or machine learning systems (sometimes referred to herein as the AI/ML systems). The use can include collecting, processing, labeling, organizing, analyzing, recommending and/or generating data. Entities that collect, share, and/or otherwise utilize user data should provide transparency and/or obtain user consent when collecting such data. The present disclosure recognizes that the use of the data in the AI/ML systems can be used to benefit users. For example, the data can be used to train models that can be deployed to improve performance, accuracy, and/or functionality of applications and/or services. Accordingly, the use of the data enables the AI/ML systems to adapt and/or optimize operations to provide more personalized, efficient, and/or enhanced user experiences. Such adaptation and/or optimization can include tailoring content, recommendations, and/or interactions to individual users, as well as streamlining processes, and/or enabling more intuitive interfaces. Further beneficial uses of the data in the AI/ML systems are also contemplated by the present disclosure.

The present disclosure contemplates that, in some embodiments, data used by AI/ML systems includes publicly available data. To protect user privacy, data may be anonymized, aggregated, and/or otherwise processed to remove or to the degree possible limit any individual identification. As discussed herein, entities that collect, share, and/or otherwise utilize such data should obtain user consent prior to and/or provide transparency when collecting such data. Furthermore, the present disclosure contemplates that the entities responsible for the use of data, including, but not limited to data used in association with AI/ML systems, should attempt to comply with well-established privacy policies and/or privacy practices.

For example, such entities may implement and consistently follow policies and practices recognized as meeting or exceeding industry standards and regulatory requirements for developing and/or training AI/ML systems. In doing so, attempts should be made to ensure all intellectual property rights and privacy considerations are maintained. Training should include practices safeguarding training data, such as personal information, through sufficient protections against misuse or exploitation. Such policies and practices should cover all stages of the AI/ML systems development, training, and use, including data collection, data preparation, model training, model evaluation, model deployment, and ongoing monitoring and maintenance. Transparency and accountability should be maintained throughout. Such policies should be easily accessible by users and should be updated as the collection and/or use of data changes. User data should be collected for legitimate and reasonable uses of the entity and not shared or sold outside of those legitimate uses. Further, such collection and sharing should occur through transparency with users and/or after receiving the informed consent of the users. Additionally, such entities should consider taking any needed steps for safeguarding and securing access to such data and ensuring that others with access to the data adhere to their privacy policies and procedures. Further, such entities should subject themselves to evaluation by third parties to certify, as appropriate for transparency purposes, their adherence to widely accepted privacy policies and practices. In addition, policies and/or practices should be adapted to the particular type of data being collected and/or accessed and tailored to a specific use case and applicable laws and standards, including jurisdiction-specific considerations.

In some embodiments, AI/ML systems may utilize models that may be trained (e.g., supervised learning or unsupervised learning) using various training data, including data collected using a user device. Such use of user-collected data may be limited to operations on the user device. For example, the training of the model can be done locally on the user device so no part of the data is sent to another device. In other implementations, the training of the model can be performed using one or more other devices (e.g., server(s)) in addition to the user device but done in a privacy preserving manner, e.g., via multi-party computation as may be done cryptographically by secret sharing data or other means so that the user data is not leaked to the other devices.

In some embodiments, the trained model can be centrally stored on the user device or stored on multiple devices, e.g., as in federated learning. Such decentralized storage can similarly be done in a privacy preserving manner, e.g., via cryptographic operations where each piece of data is broken into shards such that no device alone (i.e., only collectively with another device(s)) or only the user device can reassemble or use the data. In this manner, a pattern of behavior of the user or the device may not be leaked, while taking advantage of increased computational resources of the other devices to train and execute the ML model. Accordingly, user-collected data can be protected. In some implementations, data from multiple devices can be combined in a privacy-preserving manner to train an ML model.

In some embodiments, the present disclosure contemplates that data used for AI/ML systems may be kept strictly separated from platforms where the AI/ML systems are deployed and/or used to interact with users and/or process data. In such embodiments, data used for offline training of the AI/ML systems may be maintained in secured datastores with restricted access and/or not be retained beyond the duration necessary for training purposes. In some embodiments, the AI/ML systems may utilize a local memory cache to store data temporarily during a user session. The local memory cache may be used to improve performance of the AI/ML systems. However, to protect user privacy, data stored in the local memory cache may be erased after the user session is completed. Any temporary caches of data used for online learning or inference may be promptly erased after processing. All data collection, transfer, and/or storage should use industry-standard encryption and/or secure communication.

In some embodiments, as noted above, techniques such as federated learning, differential privacy, secure hardware components, homomorphic encryption, and/or multi-party computation among other techniques may be utilized to further protect personal information data during training and/or use of the AI/ML systems. The AI/ML systems should be monitored for changes in underlying data distribution such as concept drift or data skew that can degrade performance of the AI/ML systems over time.

In some embodiments, the AI/ML systems are trained using a combination of offline and online training. Offline training can use curated datasets to establish baseline model performance, while online training can allow the AI/ML systems to continually adapt and/or improve. The present disclosure recognizes the importance of maintaining strict data governance practices throughout this process to ensure user privacy is protected.

In some embodiments, the AI/ML systems may be designed with safeguards to maintain adherence to originally intended purposes, even as the AI/ML systems adapt based on new data. Any significant changes in data collection and/or applications of an AI/ML system use may (and in some cases should) be transparently communicated to affected stakeholders and/or include obtaining user consent with respect to changes in how user data is collected and/or utilized.

Despite the foregoing, the present disclosure also contemplates embodiments in which users selectively restrict and/or block the use of and/or access to data. That is, the present disclosure contemplates that hardware and/or software elements can be provided to prevent or block access to data. For example, in the case of some services, the present technology should be configured to allow users to select to "opt in" or "opt out" of participation in the collection of data during registration for services or anytime thereafter. In another example, the present technology should be configured to allow users to select not to provide certain data for training the AI/ML systems and/or for use as input during the inference stage of such systems. In yet another example, the present technology should be configured to allow users to be able to select to limit the length of time data is maintained or entirely prohibit the use of their data for use by the AI/ML systems. In addition to providing "opt in" and "opt out" options, the present disclosure contemplates providing notifications relating to the access or use of personal information. For instance, a user can be notified when their data is being input into the AI/ML systems for training or inference purposes, and/or reminded when the AI/ML systems generate outputs or make decisions based on their data.

The present disclosure recognizes AI/ML systems should incorporate explicit restrictions and/or oversight to mitigate against risks that may be present even when such systems having been designed, developed, and/or operated according to industry best practices and standards. For example, outputs may be produced that could be considered erroneous, harmful, offensive, and/or biased; such outputs may not necessarily reflect the opinions or positions of the entities developing or deploying these systems. Furthermore, in some cases, references to third-party products and/or services in the outputs should not be construed as endorsements or affiliations by the entities providing the AI/ML systems. Generated content can be filtered for potentially inappropriate or dangerous material prior to being presented to users, while human oversight and/or ability to override or correct erroneous or undesirable outputs can be maintained as a failsafe.

The present disclosure further contemplates that users of the AI/ML systems should refrain from using the services in any manner that infringes upon, misappropriates, or violates the rights of any party. Furthermore, the AI/ML systems should not be used for any unlawful or illegal activity, nor to develop any application or use case that would commit or facilitate the commission of a crime, or other tortious, unlawful, or illegal act. The AI/ML systems should not violate, misappropriate, or infringe any copyrights, trademarks, rights of privacy and publicity, trade secrets, patents, or other proprietary or legal rights of any party, and appropriately attribute content as required. Further, the AI/ML systems should not interfere with any security, digital signing, digital rights management, content protection, verification, or authentication mechanisms. The AI/ML systems should not misrepresent machine-generated outputs as being human-generated.

As described above, one aspect of the present technology is the gathering and use of data available from various sources to improve the processing of tasks by a digital assistant of an electronic device. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver personalized suggestions indicating that a task may be performed by a digital assistant of an electronic device that are of greater interest to the user (e.g., by being more relevant to the user's current activity and perceived knowledge). Accordingly, use of such personal information data enables the electronic device to provide suggestions that the user is more likely to engage with and learn from. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the U.S., collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of personalized suggestions indicating that a task may be performed by a digital assistant of an electronic device, the present technology can be configured to allow users to select to "opt in" or "opt out" of participation in the collection of personal information data during registration for services or anytime thereafter. In another example, users can select not to provide previous context data, such as the users' trends on an electronic device, for generating and providing personalized suggestions. In yet another example, users can select to limit the length of time previous context data is maintained or entirely prohibit the collection of previous context data associated with providing personalized suggestions. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, personalized suggestions indicating that a task may be performed by a digital assistant of an electronic device can be generated and provided to users by inferring preferences and user knowledge based on non-personal information data or a bare minimum amount of personal information, such as the context data received by the electronic device, other non-personal information available to the electronic device, or publicly available information.

What is claimed is:

1. An electronic device, comprising:
- a display generation component;
- one or more processors;
- a memory; and
- one or more programs, wherein the one or more programs are stored in the memory and are configured to be executed by the one or more processors, the one or more programs including instructions for:
  - receiving an input from a user, wherein the input is associated with an intent;
  - determining, based on the intent, an intent type;
  - in accordance with a determination that the intent type is a first intent type:
    - causing a first digital assistant to perform an action associated with the intent; and
  - in accordance with a determination that the intent type is a second intent type, different than the first intent type:
    - providing a prompt, wherein the prompt indicates a request can be shared to a model to satisfy the intent;
    - receiving a second input associated with the prompt; and
    - in accordance with a determination that the second input is associated with a permission to share the request to the model:
      - transmitting instructions to the model different than the first digital assistant and remote to the electronic device wherein the instructions cause the model to perform the action associated with the intent, wherein the first digital assistant includes fewer nodes than the model; and
    - after transmitting the instructions to the model:
      - receiving, at the first digital assistant, a response from the model; and
      - providing the response.

2. The electronic device of claim 1, wherein the prompt is displayed based on a user preference.

3. The electronic device of claim 1, wherein receiving the response from the model includes receiving, at the first digital assistant, a plurality of responses associated with the intent, and wherein providing the response includes providing a response from the plurality of responses based on context data.

4. The electronic device of claim 3, wherein the context data includes whether a user gaze is detected at the electronic device.

5. The electronic device of claim 3, wherein the context data includes whether audio is being outputted at the electronic device.

6. The electronic device of claim 3, wherein the context data includes determining a type of a second electronic device, wherein the second electronic device is currently connected to the electronic device.

7. The electronic device of claim 1, wherein the one or more programs further include instructions for:
- after providing the response, receiving a third input from the user, wherein the third input is associated with a second intent;

determining, based on the third input, an intent type associated with the second intent;

in accordance with a determination that the second intent is a regenerate intent type:

determining whether the first digital assistant performed the action or the model performed the action;

in accordance with a determination that the first digital assistant performed the action, performing the action using the first digital assistant;

in accordance with a determination that the model performed the action, transmitting second instructions to the model, wherein the second instructions cause the model to perform the action.

8. The electronic device of claim 1, wherein the one or more programs further include instructions for:

after providing the response, receiving a third input from the user, wherein the third input is associated with a second intent;

determining, based on the third input, an intent type associated with the second intent, wherein determining the intent type associated with the second intent includes:

determining whether the second intent is a follow-up intent type;

in accordance with a determination that the second intent is a follow-up intent type:

determining whether the first digital assistant performed the action or the model performed the action;

in accordance with a determination that the first digital assistant performed the action, performing a second action associated with the second intent using the first digital assistant; and in accordance with a determination that the model performed the action, transmitting third instructions to the model, wherein the third instructions cause the model to perform the second action using the model.

9. The electronic device of claim 1, wherein receiving the response from the model includes, receiving a plurality of refinement prompts, and wherein providing the response includes concurrently providing the response and at least one refinement prompt of the plurality of refinement prompts.

10. The electronic device of claim 9, wherein each refinement prompt of the plurality of refinement prompts comprises:

a suggested natural language input; and a refinement response to the suggested natural language input.

11. The electronic device of claim 9, wherein the one or more programs further include instructions for:

receiving a third user input, wherein the third user input is associated with a refinement prompt of the plurality of refinement prompts; and in accordance with a determination that the third input is associated with the refinement prompt:

providing, using the first digital assistant, a refinement response.

12. The electronic device of claim 9, wherein the plurality of refinement prompts are determined based on:

a number of characters in the response;

at least one application installed on the electronic device; and/or at least one query commonly requested by other users.

13. The electronic device of claim 1, wherein determining the intent type includes determining the intent type is the first intent type when the input is associated with a first-party application.

14. The electronic device of claim 1, wherein determining the intent type includes determining the intent type is the first intent type when the input includes a trigger associated with the first digital assistant.

15. The electronic device of claim 1, wherein determining the intent type includes determining the intent type is the second intent type when the input includes an associated electronic document.

16. The electronic device of claim 1, wherein determining the intent type includes determining the intent type is the second type when the input includes a trigger associated with the model.

17. The electronic device of claim 1, wherein determining the intent type includes:

determining whether the first digital assistant can satisfy the intent;

in accordance with a determination that the first digital assistant can satisfy the intent, determining the intent type is the first intent type; and in accordance with a determination that the first digital assistant cannot satisfy the intent, determining the intent type is the second intent type.

18. The electronic device of claim 1, wherein determining the intent type is based on context data, wherein the context data includes:

a displayed application;

a displayed image specified in the input;

a user defined set of rules;

at least one keyword in the input;

an application specified in the input;

a domain of the input;

an amount of data necessary to satisfy the intent;

whether the intent requires private information related to the user; and/or whether a previous intent provided by the user was satisfied using the model.

19. The electronic device of claim 1, wherein determining the intent type includes:

determining the input includes an ambiguous term; and in accordance with the determination that the input includes an ambiguous term, disambiguating the ambiguous term using a displayed element, wherein the displayed element is an element that the user most recently interacted with.

20. A non-transitory computer-readable storage medium storing one or more programs configured to be executed by one or more processors of an electronic device that is in communication with a display generation component and one or more input devices, the one or more programs including instructions for:

receiving an input from a user, wherein the input is associated with an intent;

determining, based on the intent, an intent type;

in accordance with a determination that the intent type is a first intent type:

causing a first digital assistant to perform an action associated with the intent; and in accordance with a determination that the intent type is a second intent type, different than the first intent type:

providing a prompt, wherein the prompt indicates a request can be shared to a model to satisfy the intent;

receiving a second input associated with the prompt; and in accordance with a determination that the second input is associated with a permission to share the request to the model:

transmitting instructions to the model different than the first digital assistant and remote to the electronic device wherein the instructions cause the model to perform the action associated with the intent, wherein the first digital assistant includes fewer nodes than the model; and after transmitting the instructions to the model:

receiving, at the first digital assistant, a response from the model; and providing the response.

21. The non-transitory computer-readable storage medium of claim 20, wherein receiving the response from the model includes receiving, at the first digital assistant, a plurality of responses associated with the intent, and wherein providing the response includes providing a response from the plurality of responses based on context data.

22. The non-transitory computer-readable storage medium of claim 21, wherein the context data includes determining a type of a second electronic device, wherein the second electronic device is currently connected to the electronic device.

23. The non-transitory computer-readable storage medium of claim 20, wherein the one or more programs further include instructions for:

after providing the response, receiving a third input from the user, wherein the third input is associated with a second intent;

determining, based on the third input, an intent type associated with the second intent;

in accordance with a determination that the second intent is a regenerate intent type:

determining whether the first digital assistant performed the action or the model performed the action;

in accordance with a determination that the first digital assistant performed the action, performing the action using the first digital assistant;

in accordance with a determination that the model performed the action, transmitting second instructions to the model, wherein the second instructions cause the model to perform the action.

24. The non-transitory computer-readable storage medium of claim 20, wherein the one or more programs further include instructions for:

after providing the response, receiving a third input from the user, wherein the third input is associated with a second intent;

determining, based on the third input, an intent type associated with the second intent, wherein determining the intent type associated with the second intent includes:

determining whether the second intent is a follow-up intent type;

in accordance with a determination that the second intent is a follow-up intent type:

determining whether the first digital assistant performed the action or the model performed the action;

in accordance with a determination that the first digital assistant performed the action, performing a second action associated with the second intent using the first digital assistant; and in accordance with a determination that the model performed the action, transmitting third instructions to the model, wherein the third instructions cause the model to perform the second action using the model.

25. The non-transitory computer-readable storage medium of claim 20, wherein receiving the response from the model includes, receiving a plurality of refinement prompts, and wherein providing the response includes concurrently providing the response and at least one refinement prompt of the plurality of refinement prompts.

26. The non-transitory computer-readable storage medium of claim 25, wherein the one or more programs further include instructions for:

receiving a third user input, wherein the third user input is associated with a refinement prompt of the plurality of refinement prompts; and in accordance with a determination that the third input is associated with the refinement prompt:

providing, using the first digital assistant, a refinement response.

27. The non-transitory computer-readable storage medium of claim 20, wherein determining the intent type includes determining the intent type is the first intent type when the input is associated with a first-party application.

28. The non-transitory computer-readable storage medium of claim 20, wherein determining the intent type includes determining the intent type is the first intent type when the input includes a trigger associated with the first digital assistant.

29. The non-transitory computer-readable storage medium of claim 20, wherein determining the intent type includes determining the intent type is the second intent type when the input includes an associated electronic document.

30. The non-transitory computer-readable storage medium of claim 20, wherein determining the intent type includes determining the intent type is the second type when the input includes a trigger associated with the model.

31. The non-transitory computer-readable storage medium of claim 20, wherein determining the intent type includes:

determining whether the first digital assistant can satisfy the intent;

in accordance with a determination that the first digital assistant can satisfy the intent, determining the intent type is the first intent type; and in accordance with a determination that the first digital assistant cannot satisfy the intent, determining the intent type is the second intent type.

32. The non-transitory computer-readable storage medium of claim 20, wherein determining the intent type is based on context data, wherein the context data includes:

a displayed application;

a displayed image specified in the input;

a user defined set of rules;

at least one keyword in the input;

an application specified in the input;

a domain of the input;

an amount of data necessary to satisfy the intent;

whether the intent requires private information related to the user; and/or whether a previous intent provided by the user was satisfied using the model.

33. A method, comprising:

at an electronic device:

receiving an input from a user, wherein the input is associated with an intent;

determining, based on the intent, an intent type;

in accordance with a determination that the intent type is a first intent type:

causing a first digital assistant to perform an action associated with the intent; and in accordance with a determination that the intent type is a second intent type, different than the first intent type:

providing a prompt, wherein the prompt indicates a request can be shared to a model to satisfy the intent;

receiving a second input associated with the prompt; and in accordance with a determination that the second input is associated with a permission to share the request to the model:

transmitting instructions to the model different than the first digital assistant and remote to the electronic device wherein the instructions cause the model to perform the action associated with the intent, wherein the first digital assistant includes fewer nodes than the model; and after transmitting the instructions to the model:

receiving, at the first digital assistant, a response from the model; and providing the response.

34. The method of claim 33, wherein receiving the response from the model includes receiving, at the first digital assistant, a plurality of responses associated with the intent, and wherein providing the response includes providing a response from the plurality of responses based on context data.

35. The method of claim 34, wherein the context data includes determining a type of a second electronic device, wherein the second electronic device is currently connected to the electronic device.

36. The method of claim 33, further comprising:

after providing the response, receiving a third input from the user, wherein the third input is associated with a second intent;

determining, based on the third input, an intent type associated with the second intent;

in accordance with a determination that the second intent is a regenerate intent type:

determining whether the first digital assistant performed the action or the model performed the action;

in accordance with a determination that the first digital assistant performed the action, performing the action using the first digital assistant;

in accordance with a determination that the model performed the action, transmitting second instructions to the model, wherein the second instructions cause the model to perform the action.

37. The method of claim 33, further comprising:

after providing the response, receiving a third input from the user, wherein the third input is associated with a second intent;

determining, based on the third input, an intent type associated with the second intent, wherein determining the intent type associated with the second intent includes:

determining whether the second intent is a follow-up intent type;

in accordance with a determination that the second intent is a follow-up intent type:

determining whether the first digital assistant performed the action or the model performed the action;

in accordance with a determination that the first digital assistant performed the action, performing a second action associated with the second intent using the first digital assistant; and in accordance with a determination that the model performed the action, transmitting third instructions to the model, wherein the third instructions cause the model to perform the second action using the model.

38. The method of claim 33, wherein receiving the response from the model includes, receiving a plurality of refinement prompts, and wherein providing the response includes concurrently providing the response and at least one refinement prompt of the plurality of refinement prompts.

39. The method of claim 38, further comprising:

receiving a third user input, wherein the third user input is associated with a refinement prompt of the plurality of refinement prompts; and in accordance with a determination that the third input is associated with a refinement prompt:

providing, using the first digital assistant, the refinement response.

40. The method of claim 33, wherein determining the intent type includes determining the intent type is the first intent type when the input is associated with a first-party application.

41. The method of claim 33, wherein determining the intent type includes determining the intent type is the first intent type when the input includes a trigger associated with the first digital assistant.

42. The method of claim 33, wherein determining the intent type includes determining the intent type is the second intent type when the input includes an associated electronic document.

43. The method of claim 33, wherein determining the intent type includes determining the intent type is the second type when the input includes a trigger associated with the model.

44. The method of claim 33, wherein determining the intent type includes:

determining whether the first digital assistant can satisfy the intent;

in accordance with a determination that the first digital assistant can satisfy the intent, determining the intent type is the first intent type; and in accordance with a determination that the first digital assistant cannot satisfy the intent, determining the intent type is the second intent type.

45. The method of claim 33, wherein determining the intent type is based on context data, wherein the context data includes:

a displayed application;

a displayed image specified in the input;

a user defined set of rules;

at least one keyword in the input;

an application specified in the input;

a domain of the input;

an amount of data necessary to satisfy the intent;

whether the intent requires private information related to the user; and/or whether a previous intent provided by the user was satisfied using the model.

* * * * *